United States Patent [19]
Kirigaya et al.

[11] Patent Number: 5,761,554
[45] Date of Patent: Jun. 2, 1998

[54] INFORMATION SETTING DATA DIAL FOR A CAMERA

[75] Inventors: Tadayuki Kirigaya; Hidefumi Kaneko; Masaaki Haga, all of Tokyo, Japan

[73] Assignee: Asahi Kogaku Kogyo Kabushiki Kaisha, Tokyo, Japan

[21] Appl. No.: 866,087

[22] Filed: May 17, 1997

Related U.S. Application Data

[63] Continuation of Ser. No. 435,644, May 17, 1995, abandoned.

[30] Foreign Application Priority Data

| May 17, 1994 | [JP] | Japan | 6-006603 U |
|---|---|---|---|
| May 18, 1994 | [JP] | Japan | 6-128322 |
| May 18, 1994 | [JP] | Japan | 6-128323 |
| May 18, 1994 | [JP] | Japan | 6-128324 |
| May 18, 1994 | [JP] | Japan | 6-128326 |
| May 18, 1994 | [JP] | Japan | 6-128327 |

[51] Int. Cl.$^6$ .................................................. G03B 17/00
[52] U.S. Cl. .................................................. 396/299
[58] Field of Search ................... 354/289.12, 289.1, 354/289.11; 396/297, 298, 299

[56] References Cited

U.S. PATENT DOCUMENTS

| 3,643,572 | 2/1972 | Kurei | 95/42 |
|---|---|---|---|
| 3,839,723 | 10/1974 | Uno | 354/37 |
| 3,947,862 | 3/1976 | Watanbe et al. | 354/289 |
| 3,964,082 | 6/1976 | Mita | 354/289 |
| 4,067,033 | 1/1978 | Urano et al. | 354/289 |
| 4,598,986 | 7/1986 | Shiratori et al. | 354/21 |
| 5,099,267 | 3/1992 | Satou et al. | 354/412 |
| 5,210,569 | 5/1993 | Harada | 354/442 |
| 5,223,888 | 6/1993 | Fukahori | 354/475 |
| 5,280,320 | 1/1994 | Kobayashi et al. | 354/471 |
| 5,283,606 | 2/1994 | Konno et al. | 354/289.1 |
| 5,298,936 | 3/1994 | Akitake et al. | 354/471 |

FOREIGN PATENT DOCUMENTS

| 3221930 | 9/1991 | Japan. |
|---|---|---|
| 3230138 | 10/1991 | Japan. |
| 486627 | 3/1992 | Japan. |

*Primary Examiner*—David M. Gray
*Assistant Examiner*—Christopher E. Mahoney
*Attorney, Agent, or Firm*—Greenblum & Bernstein P.L.C.

[57] ABSTRACT

A dial rotatably mounted on a camera is provided with at least two kinds of information, corresponding to variable settings, functions, or modes. The dial may be rotated to set one of the kinds of information at a time, when an index mark points to symbols on the dial representative of individual settings or of a setting change mode to be performed in combination with other operating members provided to the camera. An LCD provided on the camera displays changes in the information in response to the rotation of the dial. The dial can have the kinds of information provided to the dial in adjacent angular ranges, or alternatively in concentric form, the kinds of information switchable by an additional member.

37 Claims, 46 Drawing Sheets

DRIVE MODE
C=1 : SINGLE
C=2 : CONTINUOUS
C=3 : MULTIPLE EXPOSURE

PHOTOMETRY MODE
C=1 : CENTER-WEIGHTED
C=2 : SPOT
C=3 : AVERAGED

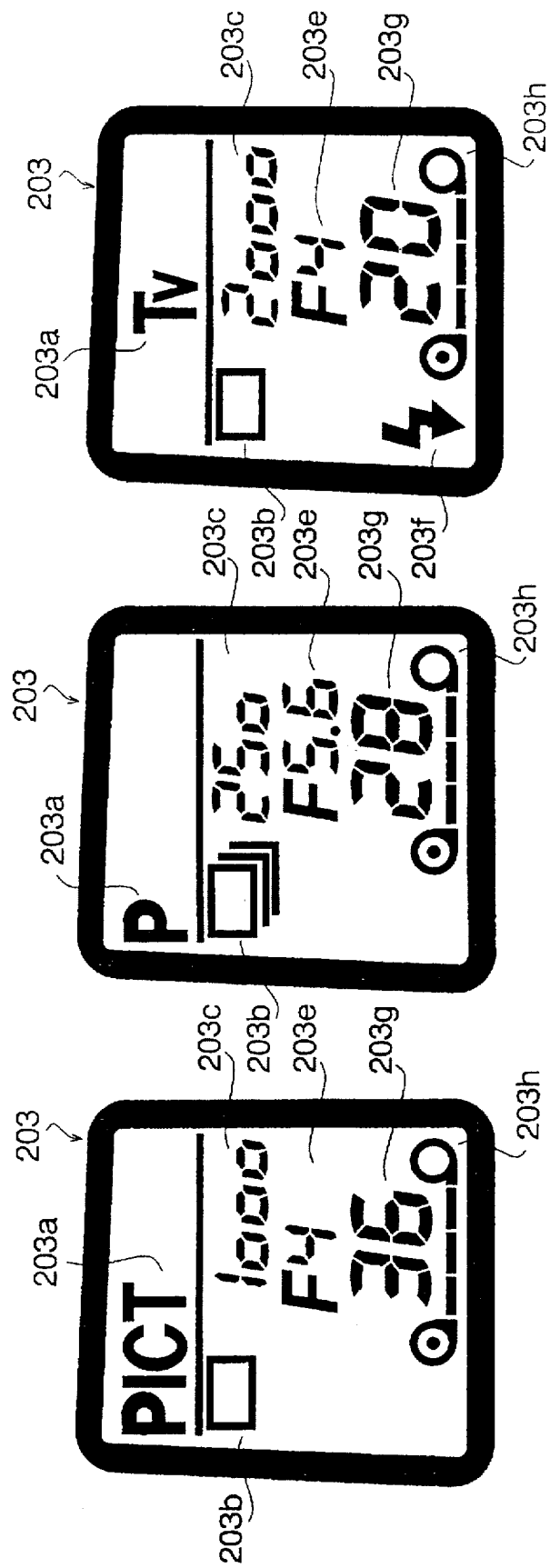

FULL EXPOSURE MODE
P=1 : PROGRAM MODE
P=2 : Tv AE MODE
P=3 : Av AE MODE
P=4 : MANUAL MODE

INFORMATION SETTING DATA DIAL FOR A CAMERA

This application is a continuation of application Ser. No. 08/435,644, filed May 17, 1995, now abandoned.

BACKGROUND OF THE INVENTION

The present invention relates to information setting controls for cameras, specifically to dial-type members used to set photographing parameters.

The recent use of push-buttons and electronic controls in SLR camera has allowed a variety of programmed exposure and specialty mode functions. An each of the new functions is controllable to some extent by the users, the camera must have some provision for the user to set a selected value in a variable range. Typically, a modern SLR camera includes up/down switches and/or push buttons capable of setting a variety of programmable functions when used in combination. However, with many functions settable with the same switch/button, intuitive operation of the camera is impossible; the use of the camera must be painstakingly learned with the aid of the operating manual. Moreover, even with the display of functional parameters in an LCD screen or other display medium, the operation of the camera is difficult to master. It can be difficult to immediately recognize the settings of the various functions at a glance. Furthermore, with many functions and few control switches or buttons, typically each setting operation requires that the buttons or switches be operated in combination, requiring two-handed operation for each setting.

Less recent SLRs have used dial controls for some functions. The use of dials to set shutter speed and ISO film speed is well known, as is the use of a lens-borne aperture ring to not aperture values. The operation of the dials and ring is intuitive in nature; each dial or ring sets a value for only one function, and the dial or ring is easily controlled with one hand. However, the large number of functions in modern cameras have made dial and ring controls impratical. A dial or ring controlled camera conventionally does not have a display which summarizes information for the user, or which shows the camera's choice of automatic setting in response to a manual setting by the user. The dial faces can become crowded with all the symbols and numbers that must be provided for the dials to control the camera's functions. Furthermore, a modern camera having an independent dial or ring control for each function would become studded with a profusion of dials, and the ease of use of the dial control becomes less of an advantage.

SUMMARY OF THE INVENTION

It is therefore an object of the present invention to provide an improved camera in which the shutter speed dial and aperture ring may be set intuitively by a user, while retaining the ability to control several other variable functions of the camera.

A second object of the present invention is to provide an improved camera, having a shutter speed dial and aperture control ring, that allows the display of summarized information, including the camera's choice of automatic setting in response to a manual setting, of the aperture control ring or shutter speed dial.

A third object of the present invention in to provide an improved camera, having full exposure modes and specialty program "picture" modes, that uses a dial member to select at least some of the modes for ease of operation.

In order to meet the objects of the invention, according to one aspect of the present invention, a camera includes a dial member rotatably mounted on a body of the camera, having first symbols for indicating settings of a first function and at least a second symbol for indicating a setting change operation for a second function. An index mark is provided to the camera body. A detector to detects a rotational position of the dial member with reference to the index marks. A mechanism selects one of the settings of the second function. A mechanism sets the first function in response to a rotation of the dial member. A mechanism sets the second function, that starts a setting change operation in response to a rotation of the dial member and in response to the selecting mechanism. In this manner, to set the first function, the dial member rotates to one of the symbols for the first function. To set the second function, the dial member rotates the second symbol, starting the setting change operation for the second function; the selecting mechanism then sets the second function. The first function in, for example, an exposure compensation function. The second function can be, for example, one or more of ISO film speed setting, photometry mode setting, or drive mode setting. If more than one of the second functions are to be set, each has its own setting change symbol on the dial. The selecting mechanism can be one or more push buttons, or a pivotable/rotatable dial. When the dial is in a position to set the first functions, the selecting means can be used to set other functions of the camera rather than the second function, and only acts to set the second function when the second function setting symbol is aligned with the index mark.

According to another aspect of the present invention, a camera includes a camera body. A lens unit is mountable to the camera body. A rotatable shutter speed control dial is provided to the camera body. A rotatable aperture control ring is provided on the lens unit. A display screen provided on the camera body, indicates photographing information, including a mode of operation of the camera. A setting mechanism sets a mode of operation of the camera. A controlling mechanism controls the setting mechanism and the display screen in response to rotational positions of the shutter speed control dial and the aperture control ring, to set a mode of operation of the camera and to display information representative of the set mode of operation in the display screen. In this manner, a separate control member is not required to set the modes of operation of the camera, as the mode of operation is determined by the positions of the shutter control dial and the aperture control ring. Furthermore, the display screen provides visual feedback of the chose mode. The user is thus not required to check the dials/rings to determine the current mode, but can merely glance at the display screen. Optionally, this device can be provided with a multi-function dial to perform a setting extraneous to the general made of operation such as the setting of optimized "picture" program modes in combination with a variable setting touch as exposure compensation. In this case, the multi function dial is rotated to one of the picture symbols to set a picture mode, and rotated to one of the variable setting values to set the second function, the display screen is also provided with symbols representative of the picture modes, and display the appropriate symbol when a picture mode is selected.

According to still another aspect of the present invention, a camera includes a dial member rotatably mounted on a body of the camera. A set of first symbols are on the dial in a first angular range, each of the first symbols corresponding to a picture mode of operation. At least a second symbol is on the dial in a second angular range indicating a mode change operation for a set of general exposure modes of operation. An index mark is provided to the camera body. A detecting mechanism detects a rotational position of the dial member with reference to the index mark. A first changing mechanism for changing a setting of a picture mode when the dial member is rotated such that the index mark is aligned with one of the first symbols, according to the rotational position of the dial member in first angular range. A second changing mechanism for changing a setting of a chosen general exposure mode of the set of general exposure modes, when the dial member is rotated such that the index mark is aligned with the second symbol. The picture modes are completely programmed exposure modes optimized for specific photographing situations. The camera is able to automatically set shutter speed and aperture size in each of the picture modes according to a distinct program for each of the picture modes, and the set of general exposure modes includes all photographing modes where a user can manually set one or both of shutter speed and aperture size. In this manner, the picture modes are directly set by rotating the dial to one of the picture symbols, and the general exposure modes are selected by rotating the dial to the second symbol and operating the changing mechanism. Preferably, a display screen provides visual feedback, showing the chosen mode in response to the rotation of the dial and the operation of the changing means. Optionally, the dial is provided with a third symbol, and the third symbol may be used to turn the camera OFF, thus reducing even further the number of operating members while retaining clarity in operation.

According to yet another aspect of the present invention, a camera includes a dial rotatably mounted on a body of the camera, the dial member having a set of first and second symbols thereon. Each of the first symbols correspond a picture mode of operation, and each of the second symbols correspond a general exposure mode of operation. An index mark is provided to the camera body. A first detection mechanism for detects a rotational position of the dial member with reference to the index mark. A selection mechanism for selecting one set of the symbols, wherein a selection of one of the sets precludes a selection of the remaining set. A setting mechanism for sets a mode of operation according to the rotational position of the dial member when the dial member is rotated such that the index mark is aligned with a symbol, the set mode of operation corresponding to a symbol within the set selected by the selection mechanism. The picture modes are completely programed exposure modes optimized for specific photographing situations, and the camera is able to automatically set shutter speed and aperture size in each of the picture modes according to a distinct program for each of the picture modes. The set of general exposure modes include all photographing modes where a user can manually set at least one of shutter speed and aperture size. Preferably, the camera further includes a display screen, and the display screen in capable of displaying symbols representative of each of the general exposure modes and the setting of one of the picture modes of operation. Further preferably, the selection means includes means for revealing the selected set of symbols and masking the remaining set of symbols. For example, the dial member is hollow, and the selection means includes a center block mounted within the dial member, the center block being rotatable with reference to the dial. In this case, the dial member is provided with a mask above the center block, the mask having window portions and a masking portion. The first symbols and the second symbols are provided to the center block. The center block is rotatable within the dial member to reveal the selected set of symbols through the window portions while masking the remaining set of symbols with the masking portion. The selection means can include a second detecting mechanism for detecting a rotational position of the center block with reference to the dial member. In this manner, the appearance of the dial can be changed depending on the set of modes selected; when the picture modes are selected, only picture mode symbols can be seen on the dial, and when the general modes are selected, only general mode symbols are visible. The dial is subsequently rotated to align the selected mode of the selected set with the index mark, and if a display is provided, cations of the mode or set of modes appears in the dial. The sets of modes cannot be confused, and the information immediately available to the user is limited to that related to the currently selected set of modes.

DESCRIPTION OF THE ACCOMPANYING DRAWINGS

Figure 3:
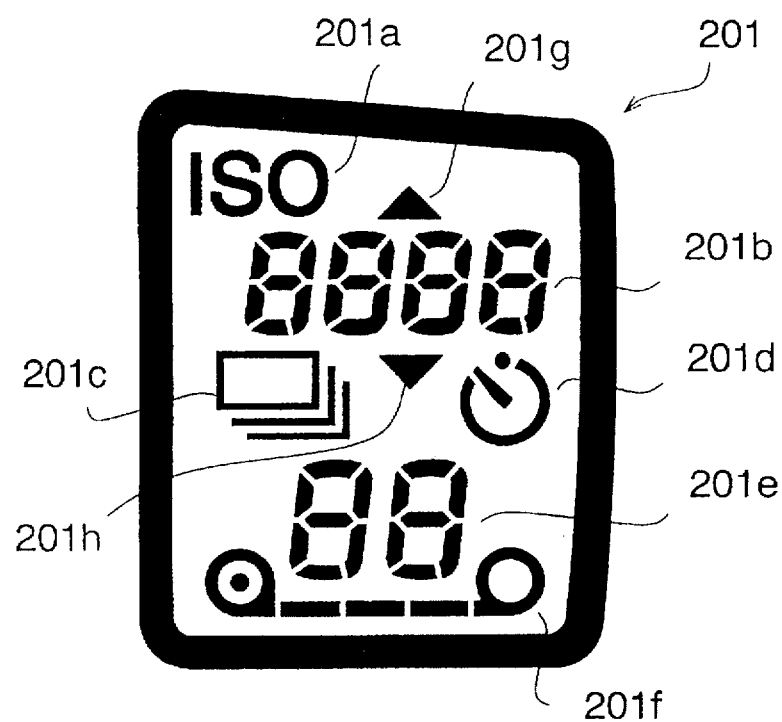
Figure 4:
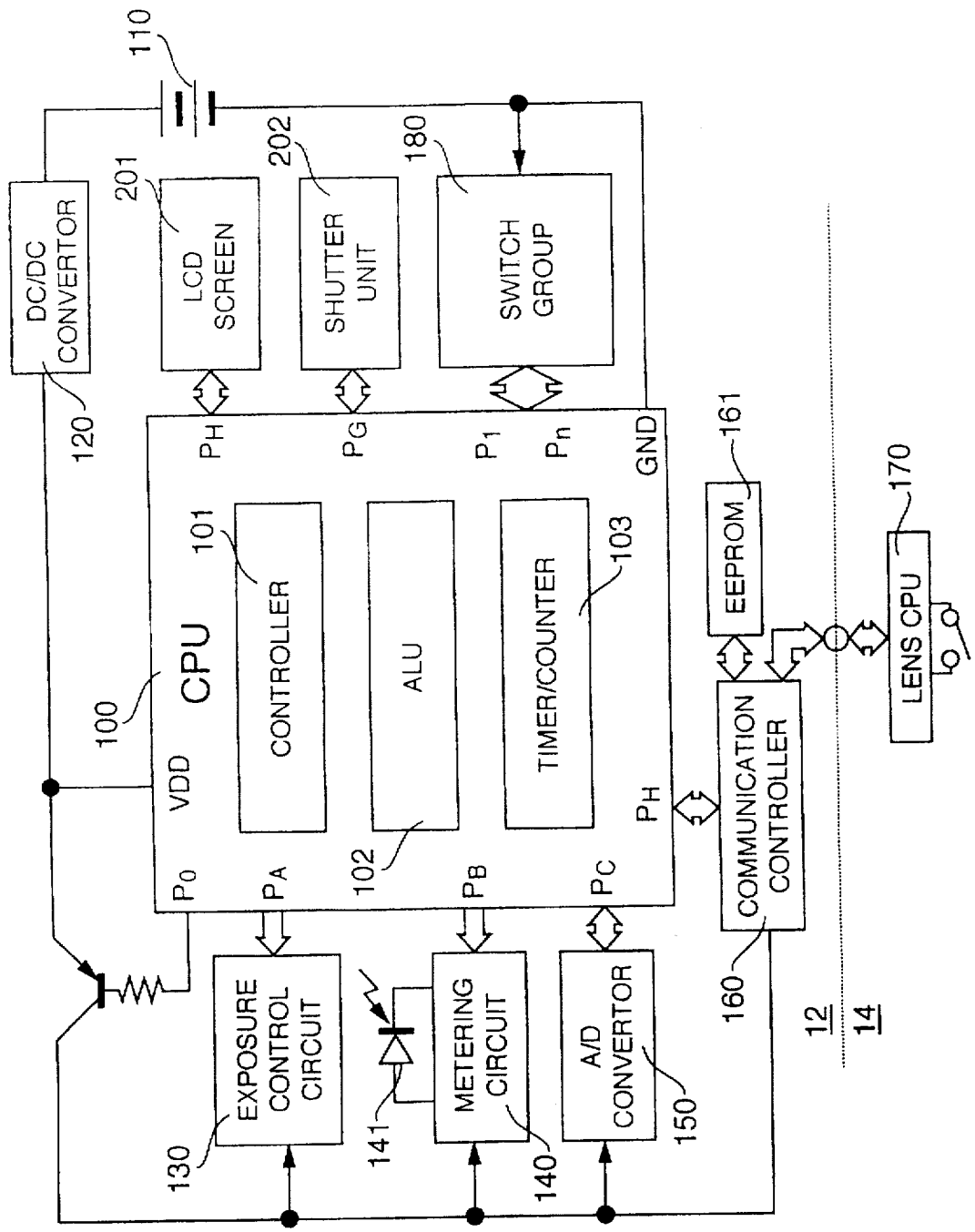
Figure 5:
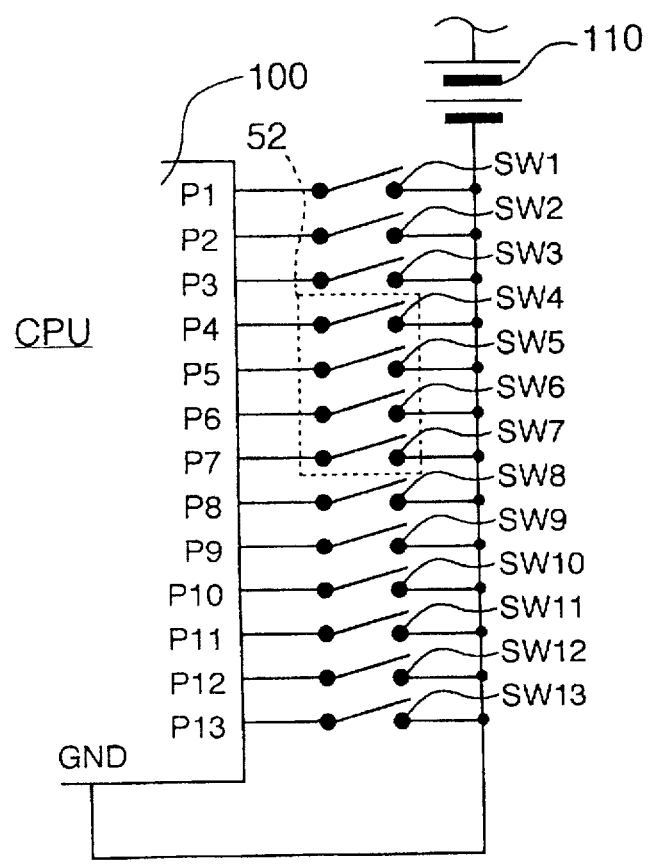
Figure 6:
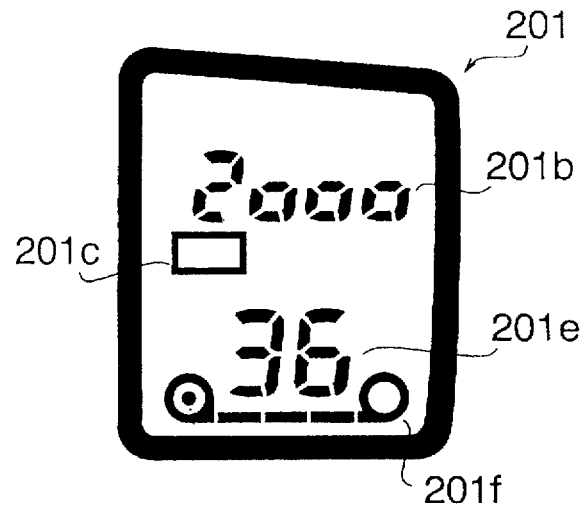
Figure 7:
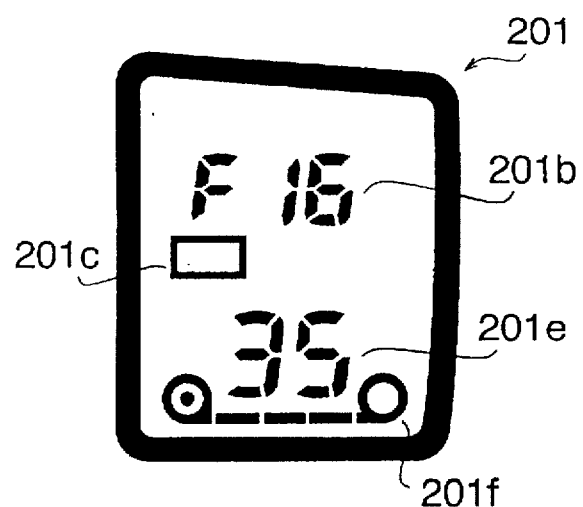
Figure 8:
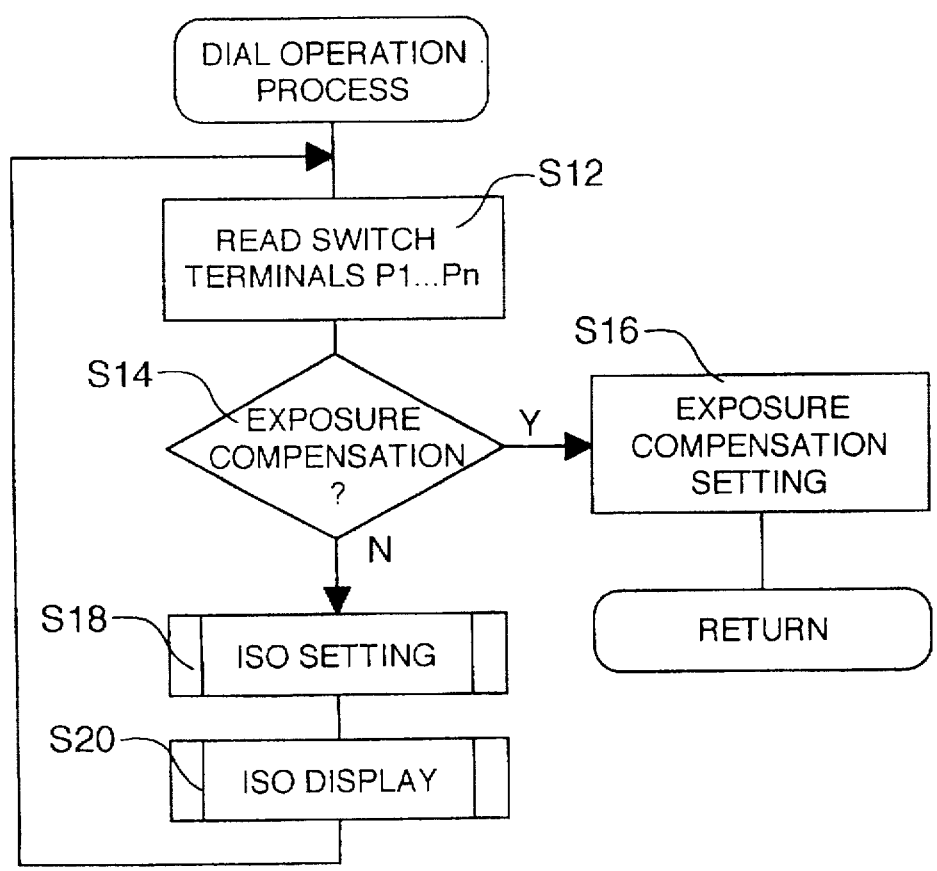
Figure 9:
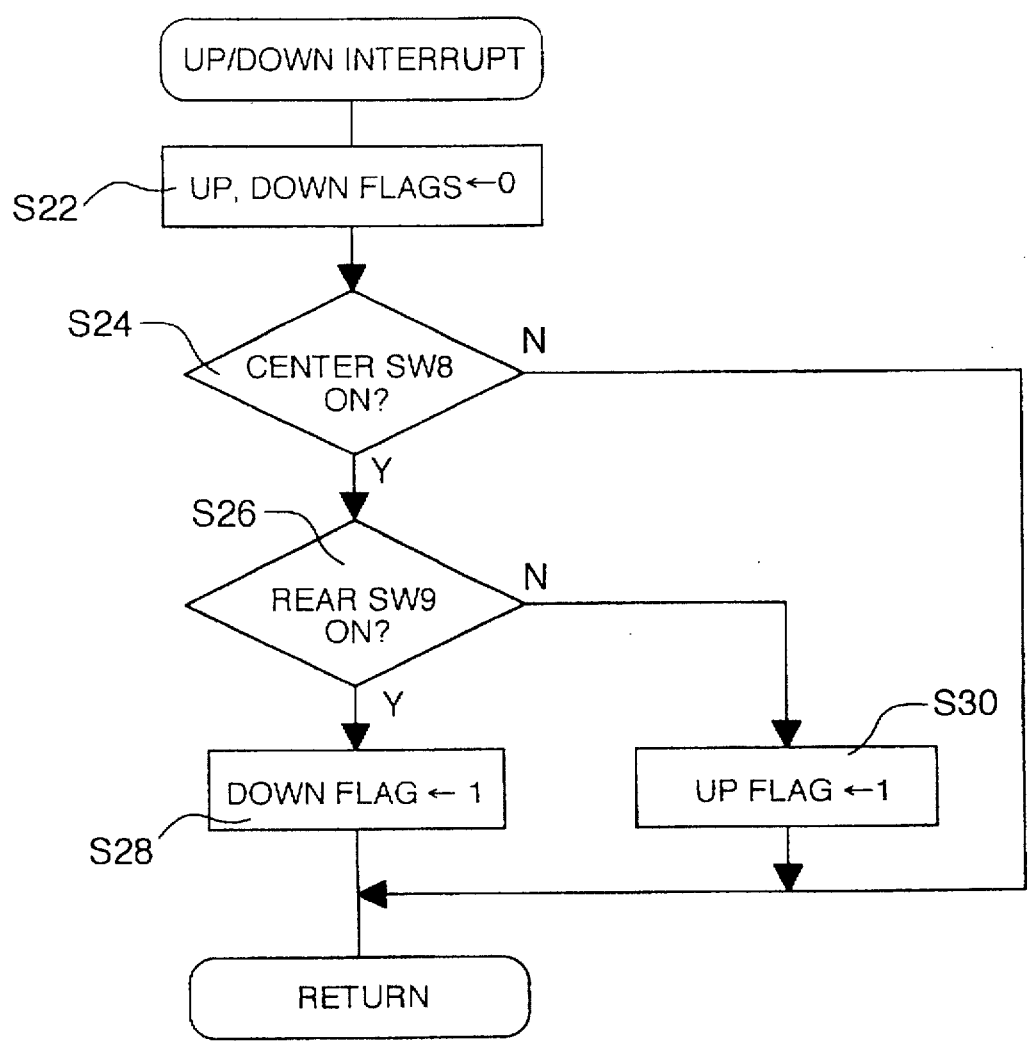
Figure 10:
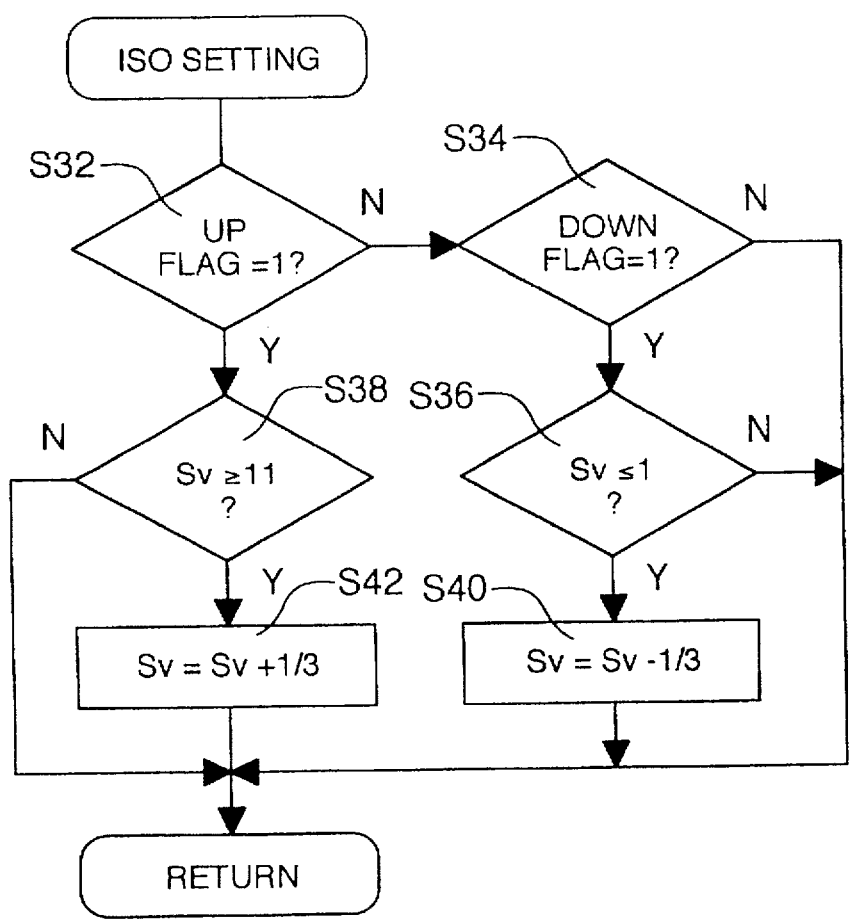
Figure 11:
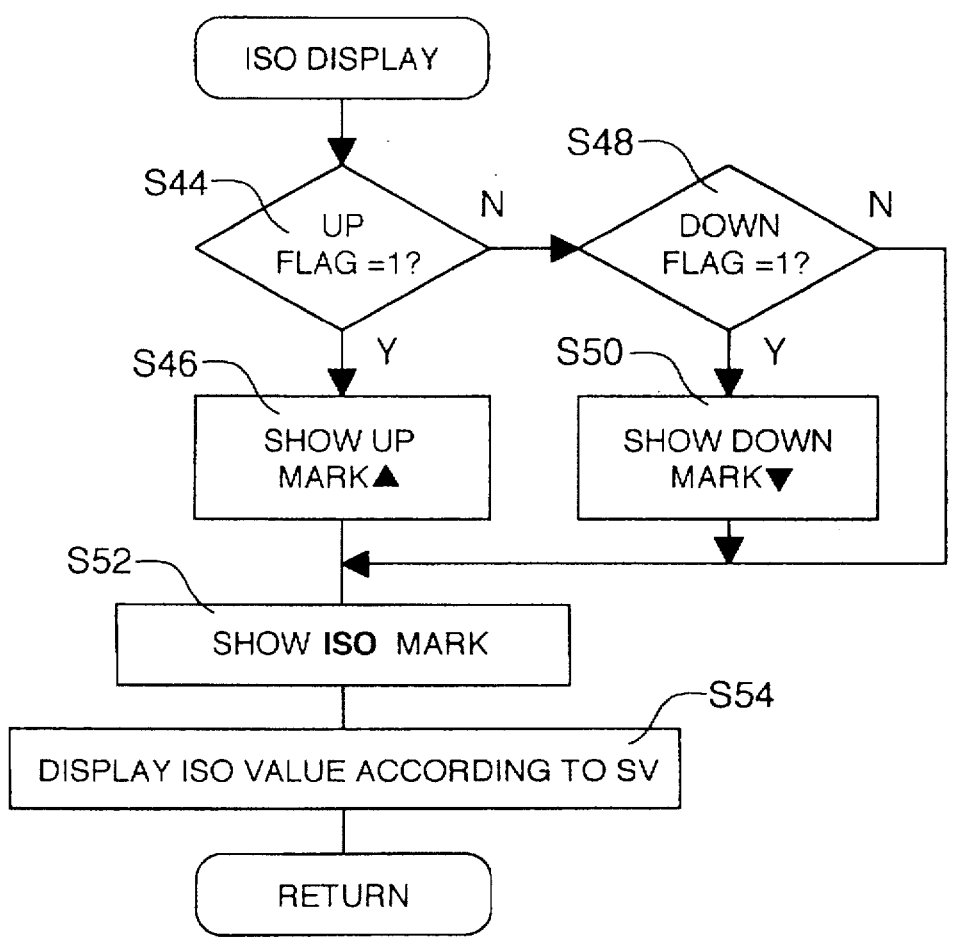
Figure 12:
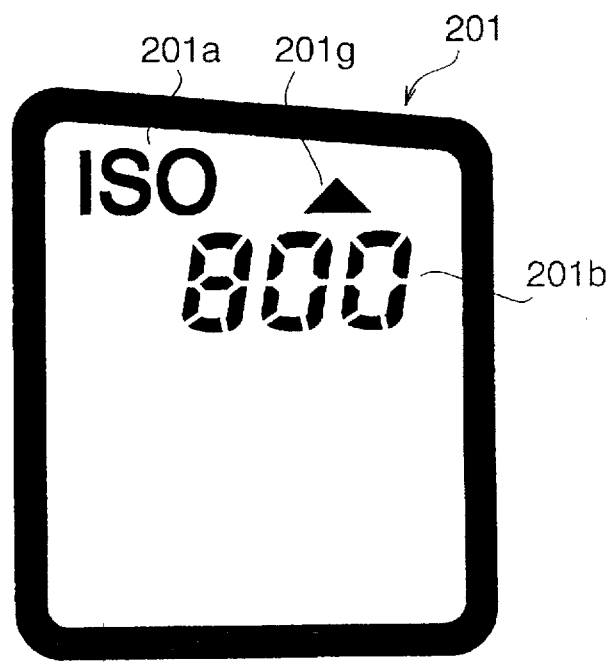
Figure 13:
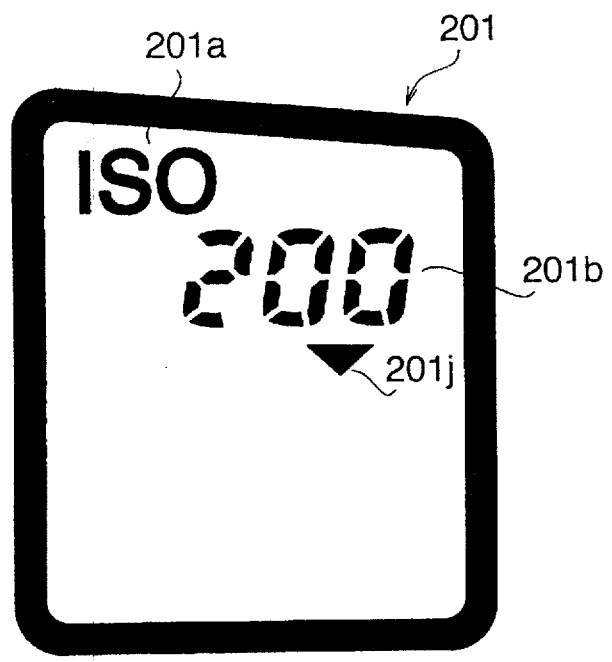
Figure 14:
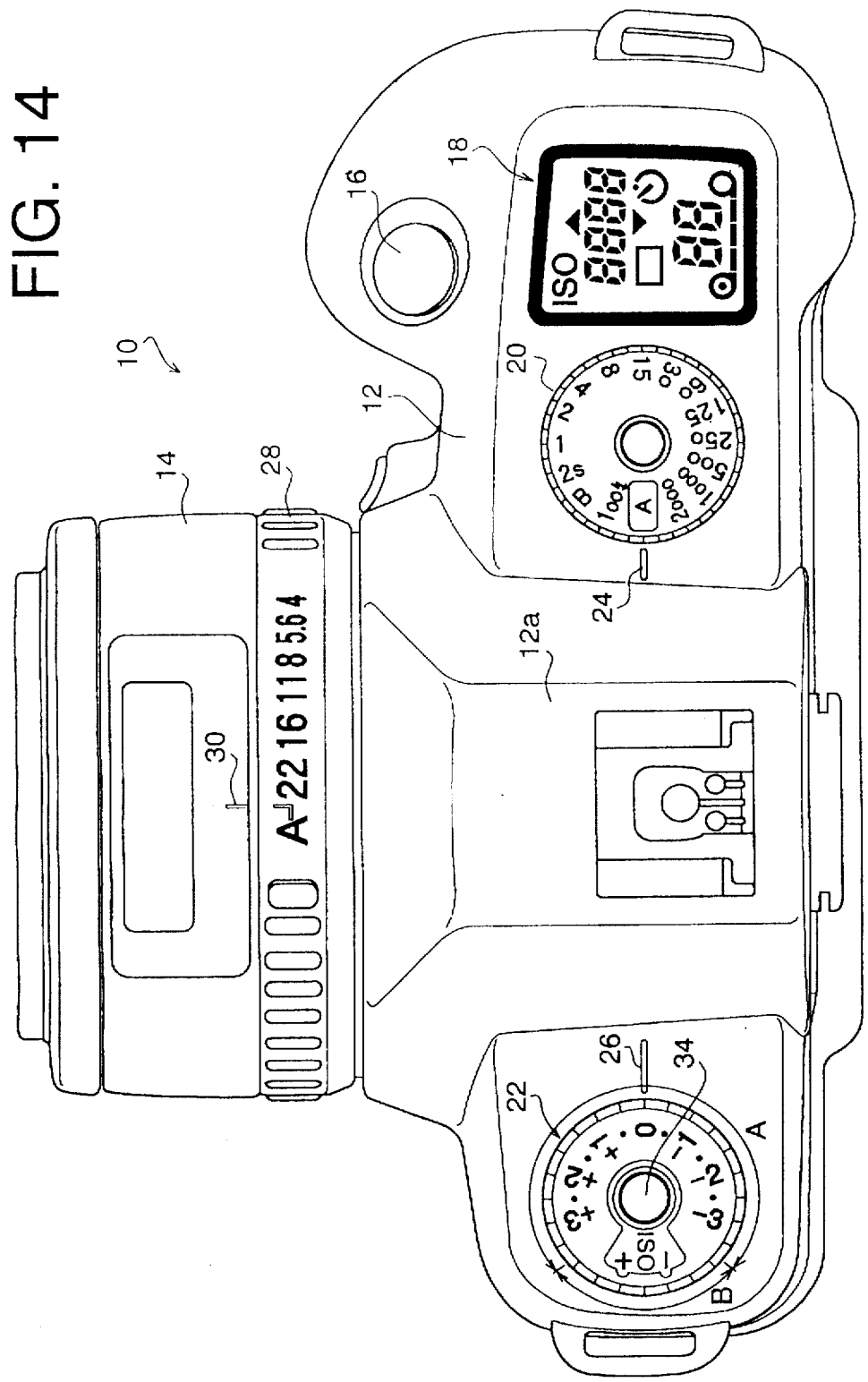
Figure 15:
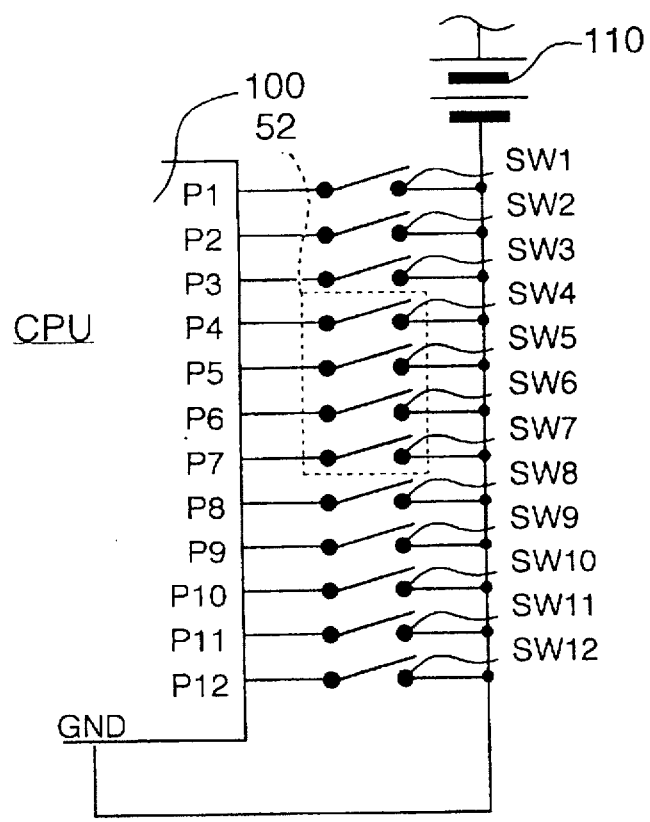
Figure 16:
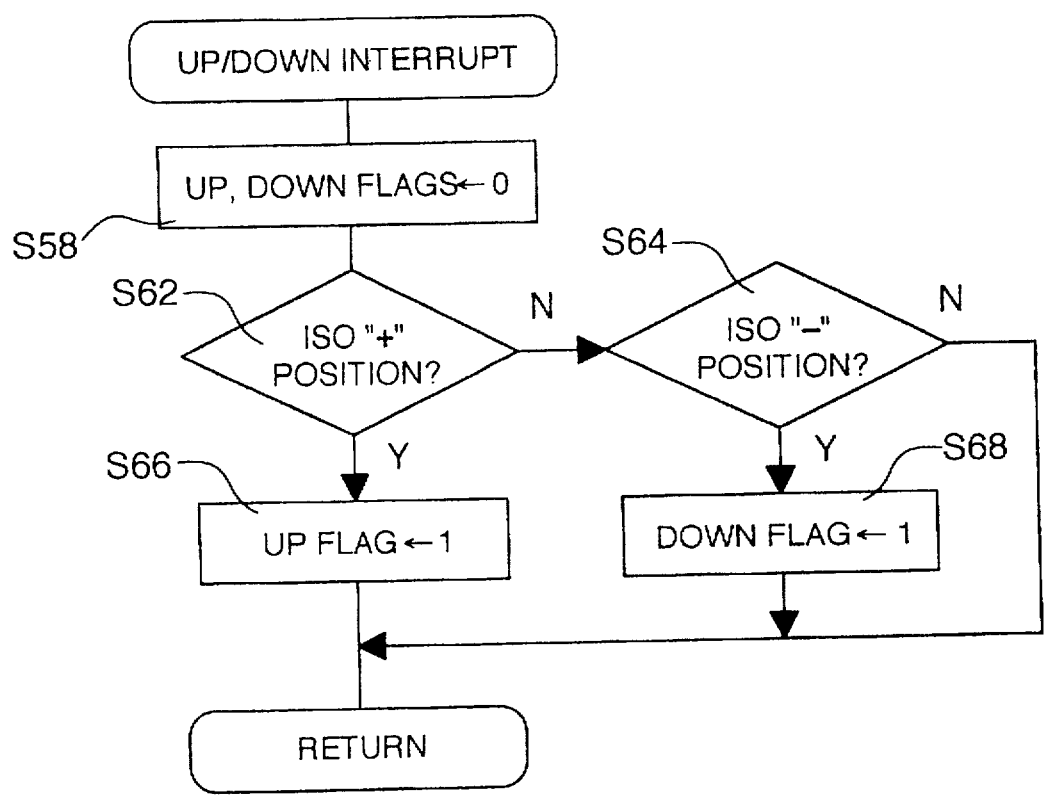
Figure 17:
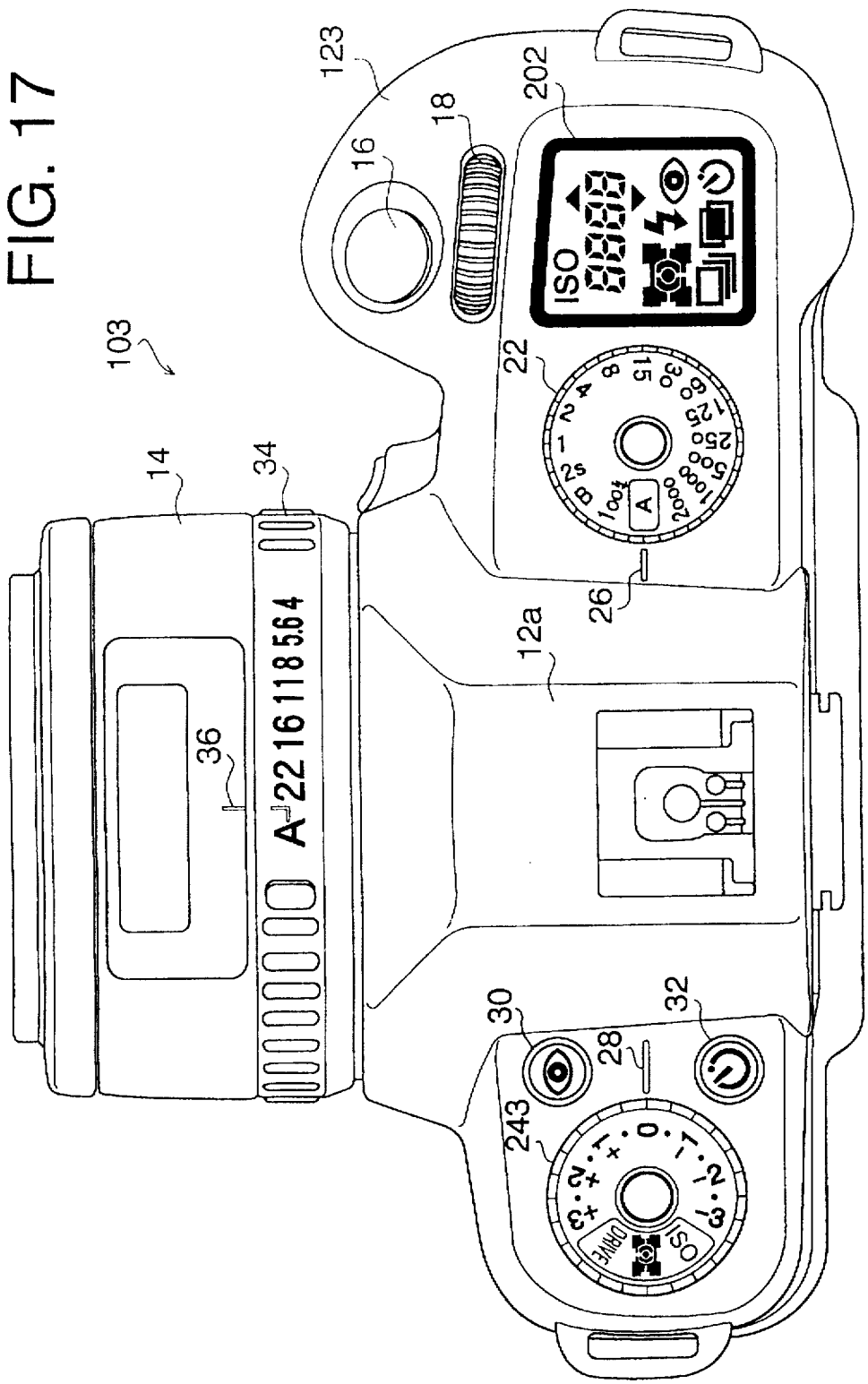
Figure 18:
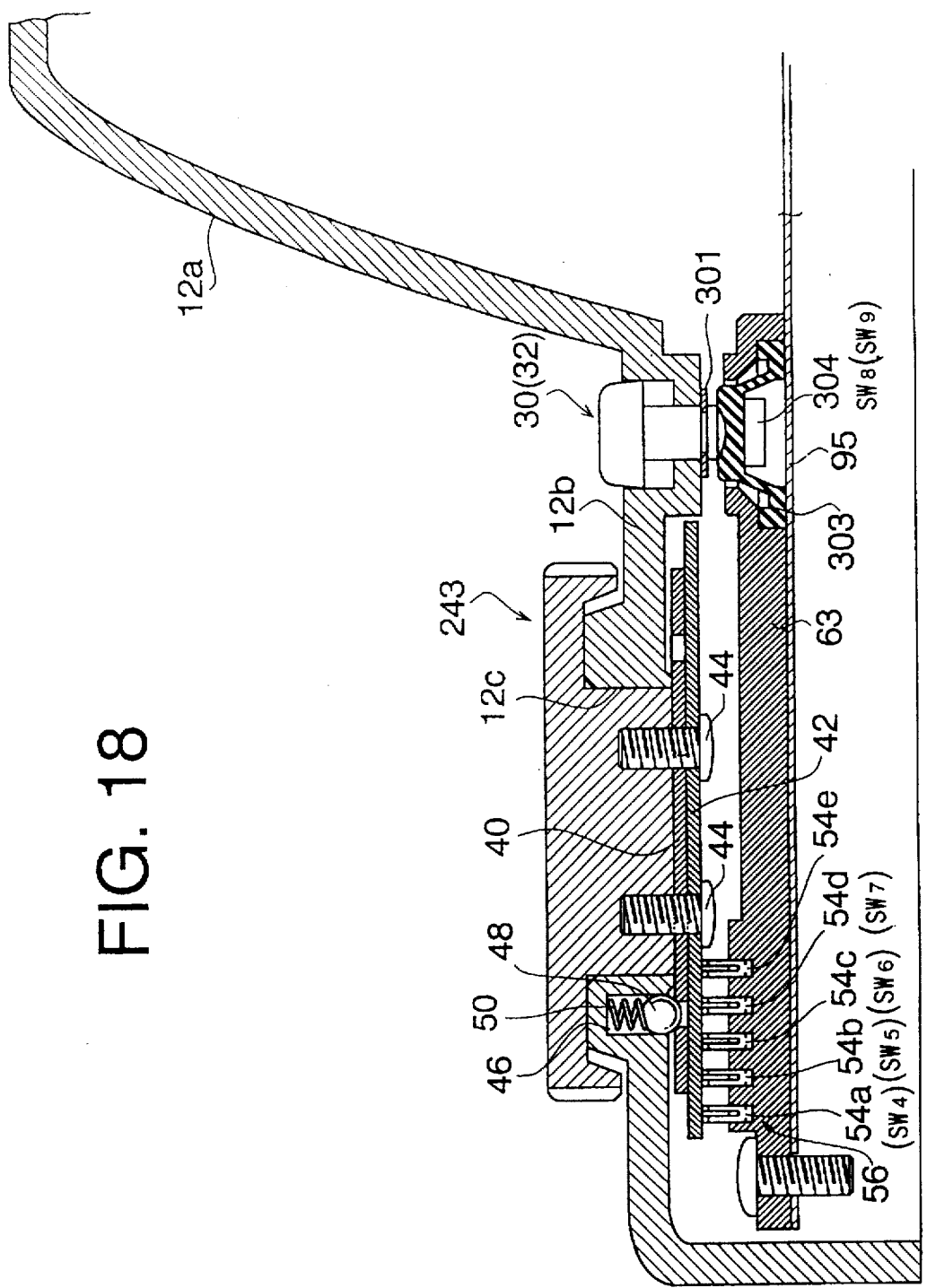
Figure 19:
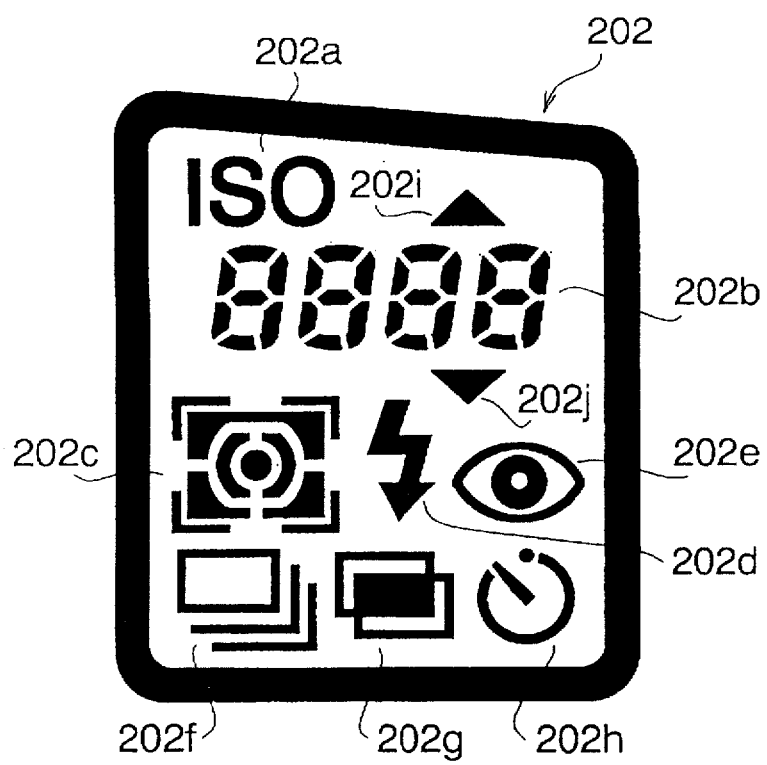
Figure 20:
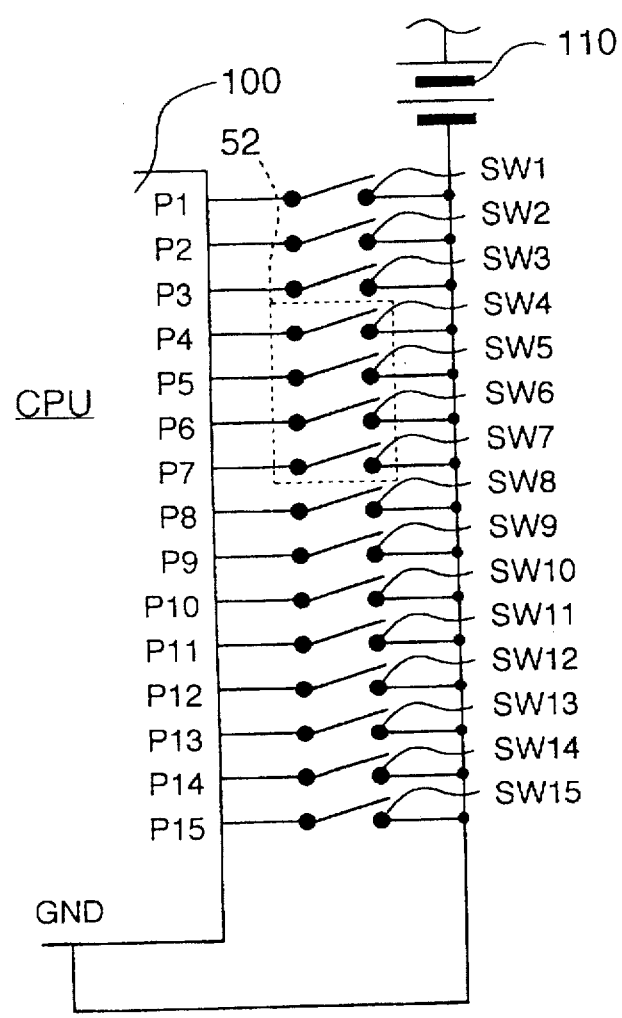
Figure 21:
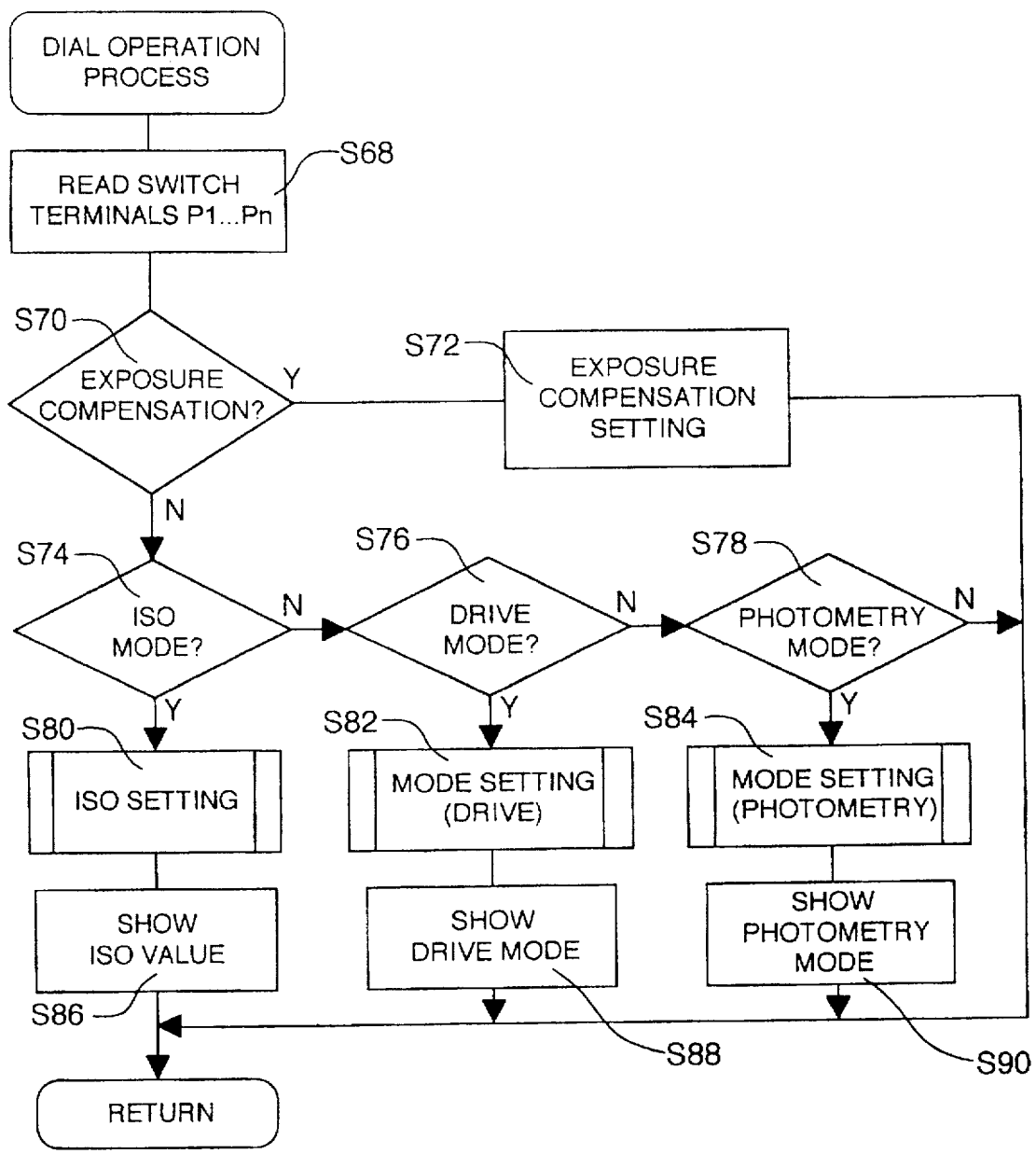
Figure 22:
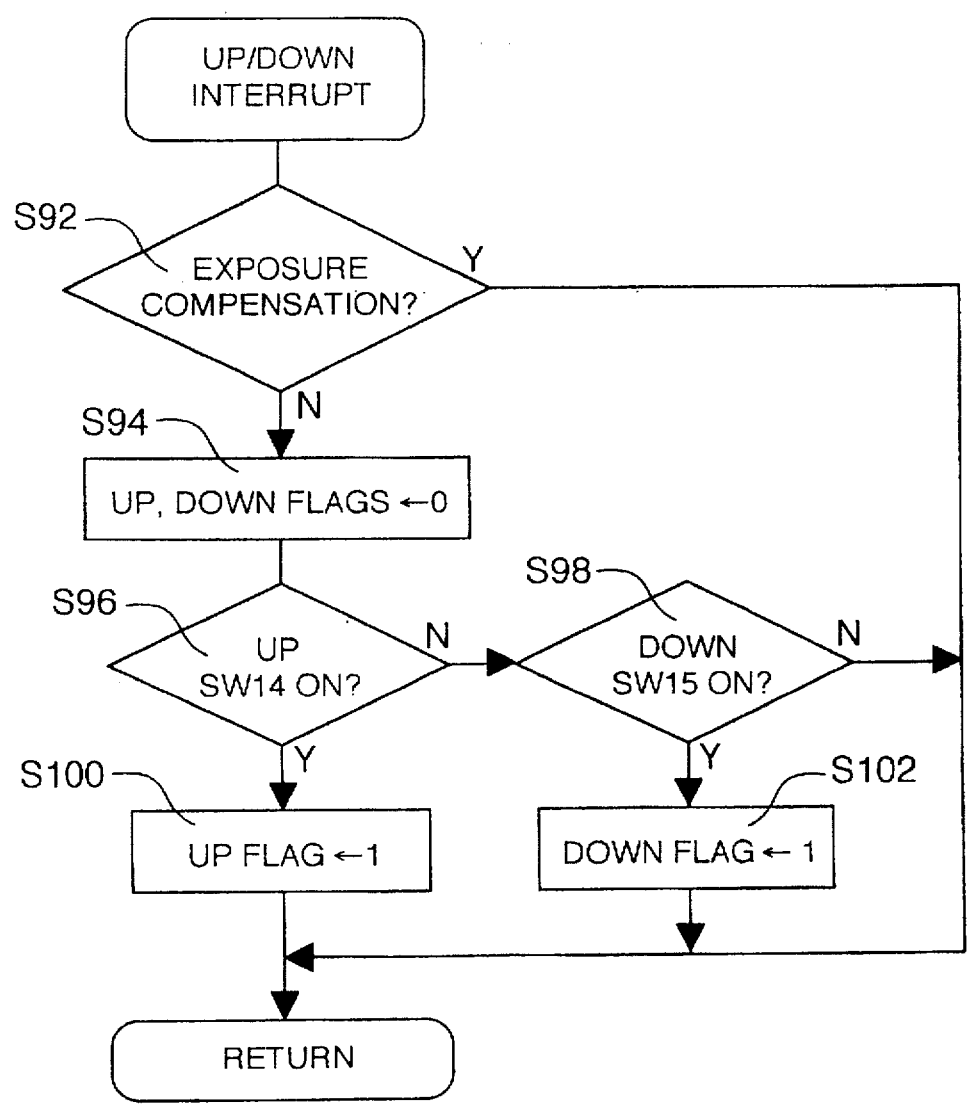
Figure 23:
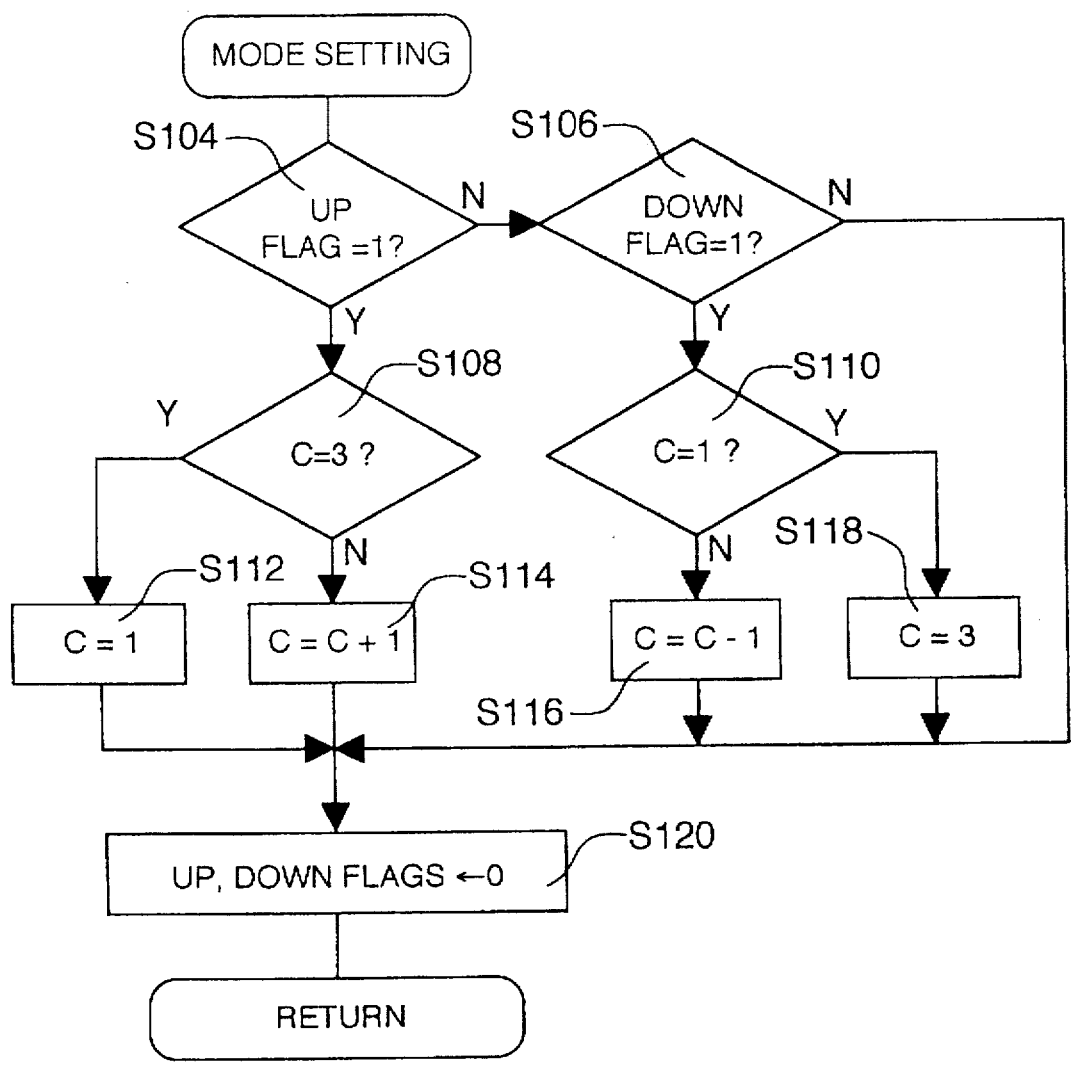
Figures 24, 25, 26:
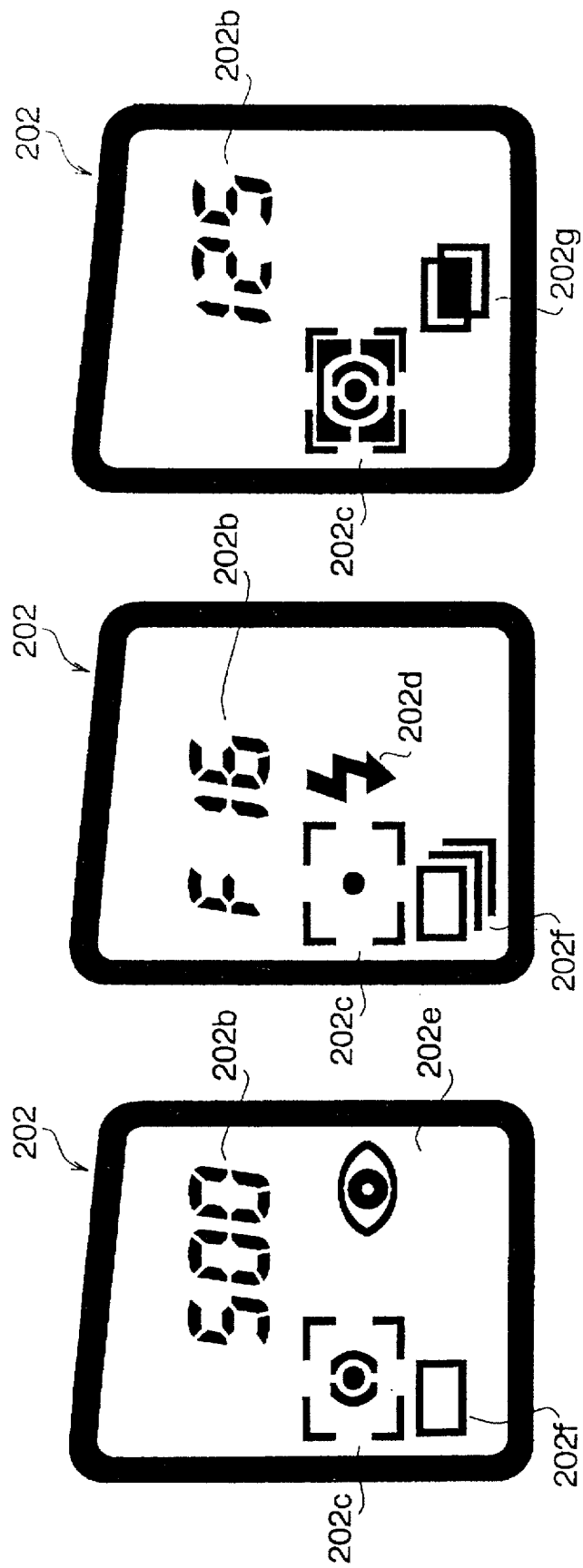
Figure 27:
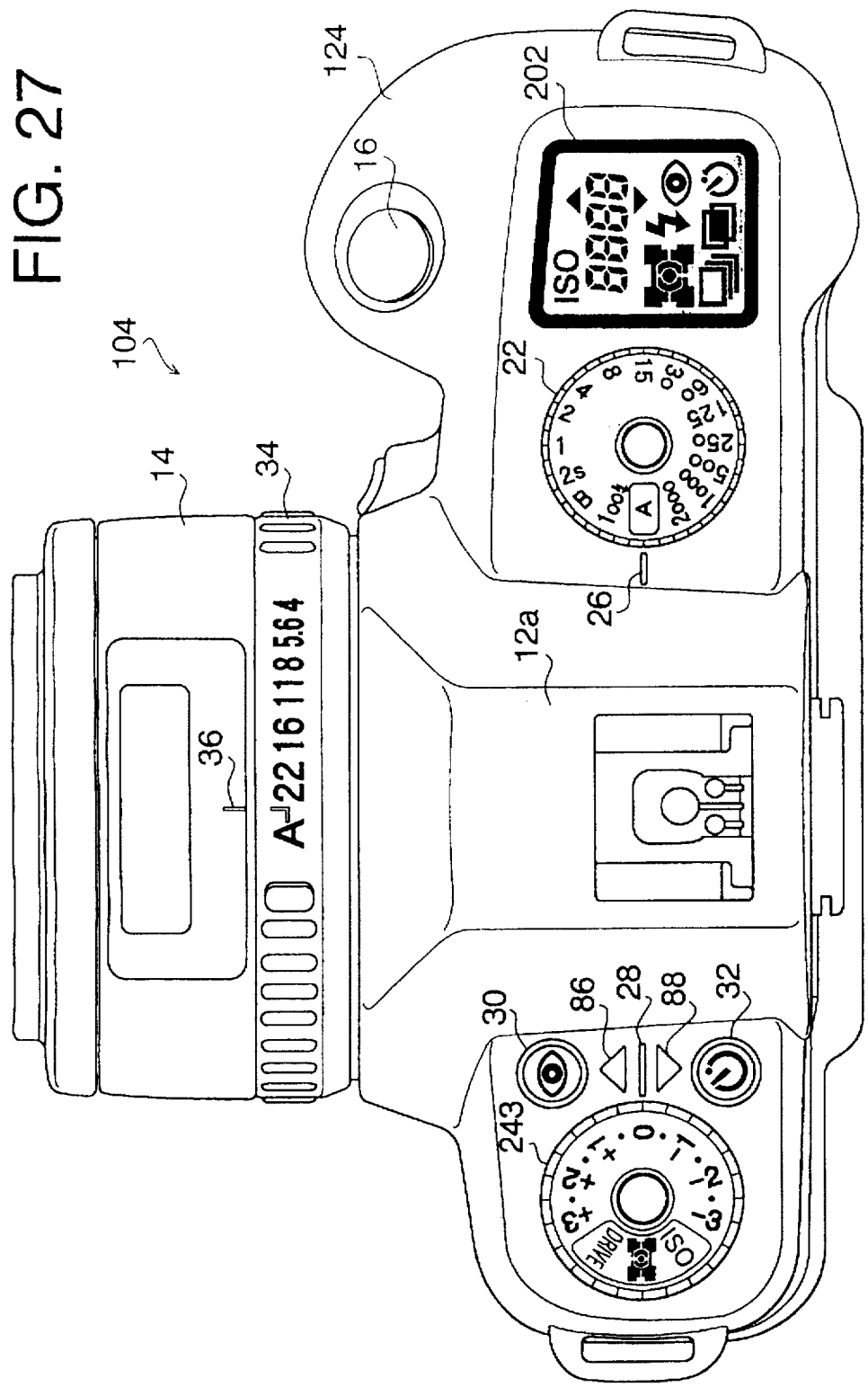
Figure 28:
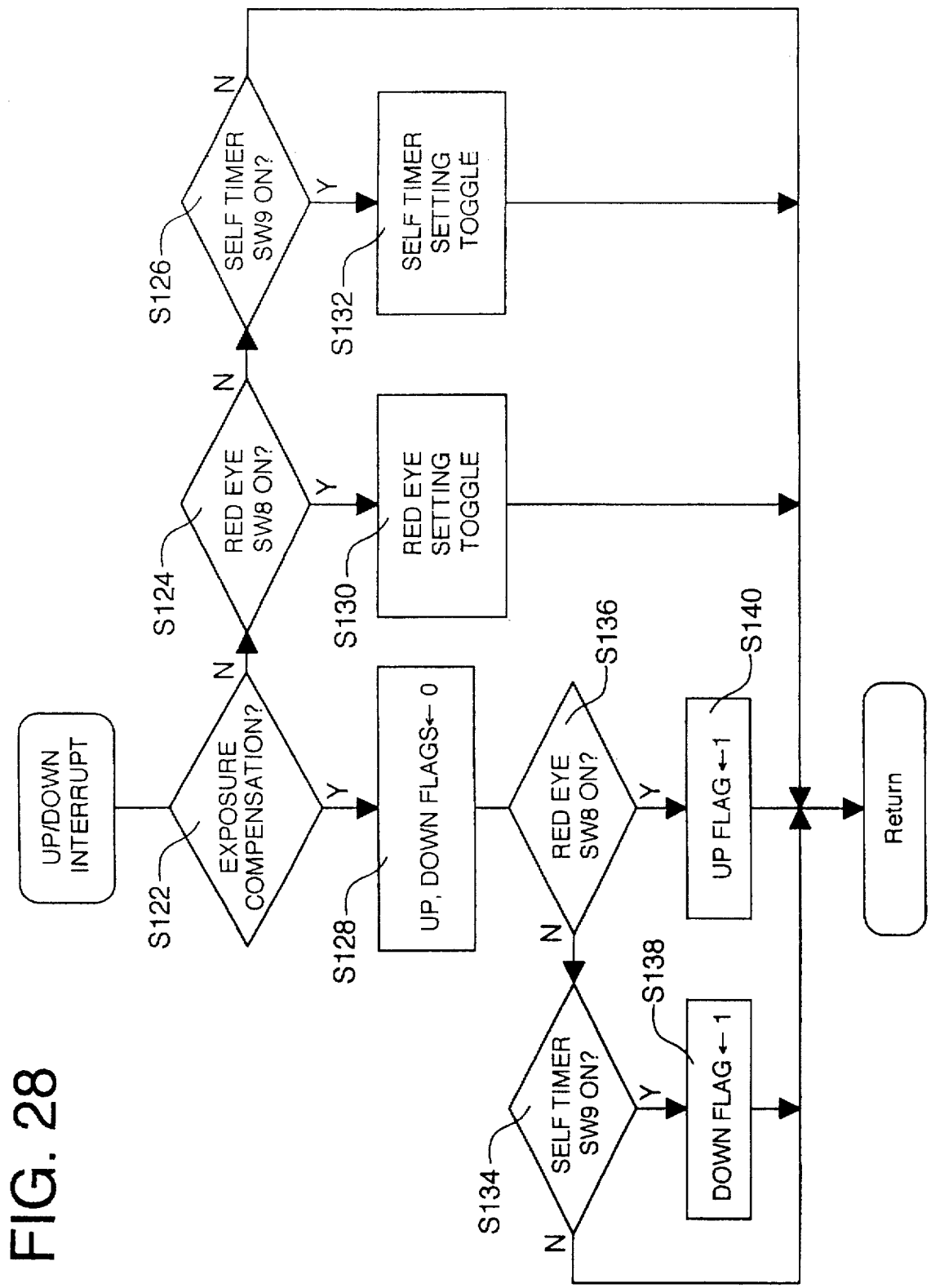
Figure 29:
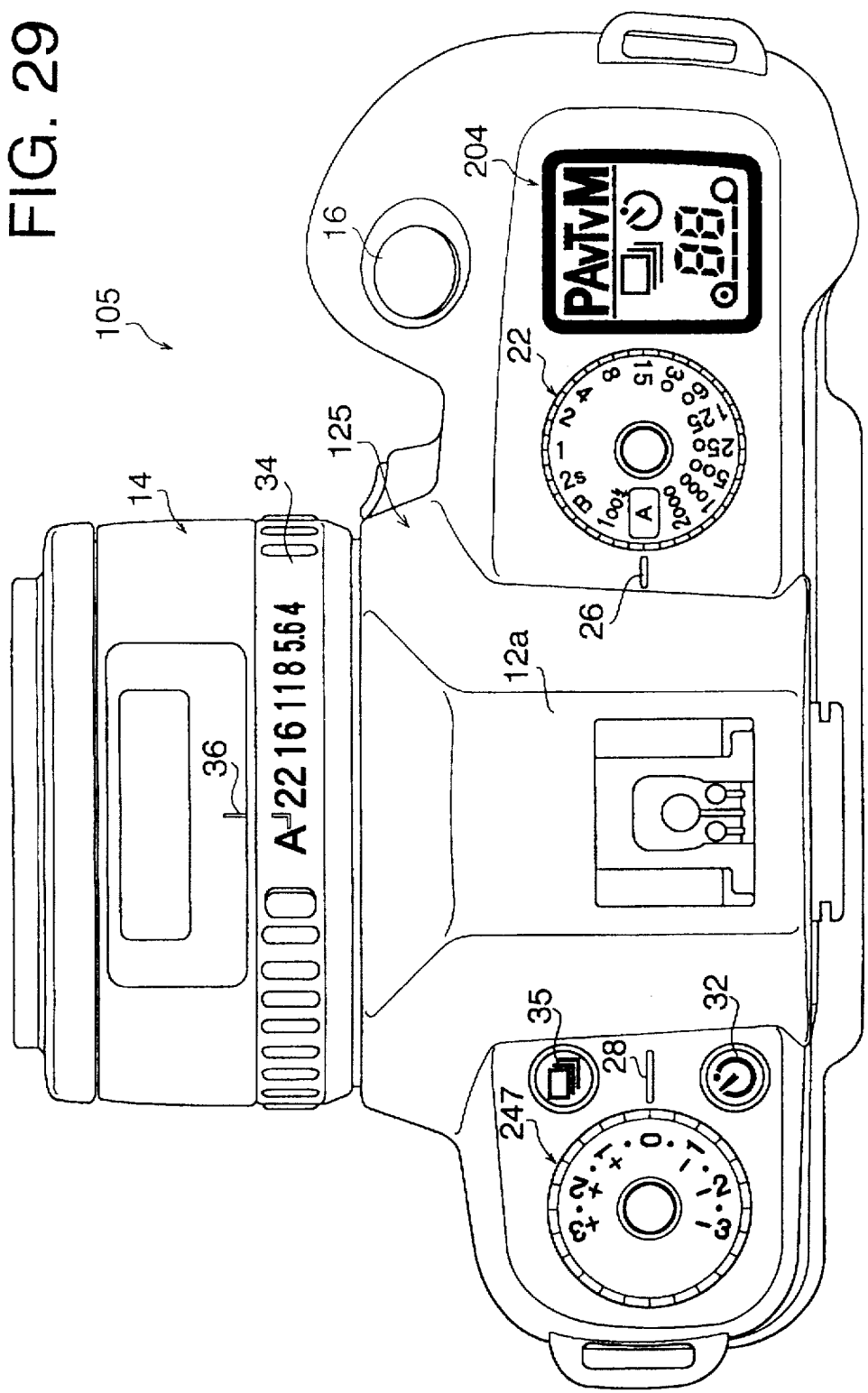
Figure 30:
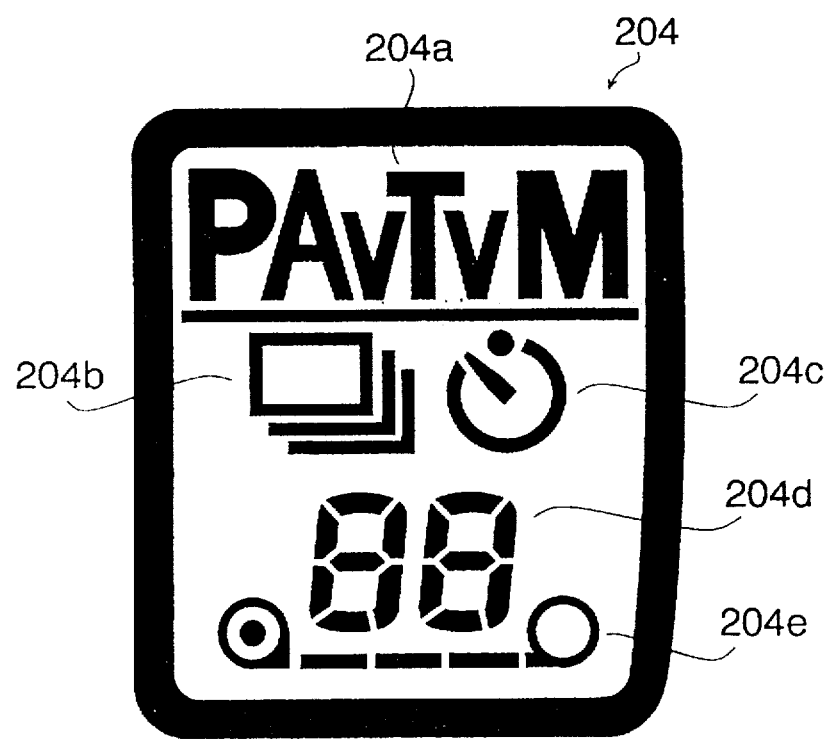
Figure 31:
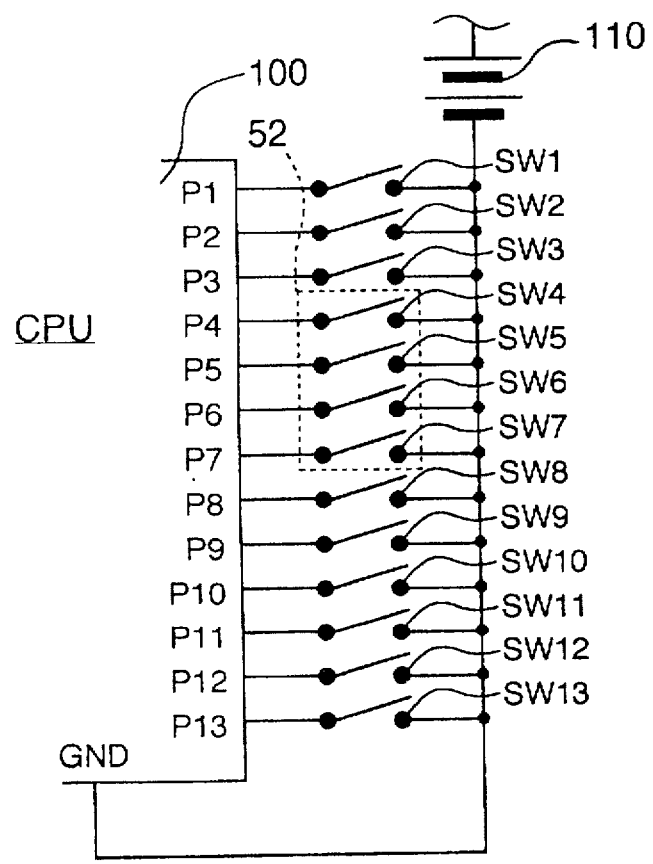
Figure 32:
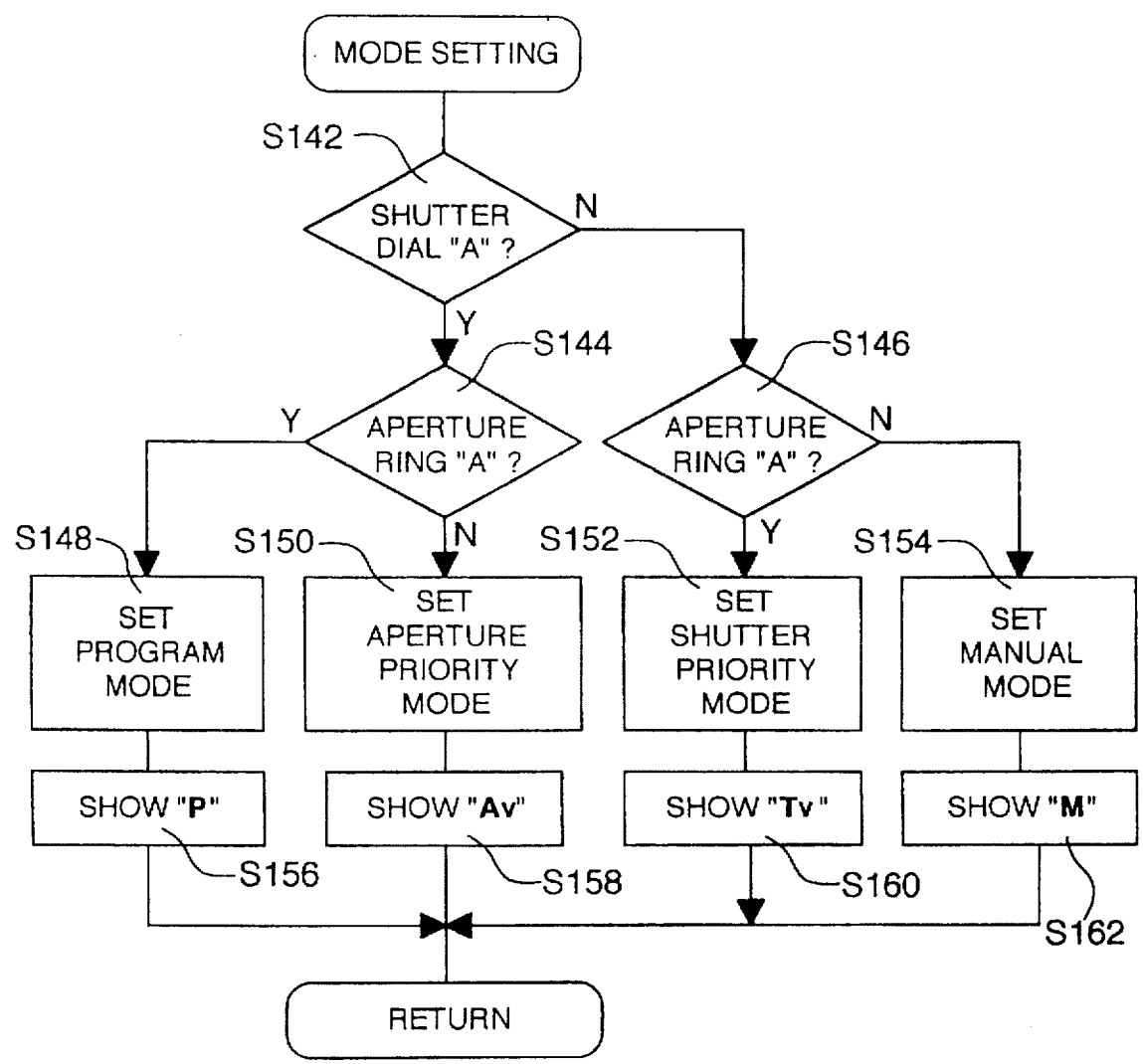
Figure 33:
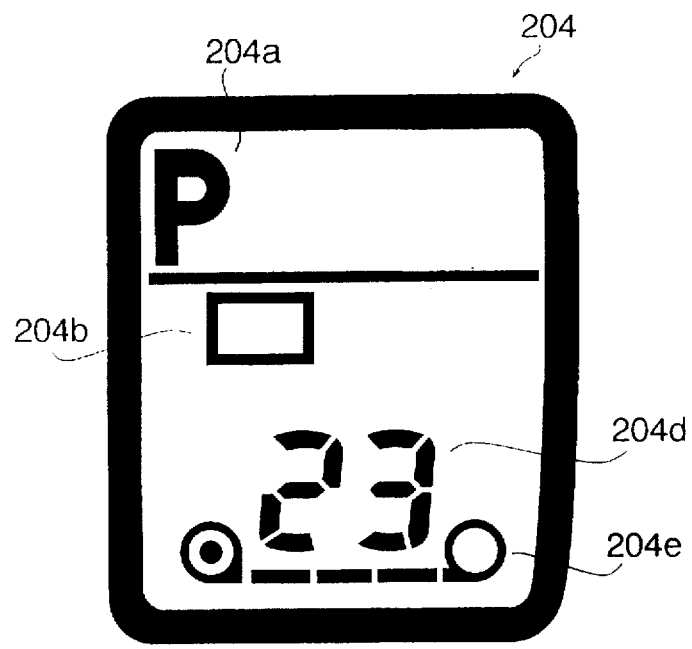
Figure 34:
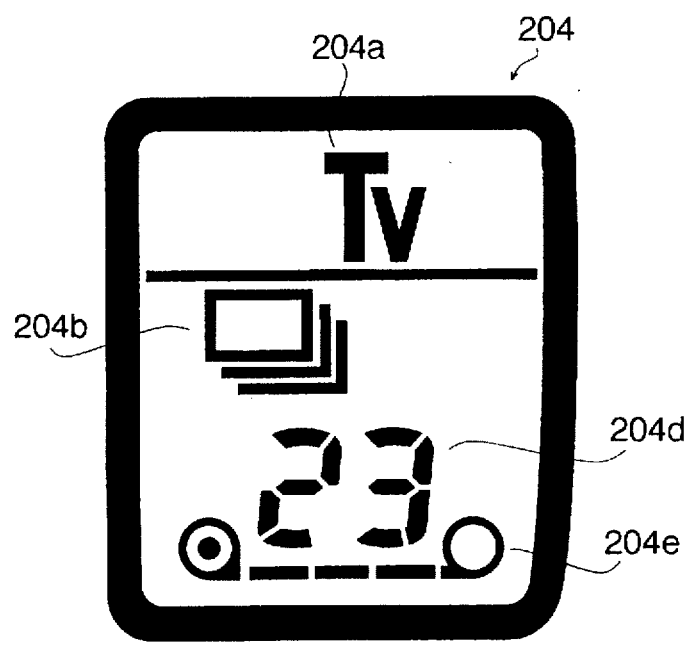
Figure 35:
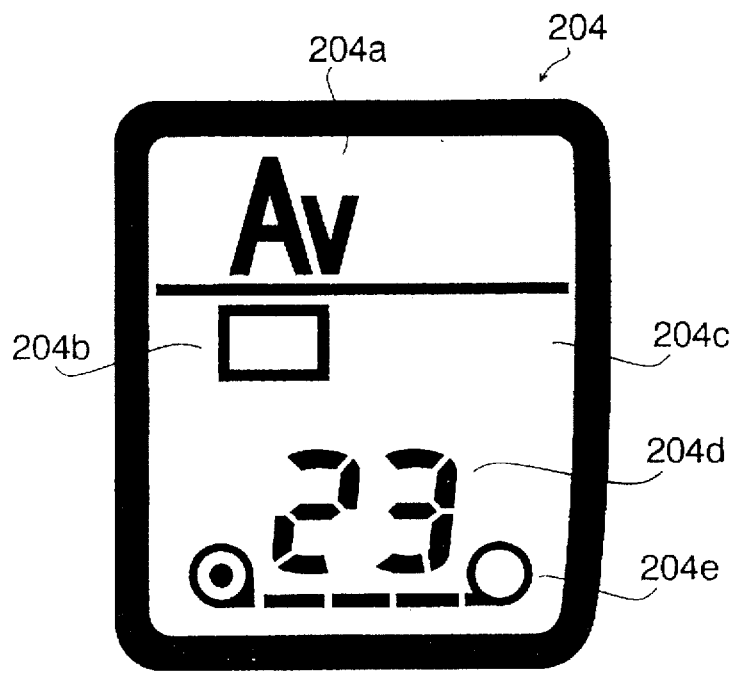
Figure 36:
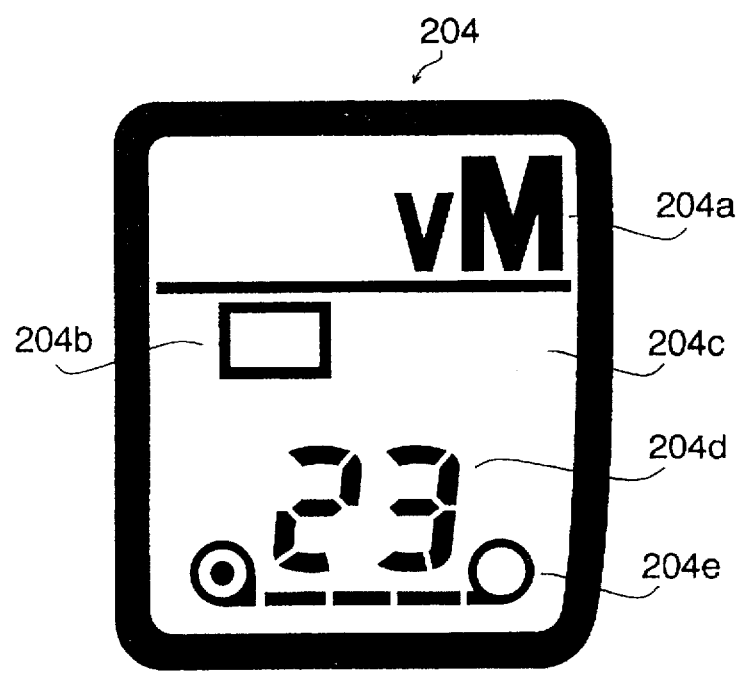
Figure 37:
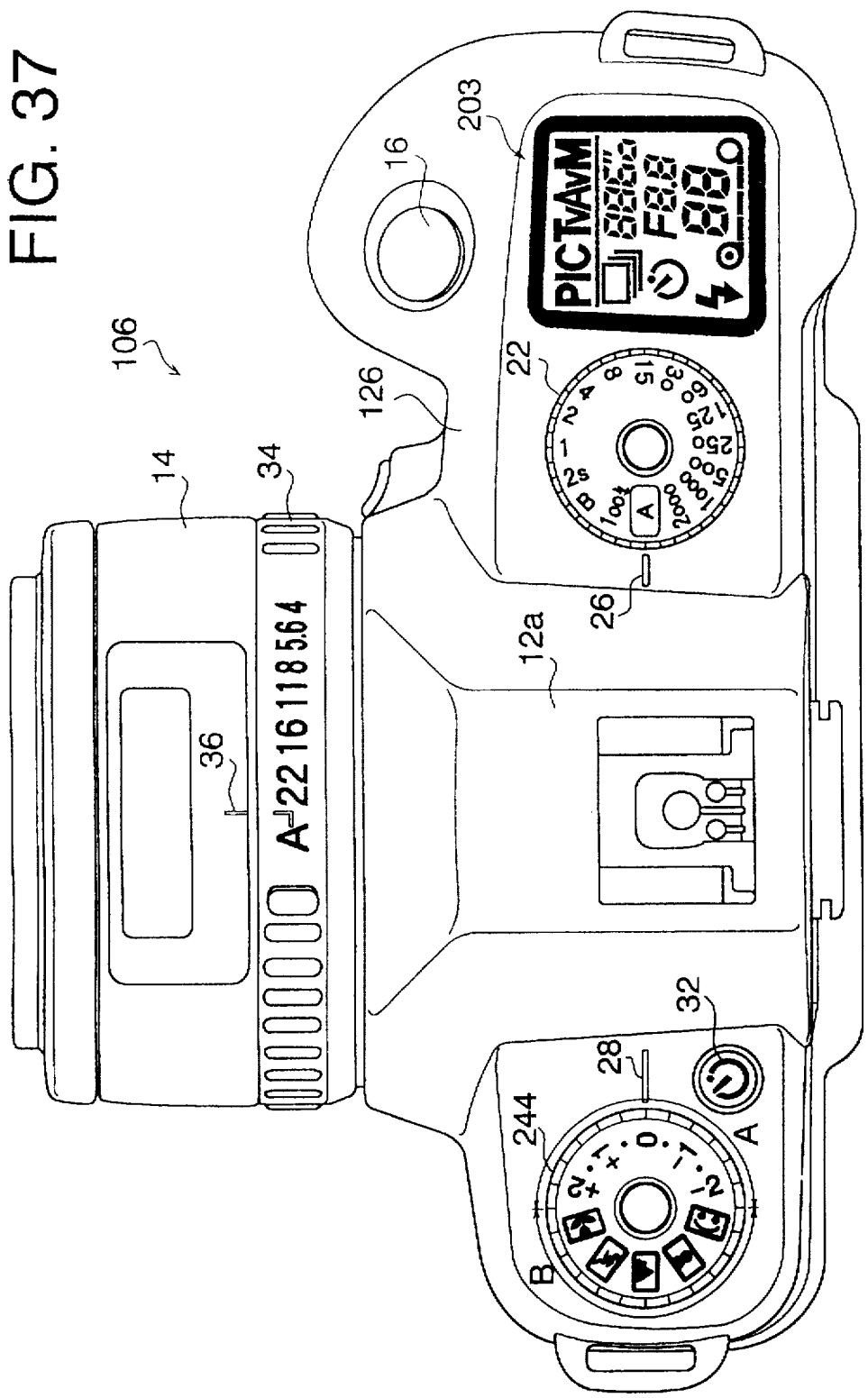
Figure 38:
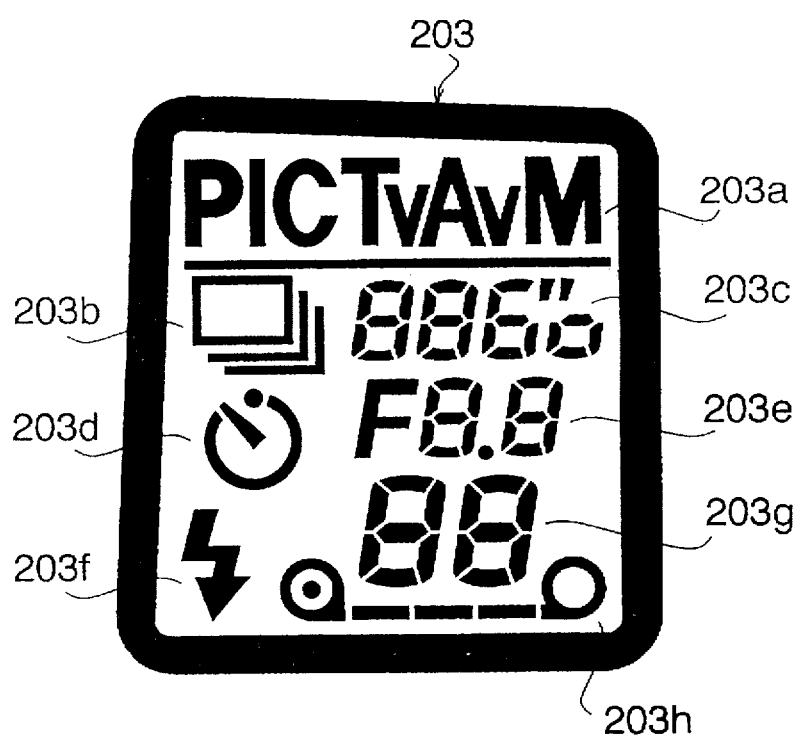
Figure 42:
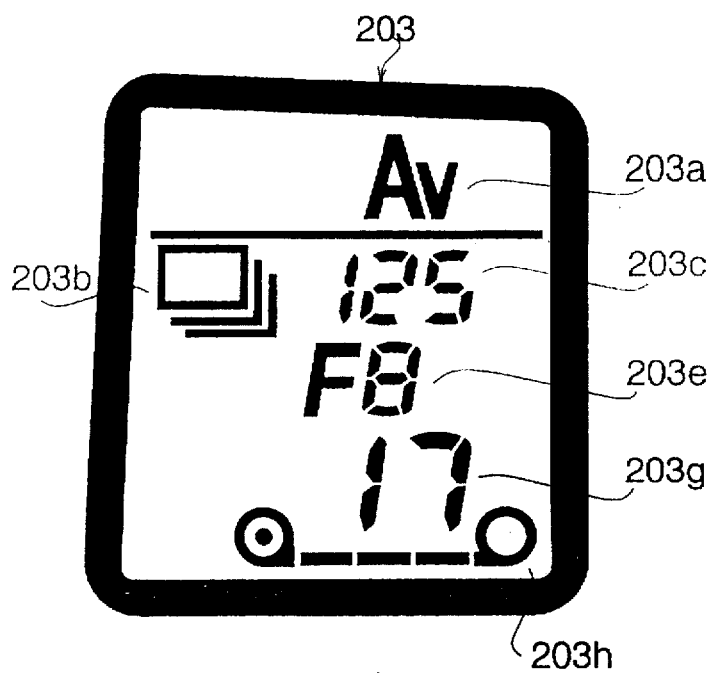
Figure 43:
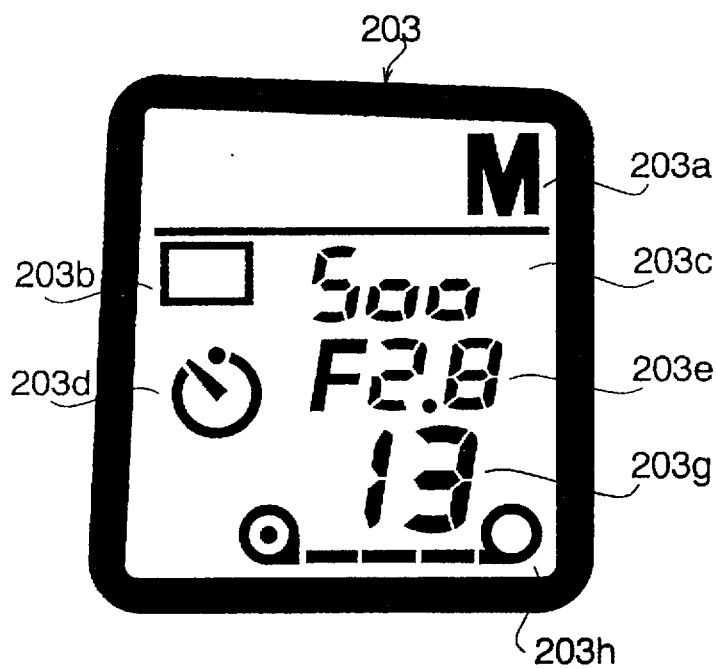
Figure 44:
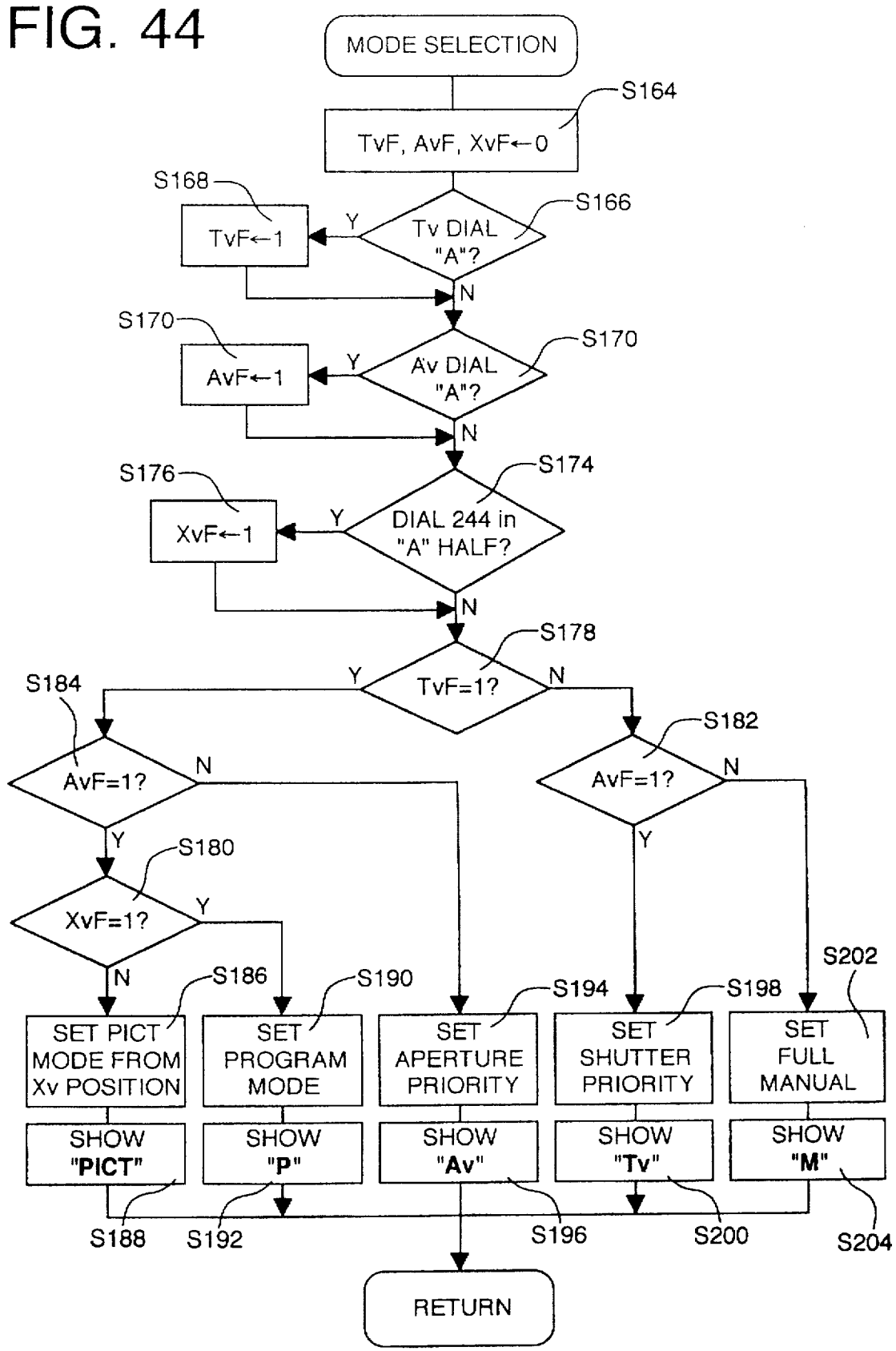
Figure 45:
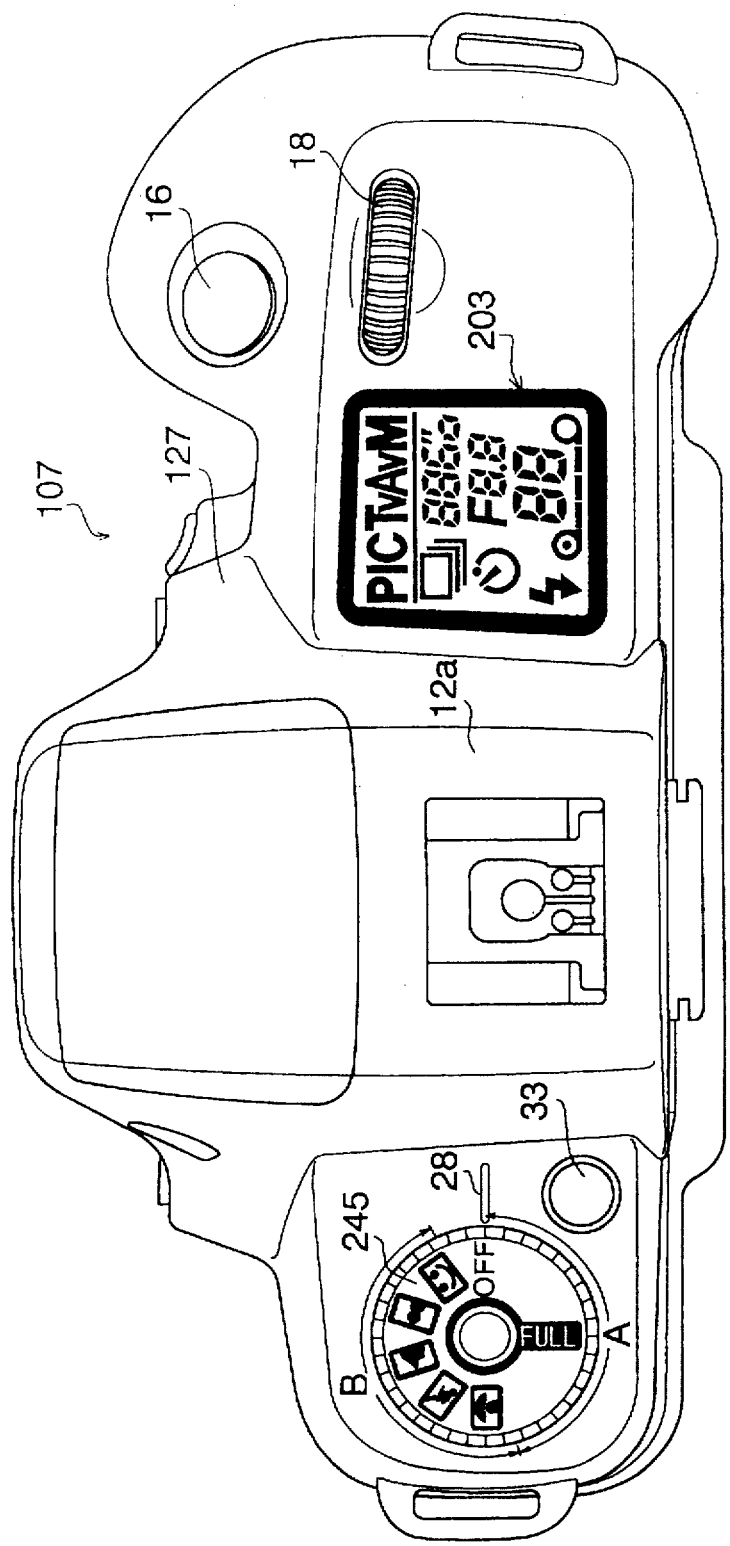
Figure 46:
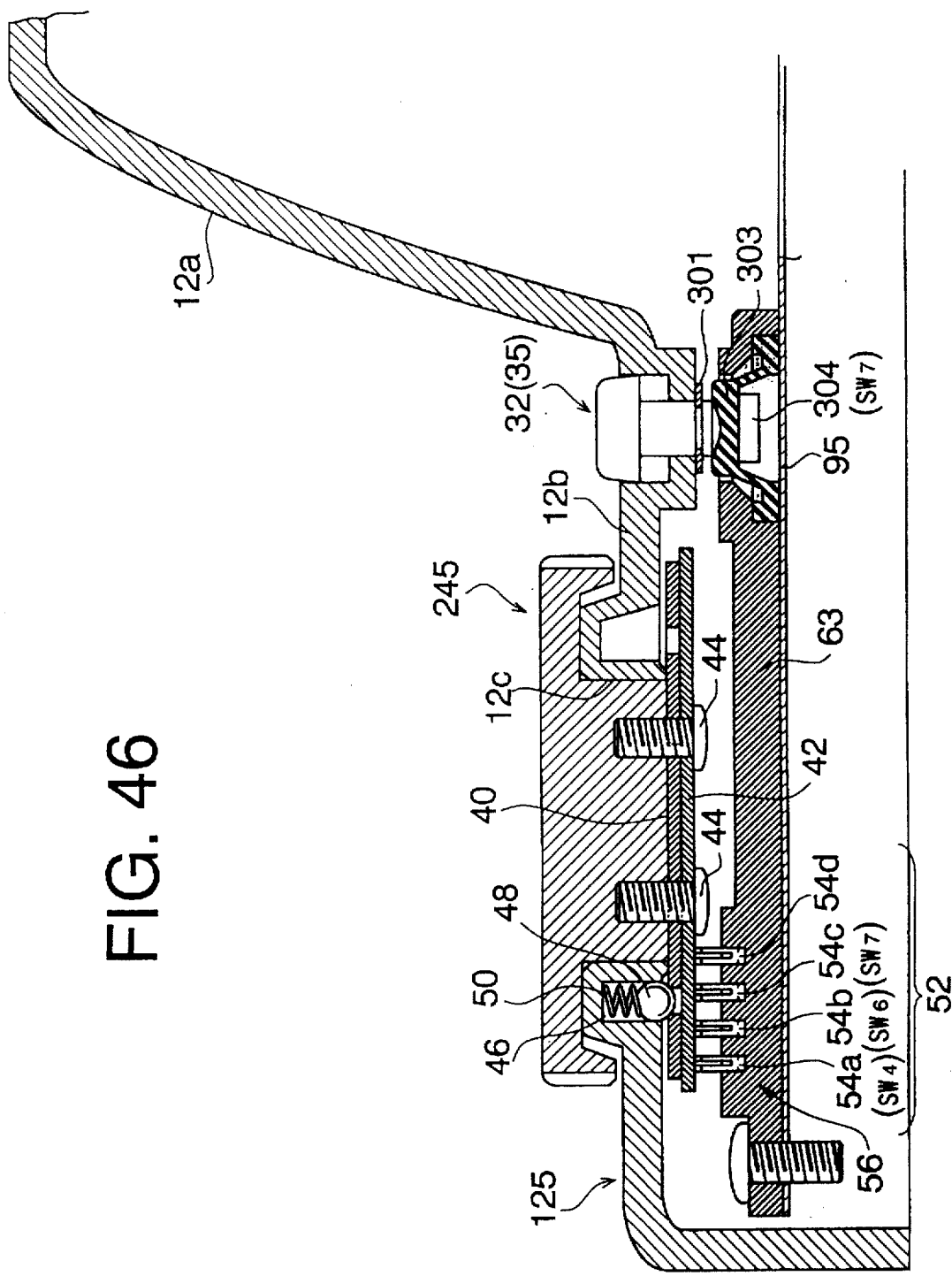
Figure 47:
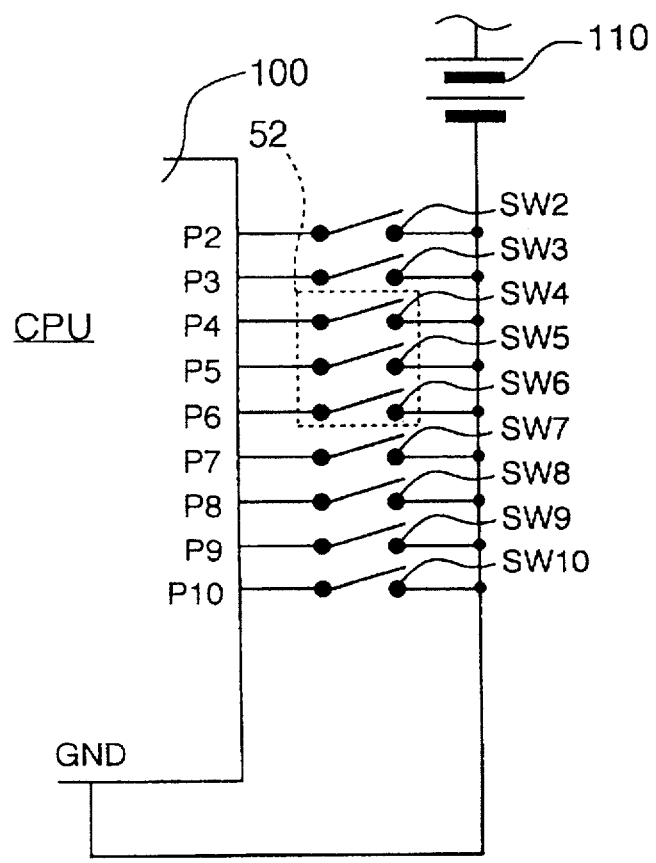
Figure 48:
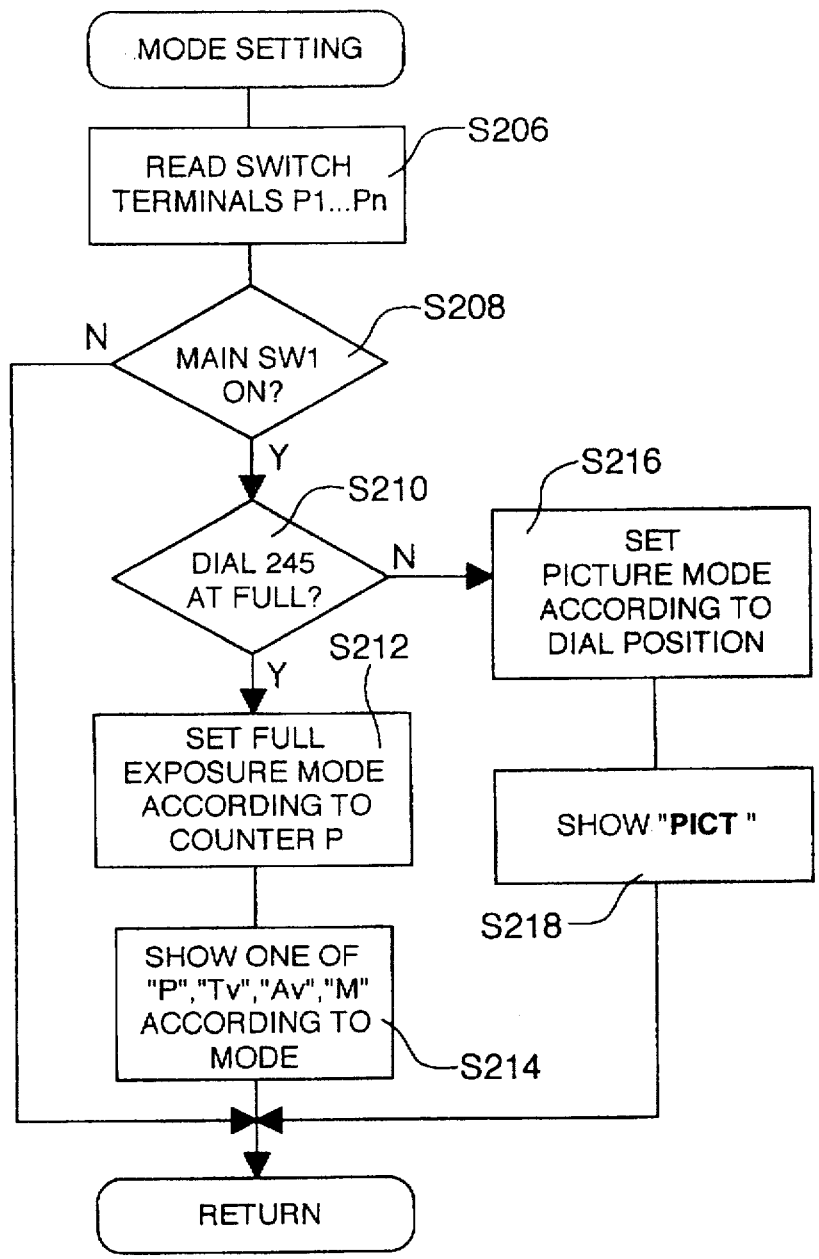
Figure 49:
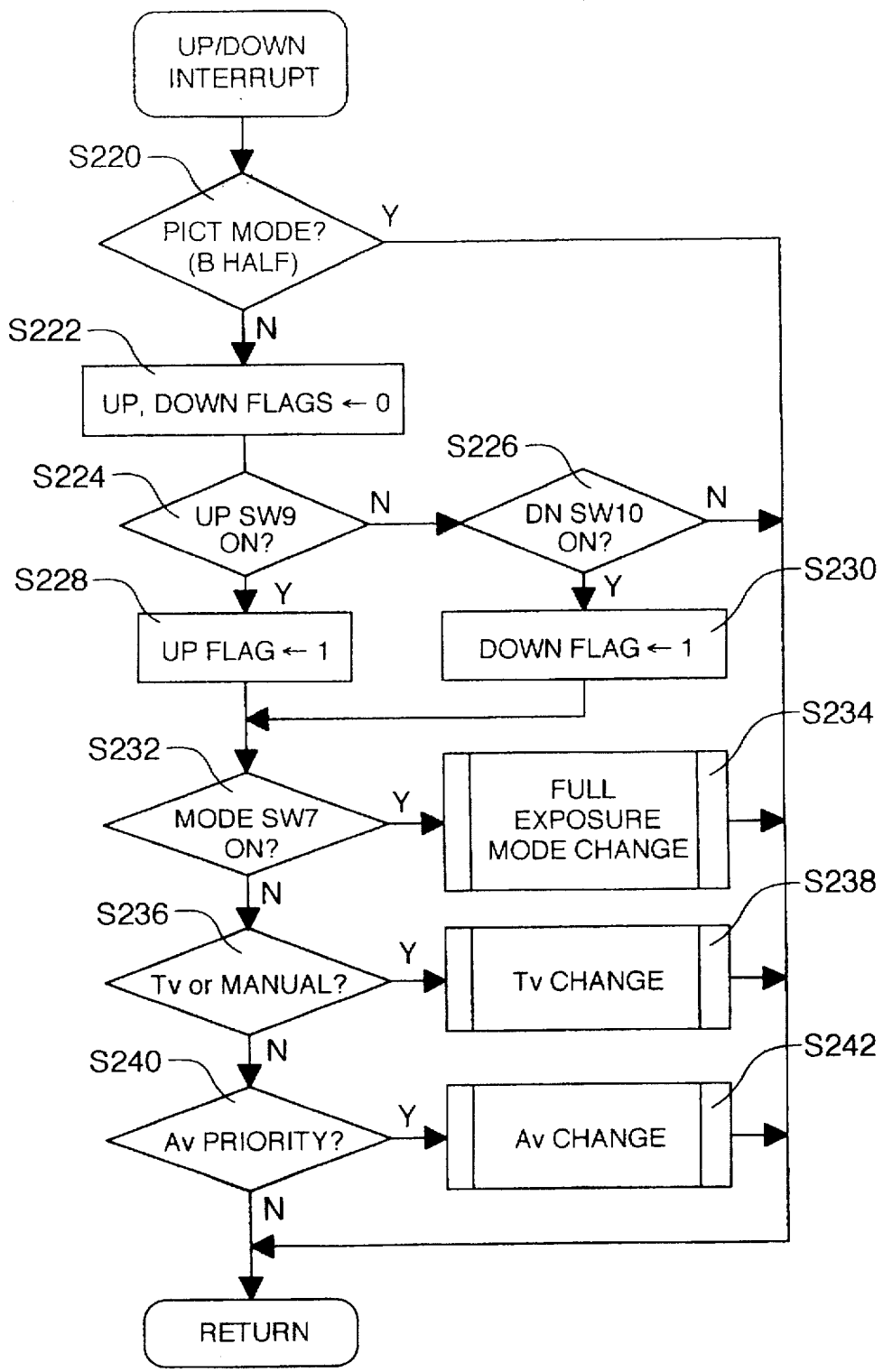
Figure 50:
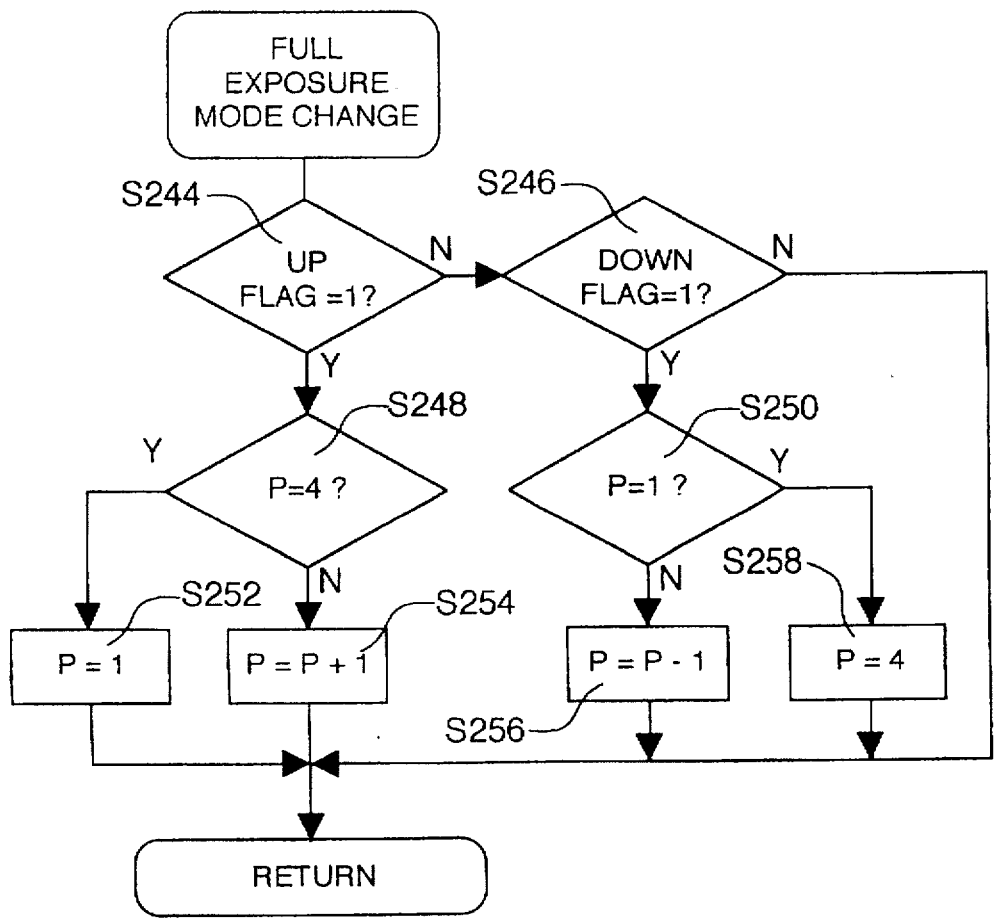
Figure 51:
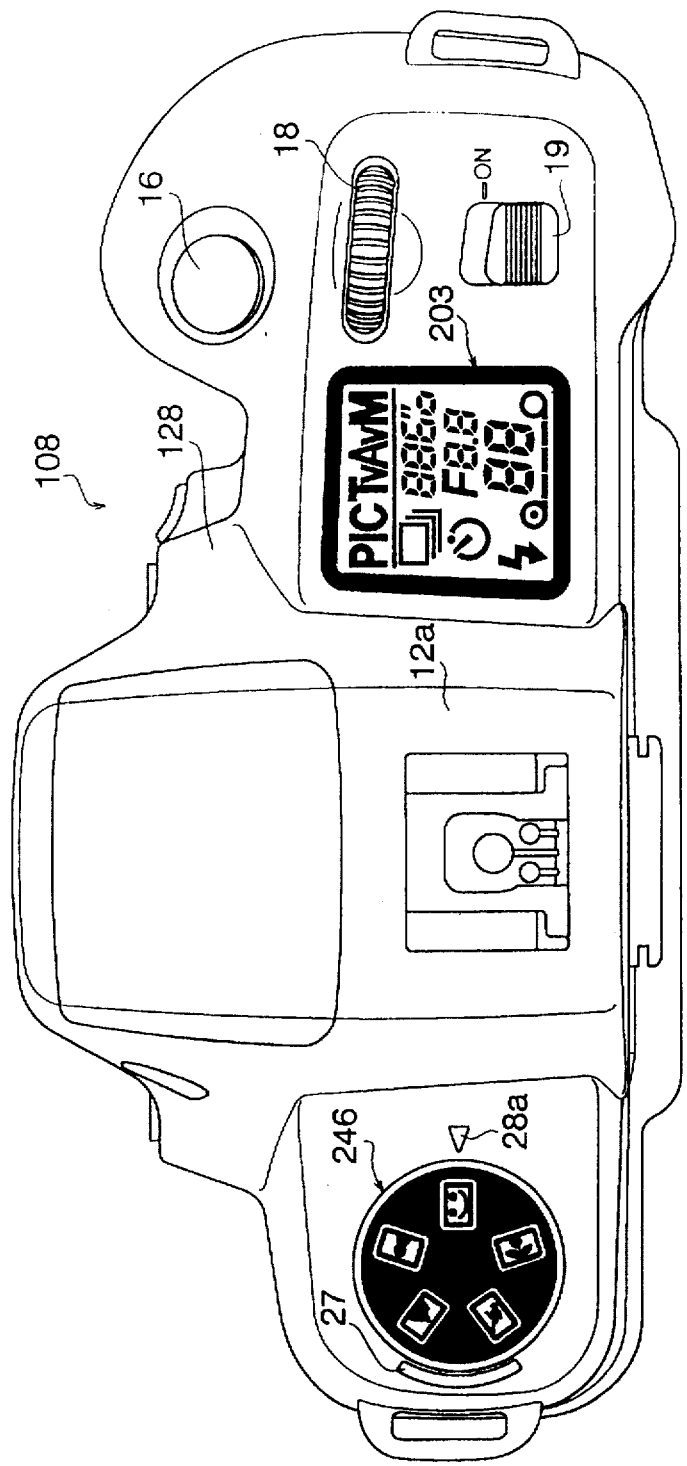
Figure 52:
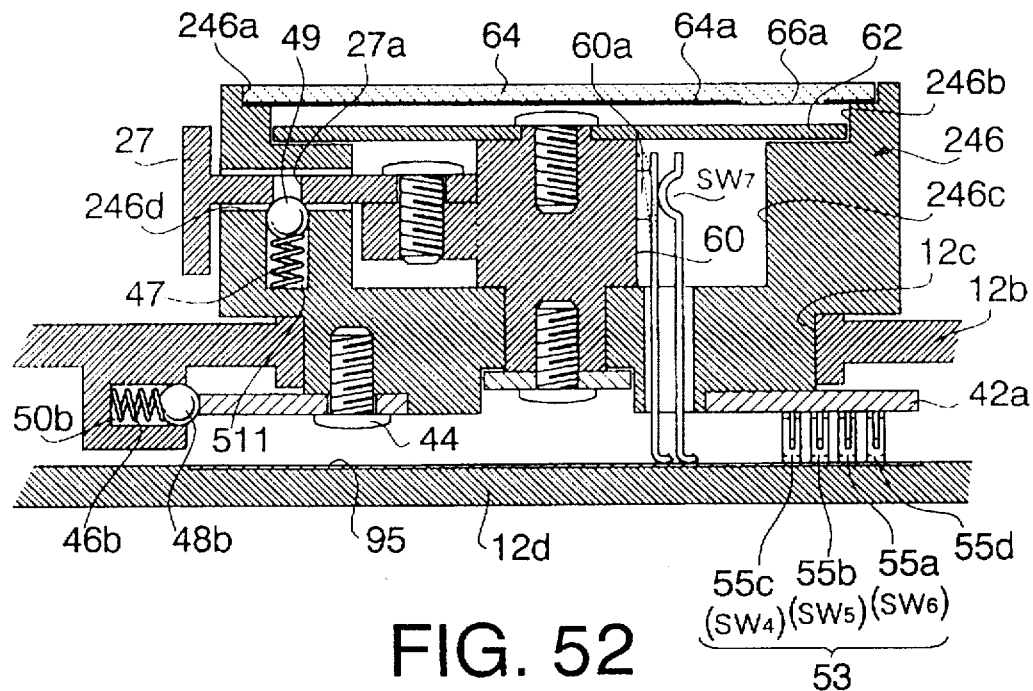
Figure 53:
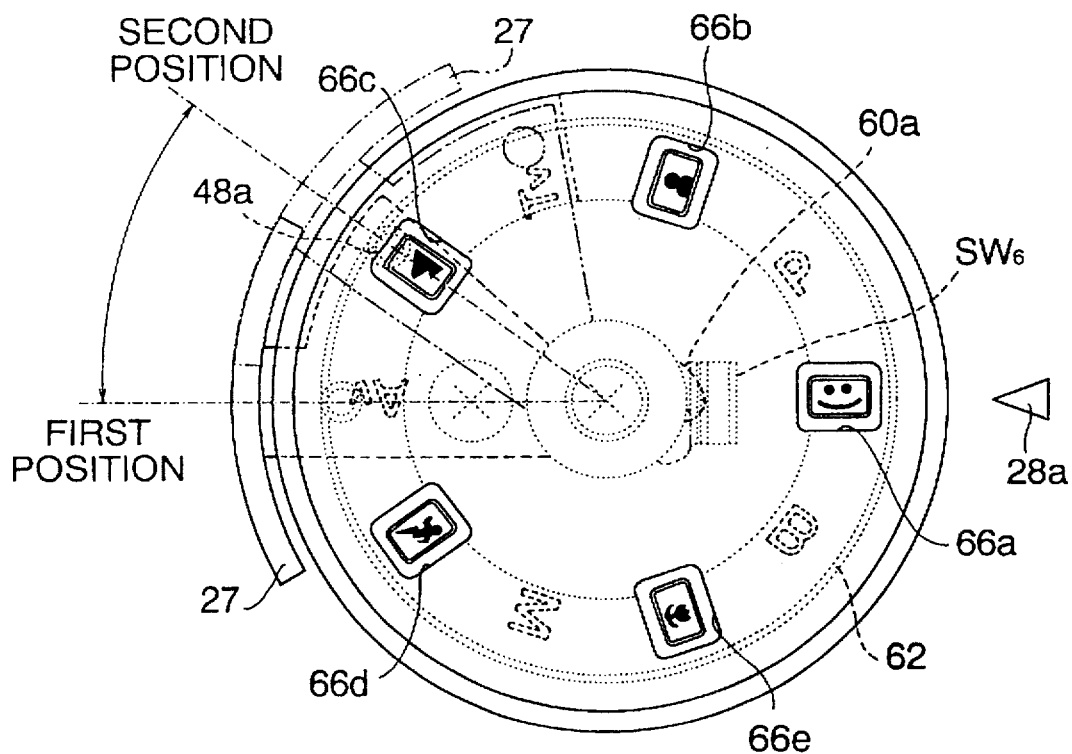
Figure 54:
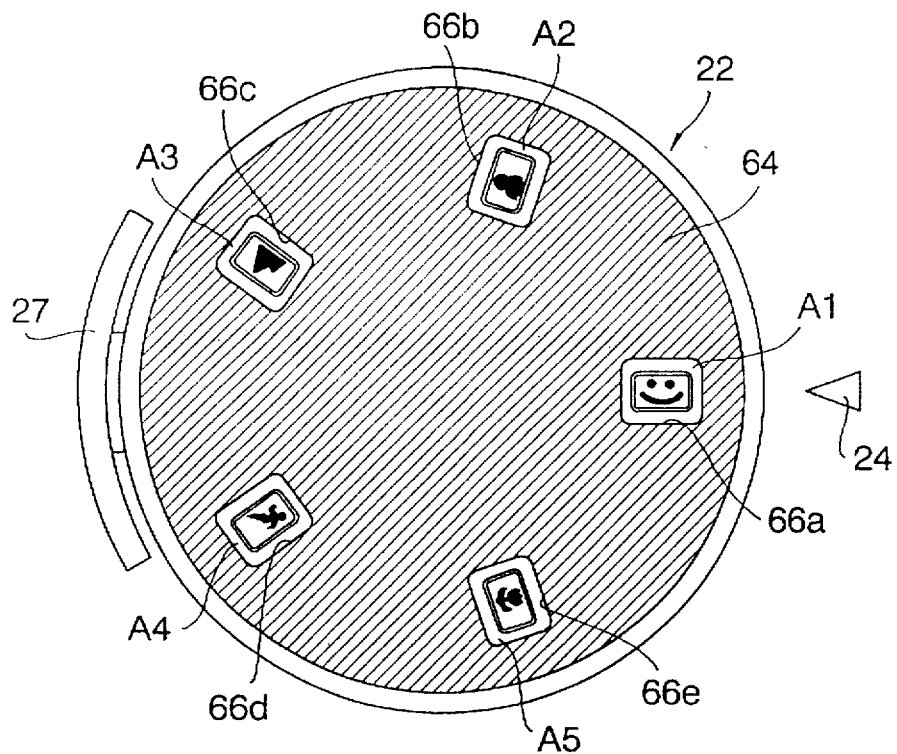
Figure 55:
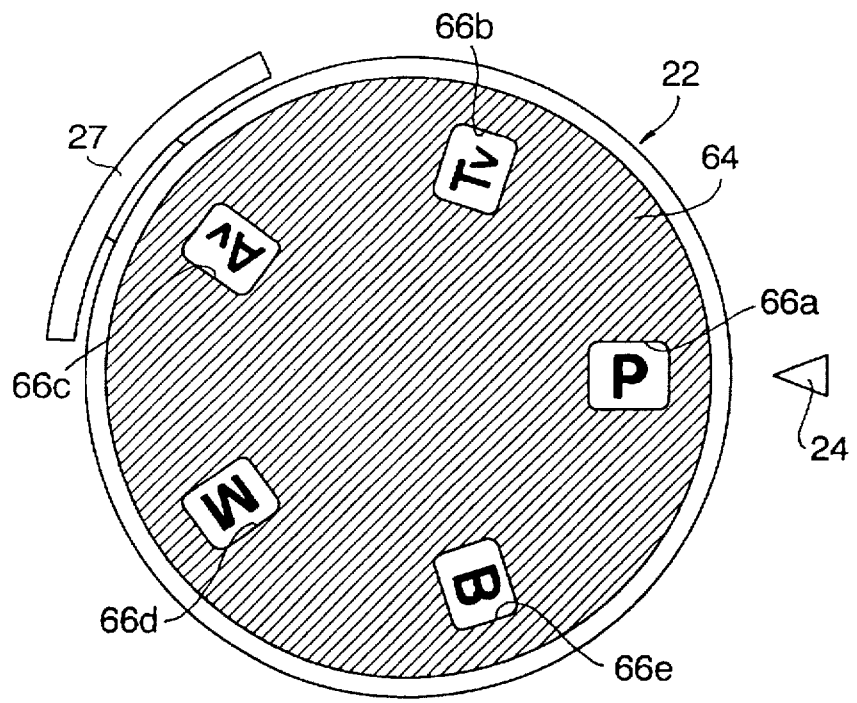
Figure 56:
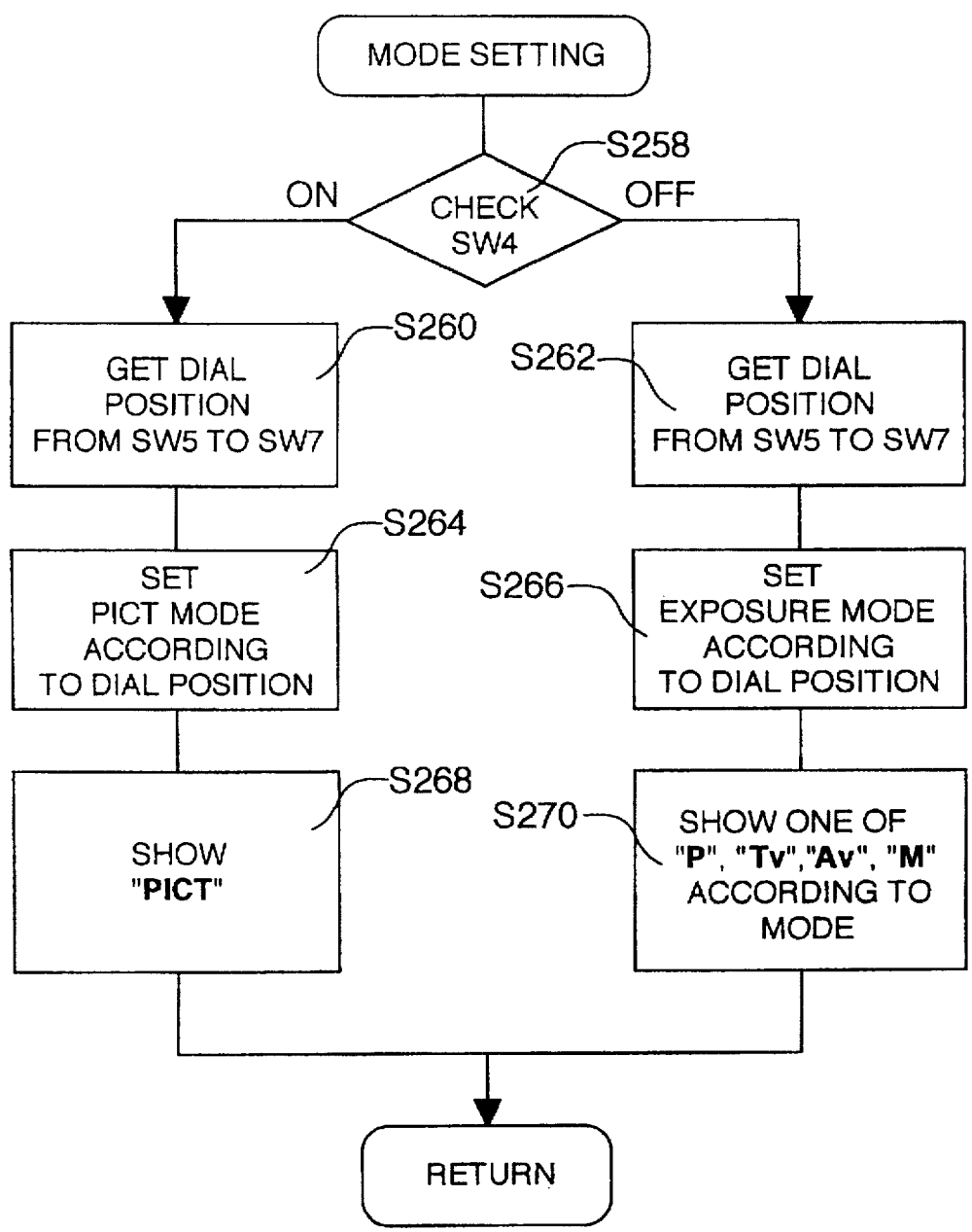
Figure 57:
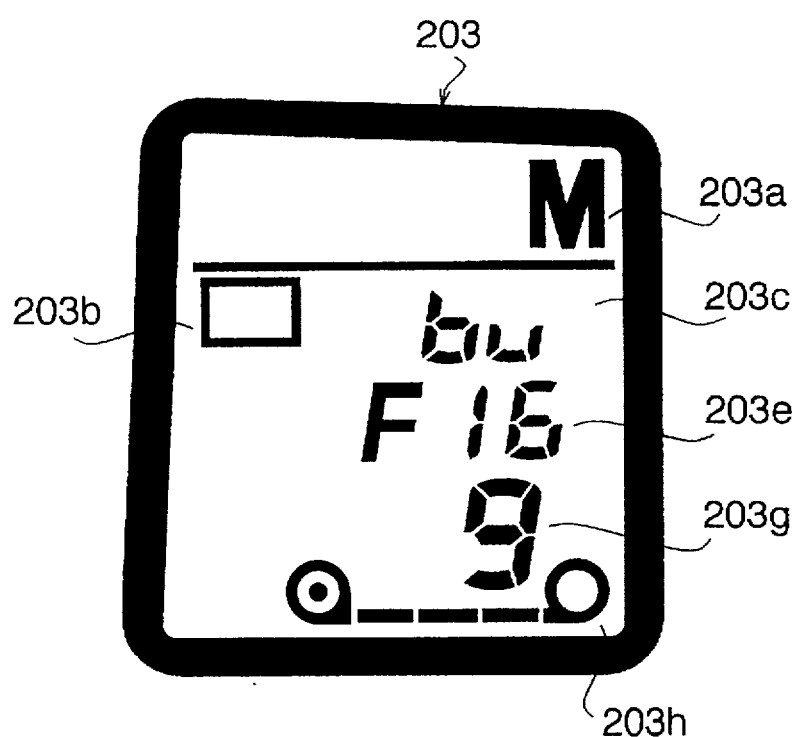

FIG. 3 in a view of a completely illuminated LCD of the first embodiment of the invention;

FIG. 4 is a block diagram of a control unit of all embodiments of the invention herein described;

FIG. 5 is a schematic of a switch group of the control unit according to the first embodiment of the invention;

FIG. 6 is a first example display in the LCD of the first embodiment;

FIG. 7 is a second example display in the LCD of the first embodiment;

FIG. 8 is a flowchart describing a dial checking routine of the first embodiment;

FIG. 9 is a flowchart describing an interrupt routine of the first embodiment;

FIG. 10 is a flowchart describing an ISO setting routine of the first embodiment;

FIG. 11 is a flowchart describing an ISO display routine of the first embodiment;

FIG. 12 is a third example display in the LCD of the first embodiment;

FIG. 13 is a fourth example display in the LCD of the first embodiment;

FIG. 14 is a plan view of a camera according to a second embodiment of the invention;

FIG. 15 is a schematic of a switch group of the second embodiment;

FIG. 16 is a flowchart describing an interrupt routine of the second embodiment;

FIG. 17 is a plan view of a camera according to a third embodiment of the invention;

FIG. 18 is a sectional view of an exposure compensation dial of the third embodiment;

FIG. 19 is a view of a completely illuminated LCD of the third embodiment;

FIG. 20 is a schematic of a switch group of the third embodiment;

FIG. 21 is a flowchart describing a dial checking routine of the third embodiment;

FIG. 22 is a flowchart describing a interrupt routine of the third embodiment;

FIG. 23 is a flowchart describing a mode setting routine of the third embodiment;

FIG. 24 is a first example display in the LCD of the third embodiment;

FIG. 25 is a second example display in the LCD of the third embodiment;

FIG. 26 is a third example display in the LCD of the third embodiment;

FIG. 27 is a plan view of a camera according to a fourth embodiment of the invention;

FIG. 28 is a flowchart describing an interrupt routine of the fourth embodiment;

FIG. 29 is a plan view of a camera according to a fifth embodiment of the invention;

FIG. 30 is a view of a completely illuminated LCD of the fifth embodiment;

FIG. 31 is a schematic of a switch group of the fifth embodiment;

FIG. 32 in a flowchart describing a dial checking routine of the fifth embodiment;

FIG. 33 is a first example display in the LCD of the fifth embodiment;

FIG. 34 is a second example display in the LCD of the fifth embodiment;

FIG. 35 is a third example display in the LCD of the fifth embodiment;

FIG. 36 is a fourth example display in the LCD of the fifth embodiment;

FIG. 37 is a plan view of a camera according to a sixth embodiment of the invention;

FIG. 38 is a view of a completely illuminated LCD of the sixth embodiment;

FIG. 39 is a first example display in the LCD of the sixth embodiment;

FIG. 40 is a second example display in the LCD of the sixth embodiment;

FIG. 41 is a third example display in the LCD of the sixth embodiment;

FIG. 42 is a fourth example display in the LCD of the sixth embodiment;

FIG. 43 is a fifth example display in the LCD of the sixth embodiment;

FIG. 44 is a flowchart describing a mode setting routine of the sixth embodiment;

FIG. 45 is a plan view of a camera according to a seventh embodiment of the invention;

FIG. 46 is a sectional view of an exposure compensation dial of the seventh embodiment;

FIG. 47 is a schematic of a switch group of the seventh embodiment;

FIG. 48 is a flowchart describing a mode setting routine of the seventh embodiment;

FIG. 49 is a flowchart describing an interrupt routine of the seventh embodiment;

FIG. 50 is a flowchart describing an full exposure mode change routine of the seventh embodiment;

FIG. 51 is a plan view of a camera according to a eighth embodiment of the invention;

FIG. 52 is a sectional view of a mode setting dial of the eighth embodiment;

FIG. 53 is a plan view of a mode setting dial of the eighth embodiment, showing hidden lines;

FIG. 54 is a plan view of a made setting dial of the eighth embodiment, showing a switching lever in a first position;

FIG. 55 is a plan view of a mode setting dial of the eighth embodiment, showing a switching lever in a second position;

FIG. 56 is a flowchart describing a dial checking routine of the eighth embodiment; and FIG. 57 is an example display in the LCD of the eighth embodiment.

DESCRIPTION OF THE EMBODIMENTS

Figure 1:
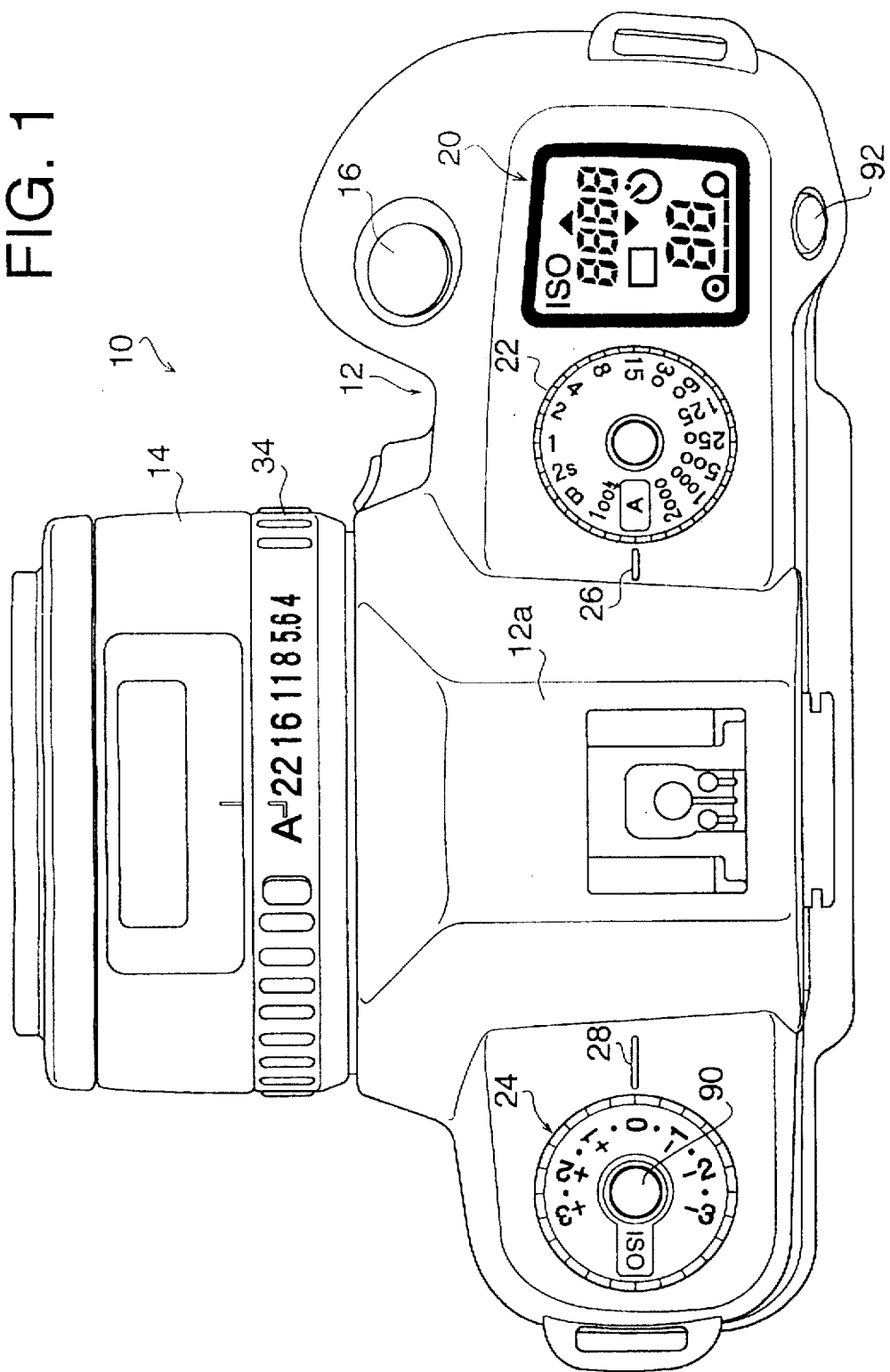
FIG. 1 is a plan view of a camera according to a first embodiment of the invention.

FIG. 1 shows a plan view of a camera according to a first embodiment of the invention. An SLR camera 101 includes a camera body 121 and a lens unit 14, the lens unit 14 being detachably mounted to the camera body 121 via a conventional bayonet mount (not shown). A shutter release button 16 and a liquid crystal display (LCD) screen 201 are arranged on the right side (from the perspective of FIG. 1) of the camera body 121. A shutter speed dial 22 and exposure compensation dial 241 are also provided to the camera body 121 at right and left sides, respectively. A pentaprism housing 12a is located in the center of the camera body 121.

Shutter speed indications are printed on the top of the shutter speed dial 22, and a shutter index mark 26 is printed on the camera body 121 adjacent the shutter speed dial 22. The shutter speed indications of the present embodiment include tractional shutter speeds, a bulb setting (B) and an "A" symbol representing automatic mode. The shutter speed dial 22 is set conventionally by rotating the dial 22 to align the desired setting up with the index mark 26. When the shutter speed dial 22 in set to the "A" symbol, the camera 101 automatically sets the shutter speed according to a conventional program.

As shown in FIG. 1, exposure compensation setting symbols "+3" through "−3" are printed on top of the exposure compensation dial 241, and an index mark 28 is provided adjacent to the dial 241 on the camera body 121. Furthermore, an "ISO" symbol is provided on the dial 241. The exposure compensation function is set by rotating the dial 241 to align the desired setting with the index mark 28. When the exposure compensation dial 241 is set to the "ISO" symbol, the user may set the film speed function by operating buttons 90 and 92 (to be discussed below). The exposure compensation value settings and film speed change symbol constitute the first and second types of functions settable by the exposure compensation dial 241.

A center button 90 is provided in the center of the exposure compensation dial 241, and a rear button 92 is provided at the back of the camera body 121. The buttons 90 and 92 are used, at least, to select the film speed setting when the exposure compensation dial 241 is set to the "ISO" position.

The lens unit 14 is provided with a conventional aperture ring 34 for setting the aperture value. An "A" symbol is provided an the ring 34 along with indications of aperture value. When the "A" symbol is set on the aperture ring 34, the camera 101 automatically sets the aperture value according to a conventional program.

Figure 2:
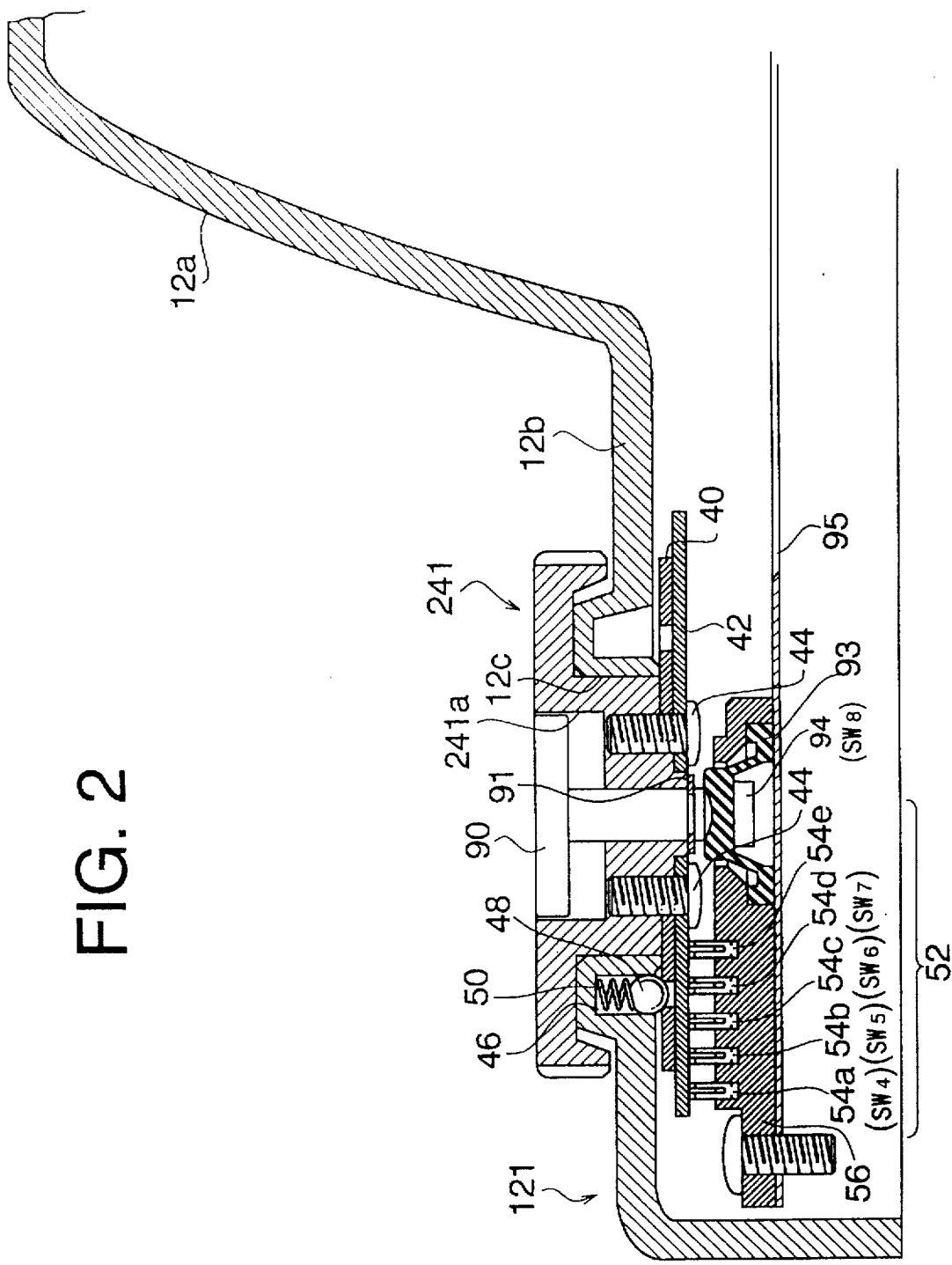
FIG. 2 is a sectional view of an exposure compensation dial of the first embodiment.

FIG. 2 shows a sectional view of the exposure compensation dial 241. As shown in FIG. 2, the dial 241 is inserted into a through hole 12c formed on the upper panel 12b of the camera body 121. A click plate 40 and code plate 42 are concentrically fixed to the exposure compensation dial 241 by radially offset screws 44, and rotate with the dial 241. A click ball 48 is pressed against the click plate 40 by a coil spring 50, guided in a spring chamber 46. The click plate 40 is provided with a click hole for each symbol marked on the dial 241, the click holes being rotatable into positions facing the click ball 50, to click the exposure compensation dial 241 into rotational positions corresponding to aligned positions of the exposure compensation value indication symbols and the index mark 28.

A switch position detector 52 comprises a brush holder 56 for supporting brushes 54a through 54e, positioned facing the code plate 42. The brushes 54a through 54e each contact the code plate, brush 52e being a ground brush and brushes 54a through 54d acting as switches SW4 through SW7 (shown in FIG. 5), respectively. The brushes 54a through 54e are connected to a control circuit (shown in FIG. 4) through a flexible circuit board (ECB 95). The center button 90 is arranged in a central bore 241a of the exposure compensation dial 241. The center button 90 is biased upwards by a rubber spring 93, and the upper limit of button motion is defined by a stopper plate 91 that contacts the exposure compensation dial 241 on its bottom surface. When the center button 90 is depressed, a contact 94 that serves an switch SW8 contacts a circuit pattern (connected to the control circuit of FIG. 4) on the PCB 95 and closes the switch SW8.

FIG. 3 shows all the segments of the LCD screen 201 of FIG. 1 that may be illuminated. The LCD screen 201 includes an "ISO" symbol portion 201a, a 4-digit numeric information portion 201b, a drive mode indicating portion 201c, at self timer mode indicating portion 201d, a frame counter portion 201e, a film status indicating portion 201f, and up and down indicating portions 201g and 201h. In each portion of the LCD screen 201 one or more symbols are displayable.

FIG. 4 shows a controlling circuit, including all the common portions for the controlling circuit for each of the embodiments. Switch group portion 180 differs from embodiments to embodiment, depending on the constitution of the particular embodiment.

The control circuit is housed in the camera body (camera body 121 in the first embodiment), and includes the central processing unit (CPU) 100 for controlling the camera circuits and peripheral circuits. The CPU 100 includes a controller 101 with static and dynamic for storing programs and data, an arithmetic-logic unit (ALU) 102 for autofocus, auto-exposure, and other calculations, and a time counter 103. An applied voltage from a battery 110 is regulated to a predetermined HIGH level by a DC/DC converter 120. When port P0 of the CPU 100 is tied to a high level, close to that of terminal VDD (corresponding to the level of the DC/DC converter 120), then the voltage from the DC/DC convertor is also applied to an exposure control circuit 130, a metering circuit 140, an A/D converter 150 and a communications controller 160.

A photodiode 141, connected to the metering circuit 140, detects an amount of light via a through-the-lens (TTL) metering system. The metering circuit 140 detects the output, of the photodiode 141, and outputs an analog signal to the A/D converter 150, which is then converted to a digital signal and sent on to the CPU 100.

An electrically erasable/programmable read only memory (EEPROM) 161, and a lens unit CPU 170 provided in the lens 14, are connected to the CPU 100 through the communications controller 160. Coefficients and constants used in calculation and setting procedures are stored in the EEPROM 161. In all embodiments, information regarding the setting position of the aperture ring 34 (for example, the aperture size value settings or "A" setting) is monitored by the CPU 100 in a conventional manner.

As shown in FIG. 5, in the first embodiment of the invention, the switch group 180 includes at least thirteen switches, and each switch is connected to one of the ports P1 through P13 of the CPU 100. SW1 is a conventional ON/OFF switch that is turned ON or OFF by the operation of a main switch member (not shown), SW2 is a conventional metering switch that is turned ON when the shutter button is pressed halfway down, and SW3 is a conventional release switch that is turned ON when the shutter button 13 is completely depressed. SW4 through SW7 correspond to the brushes 54a through 54d, respectively, of the exposure compensation dial 241. SW8 is a center switch that in turned ON when the center button 90 of the exposure compensation dial 241 is depressed. SW9 is a back switch that is turned ON when the rear button 92 is depressed. SW10 through SW13 are brushes contacting a code plate of the shutter dial 22, in the same manner as the brushes 54a through 54d of the exposure compensation dial 241.

The CPU 100 controls the exposure compensation circuit, 130, a shutter unit 202, and the LCD screen 201 based on information input from the A/D converter 150, the communications controller 160, and the switch group 180.

FIGS. 6 and 7 show examples of displayed information in the LDC screen 201, according to the first embodiment of the invention. When the shutter dial 22 is turned such that the index mark 26 aligns with the "A" symbol, and the aperture ring 34 is turned such that the index mark 36 aligns with a number on the ring indicating a chosen aperture size, the camera 101 is set to an aperture priority auto-exposure mode. A suitable shutter speed is calculated in the CPU 100 for the chosen aperture size. As shown in FIG. 6, the shutter speed is indicated in the numerical information display portion 201b. When the shutter dial 22 is turned such that the index mark 26 aligns with a numerical value representing the chosen shutter speed, and the aperture ring 34 is turned such that the index mark 36 aligns with the "A" symbol, then the camera 101 is not to an shutter priority auto-exposure mode. A suitable aperture size is calculated in the CPU 100 for the chosen shutter speed. As shown in FIG. 7, the aperture size is indicated in the numerical information display portion 201b, with an accompanying prefix letter "F" to indicate aperture site display.

FIGS. 8 through 10 show flow charts that describe the operation process of the first embodiment.

Switches SW4 through SW7 indicate a rotational position of the exposure compensation dial 241 to the CPU 100 by the combinations of active switches as determined by the code plate 42 (FIG. 2), including a position where the "ISO" symbol aligns with the index mark 28. A main process (not shown) polls terminals P1 through P13 to determine the position of exposure compensation dial 241 and the status of the remaining switches when the dial checking routine of FIG. 8 is executed.

A dial checking routine is shown in FIG. 8. CPU terminals P1 through P13 are checked in step S12. If the terminals indicate that dial 241 is in a position where one of the numerical exposure correction value symbols "+3" through "-3" is aligned with the index mark 28 (check in step S14), then the CPU uses the status of switches SW4 through SW7 to determine the exposure correction value, and sets the exposure control accordingly (S16). If the exposure compensation dial 241 is in the "ISO" position when switches SW4 through SW7 are checked in step S14, then the CPU 100 calls an ISO setting subroutine (S18), shown in FIG. 10. An ISO display routine (not shown in FIG. 8) then displays the setting of the ISO function on the LCD screen 201 according to the set value of Sv. The routine loops until the dial 241 is turned back to a numerical exposure compensation value position.

Both the center and rear buttons 90 and 92 are interrupt trapped, such that depression of either button 90 or 92 (or both) executes, the Up/Down interrupt of FIG. 9. The interrupt of FIG. 9 resets UP and DOWN flags to zero (step S22), and then checks the center button 90 (step S24), aborting if it is not depressed and proceeding to step S26 if it is depressed. The rear button is then checked (S26). If the center button 90 is pressed in combination with the rear button 92, the DOWN flag is set (S28). If only the center button 90 is depressed, the UP flag is set (S30).

FIG. 10 shows an ISO setting subroutine. The ISO setting subroutine checks the UP and DOWN flags (steps S32, S34), and after checking predetermined upper and lower limits of an ISO record variable Sv (steps S36, S38), the routine appropriately increments (step S42) or decrements (step S40) an ISO record variable Sv by ⅓ before returning to the process of FIG. 8. The upper limit of Sv in 11, and the lower limit is 1, giving a range of 30 possible distinct values for Sv.

The ISO display subroutine routine of FIG. 11 follows the ISO setting subroutine. As shown in FIG. 11, the UP and DOWN flags are checked and the appropriate marking illuminated (steps S44 through S50). Then the ISO symbol in portion 201a is illuminated (step S52), and the ISO values is displayed in the LCD numerical indicating portion 201b (step S54) before returning to the process of FIG. 8. The ISO value is, for example, retrieved by the CPU. 100 from a look-up table of Sv and ISO values held in the static memory.

As shown in FIGS. 12 and 13, the ISO display routine of FIG. 11 illuminates the ISO symbol 201a, the numerical value of ISO setting in the numerical indicating portion 201b, and an up or down marker 201g or 201h if the appropriate up or down switch SW8 or SW9, respectively, is active. When the up switch SW8 is active (activated by the center button 90), the up marker 201g is illuminated as shown in FIG. 12. When the down switch SW9 is active (activated by the rear button 92), the down maker 201h is illuminated an shown in FIG. 13.

When a user wishes to set the ISO film speed (film speed adjustment function) for a film loaded in the camera, he turns the exposure compensation dial 241 so that the "ISO" symbol is aligned with the index mark 28, and then changes the ISO value setting using the top and rear buttons 90, 92 until the desired ISO value appears in the LCD screen 201. If the center button 90 alone is pressed, the ISO value increases to the next higher set value. It the rear button 92 is hold while the center button 90 is depressed, or both buttons 90 and 92 are pressed together, then the ISO value decreases to the next lower set value. When a user is taking photographs and wishes to set the camera 101 to add or subtract stops (exposure compensation function), he turns the exposure compensation dial 241 so that the desired exposure compensation value is aligned with the index mark 28. The zero value corresponds to no exposure compensations.

Thus, according to the first embodiment of the invention, the shutter speed, aperture size, and exposure compensation functions are directly and intuitively set by means of the simple dial-type operating members. The exposure compensation dial also acts as an ISO setting dial, and a user can easily distinguish that the ISO adjustment function is to be performed when the exposure compensation dial 241 is at the "ISO" symbol position. Furthermore, since the exposure compensation dial 241 is used for setting two kinds of functions, a variety of photographing information can be set without increasing the number of dials, while retaining the ease of use of a dial-type adjustment.

Second Embodiment

A second embodiment of the invention is shown in a plan view in FIG. 14. The second embodiment is similar to the first, except for the constitution of exposure compensation control dial 242 and the controlling routines, and the use of only the center button 90 for changing the setting of the ISO film speed function. The exposure compensation control dial 242 differs from that of the dial 241 of the first embodiment only in that the dial face and the code plate 42 each have two positions dedicated to "+" (UP) and "−" (DOWN) symbols for setting the ISO film speed. The exposure compensation dial is marked with numerical value symbols ranging from "+3" to "3", and with "+" and "−" ISO symbols. The exposure compensation function is set by rotating the dial 242 such that the desired setting symbol in lined up with the index mark 28; when the exposure compensation dial 242 is set to the ISO "+" or "−" symbols, the user may set the film speed by operating the center button 90.

The CPU 100 and associated elements of FIG. 4 are also used for the second embodiment, although the switch group 180 is slightly different. The switch group 180 for the second embodiment appears in FIG. 15. As the exposure compensation dial 242 has "+" and "−" positions, but no necessity for a switch for a rear button, switches SW1 through SW7 are the same as the first embodiment, switch SW8 is for the center switch 90, and switches SW9 through SW12 correspond to the brushes of the shutter dial 22.

The operation of the second embodiment differs from that of the first in that the direction of the ISO function setting change is determined by rotating of the dial 242 to one of "+" or "−" symbols, and the pressing of the center button 90 changes the ISO film speed setting in the chosen direction. Accordingly, each of the flow charts of FIGS. 8, 10, and 13 also describe the second embodiment. A flow chart describing an up/down interrupt operation is shown in FIG. 16.

The center buttons 90 is interrupt trapped, such that when the button 90 is depressed, the Up/Down interrupt of FIG. 16 is executed. The interrupt of FIG. 16 resets the UP and DOWN flags to zero (step S58), and then checks the position of the exposure compensation dial 242 using switches SW4 through SW7 to determine which of the ISO (UP) increasing "+" position of ISO decreasing (DOWN) position "−" (steps S62 and S64) is selected. The correct flag is set before returning (steps S66, S68).

When a user wishes to increase the ISO film speed setting for a film loaded in the camera, he turns the exposure compensation dial 242 so that the ISO "+"0 symbol is aligned with the index mark 28, and then changes the ISO value using the top button 90 until the desired ISO value setting appears in the LCD screen 201. Similarly, when a user wishes to decrease the ISO film speed setting for a film loaded in the camera, he turns the exposure compensation dial 242 so that the ISO "−" symbol is aligned with the index mark 28, and then changes the ISO value setting using the top button 90. When a user is taking photographs and wishes to set camera 102 to add or subtract stops (exposure compensation function), he turns the exposure compensation dial 242 so that the desired exposure compensation value is aligned with the index mark 28. The zero value corresponds to no exposure compensation.

Thus, according to the second embodiment, the exposure compensation dial 242 also acts as an ISO function setting dial, and a user can easily distinguish that the ISO setting is to be performed when the exposure compensation dial 242 is at one of the "+" or "−" ISO setting positions. Since a user may operate the center button 90 to change the ISO setting only after rotating the dial 242, the user does not require two hands to set the ISO film speed function, but can accomplish the film speed setting with a single hand. Furthermore, one less operating button in required than the first embodiment, as the direction of setting change in the ISO film speed is predetermined by the "+" or "−" position of the dial 242.

Third Embodiment

FIG. 17 is a plan view showing a third embodiment of the present invention. The lens 14, aperture ring 34, shutter speed dial 22, shutter release button 16, pentaprism portion 12a, and index marks 28, 26, and 36 of the third embodiment are identical to those of the first and second embodiments.

The third embodiment of the invention includes an up/down dial 18 arranged near the shutter release button 16. The up/down dial 18 includes a pivotable or rotatable knurled disk, and is arranged such that only part of the disk protrudes outside the camera body 12. When the dial 18 is rotated in one direction, an UP switch portion (not shown) of the dial 18 in actuated, and when the disk is rotated, in the opposite direction, a DOWN switch portion is actuated. A red-eye reduction button 30 and a self-timer button 32 are located near the exposure compensation dial 243.

The exposure compensation dial 243 of the third embodiment, shown in cross-section in FIG. 18, is similar to those of the first and second embodiments. However, there is no center button as in the first and second embodiments. Additionally, the brush holder 56 has an extension 63 extending towards the region where the red-eye reduction button 30 and self-timer button 32 penetrate the upper panel 12b of the camera body 123. The red-eye reduction button 30 is biased upwards by a rubber spring 303, and the upper limit of button motion is defined by a stopper plate 301 that contacts upper panel 12b on its bottom surface. When the red-eye reduction button 30 is depressed, a contact 304 that serves as a switch SW8 contacts circuit pattern (connected to the control circuit 100) on the FBC 95 and closes the switch SW8. The self-timer button 32 is similarly arranged to close switch SW9 when pressed.

As shown in FIG. 17, the exposure compensation dial 243 of the third embodiment has symbol positions corresponding to each of the exposure compensation value settings from "−3" to "+3". In addition, three function control symbol positions. On dial 243 are: a position identified by an "ISO" symbol, for setting the ISO film speed function; a position identified by a metering symbol, for setting a photometry mode function; and a position identified by a "DRIVE" symbol, for setting a drive mode function.

An LCD screen 202 of the third embodiment is shown in FIG. 19 in a completely illuminated condition. The LCD screen 202 has many illuminable portions, including: an "ISO" symbol indication portion 202a, a 4-digit numerical information indication portion 202b, a metering mode indication portion 202c, a strobe information indication portion 202d, a red-eye reduction mode indication portion 202e, first and second drive mode indication portions 202f and 202g, a self-timer mode indication portion 202h, and up and down indication marks 202i and 202j. The first drive mode indication portion 202f can be illuminated to indicate one of a single frame mode or a consecutive frame mode. The second drive mode indication portion 202g can be illuminated to indicate a multiple exposure mode. Each illuminable portion of the LCD screen 202 has one or more illuminable symbols.

FIG. 4 is representative of the control unit of the third embodiment. The switch group 180 of the third embodiment is shown in FIG. 20. Terminals P1 through P15 of the CPU 100 connect to switches SW1 through SW15, respectively, of the switch group 180. SW1 through SW7 are the same as the first and second embodiments; SW8 is operated by the red-eye reduction button 30; SW9 is operated by the self-timer button 32; and SW10 through SW13 are in this case operated by the brushes of the shutter dial 22. SW14 and SW15 are the up and dawn switches, respectively, of the up/down dial 18.

FIGS. 21 through 23 are flowcharts showing the operation of the third embodiment. A dial checking routine is shown in FIG. 21. As show in FIG. 21, the CPU terminals P1 through P15 are checked in step S68. If the terminals indicate that the dial 243 is in a position where one of the numerical exposure correction value symbols "+3" through "−3" is aligned with the index mark 28 (Step S70), then the CPU uses the status of the switches SW4 through SW7 to determine the exposure compensation value and sets the exposure compensation function accordingly (S72).

If the exposure compensation dial 243 is oriented such that the index mark 28 is not aligned with one of the exposure compensation value indications, then the operation process routine checks which of the "ISO", "DRIVE" or photometry symbols are selected by checking the status of the switches SW4 through SW7 (steps S74, S76, S78). When the exposure compensation dial is in the "ISO" symbol position, the CPU 100 calls an ISO setting subroutine (step S80), identical to that shown in FIG. 10, for setting the ISO function, and displays the ISO setting in the LCD screen 201 according to the set value of Sv (step S86). If the exposure compensation dial 243 is in the "DRIVE" symbol position when the status of the switches SW4 through SW7 are checked in step S76, then the CPU 100 calls a mode function setting (drive) subroutine (step S82), shown in FIG. 23, and displays the drive mode in the LCD screen 201 (step S88). The mode function setting routine is used to set a mode among three mode settings; an identical routine is used for the photometry mode.

If the exposure compensation dial 243 is in the metering symbol (photometry mode) position when the status of the switches SW4 through SW7 are checked in step S78, then the CPU 100 calls the mode function setting (photometry) subroutine (step S84) shown in FIG. 23 to set the photometry mode, and displays the photometry mode function setting in the LCD screen 201 (step S90). The dial checking routine loops until the dial 243 is turned back to a numerical exposure compensation value position.

The up/down switch 18 is interrupt trapped, such that when either switch SW14 or SW15 (connected to up/down switch 18) is closed, the Up/Down interrupt of FIG. 22 to executed. The interrupt of FIG. 22 aborts if the dial status is at an exposure compensation numerical value symbol position (steps S92), sets the UP and DOWN flags to zero (step S94), and then checks the switches SW14 and SW15 steps S96 and S98), to set the correct UP/DOWN flag before returning (steps S100, S102).

When mode function setting routines for changing either the drive mode function or photometry mode function are called by the CPU 100 in steps S82 or S84 of FIG. 21, the flowchart of FIG. 23 is executed. In FIG. 23, "C" is a generic counter used for showing the control of the process, although each of the drive mode and photometry mode have specific counters and specific routines. As shown in FIG. 23, for the drive mode setting, a counter C can have values of 1, 2, and 3, corresponding to single, continuous, and multiple exposure modes, respectively. A second counter in a separate, identical routine (also generically represented by C in FIG. 23) can have values of 1, 2, and 3, corresponding to center-weighted, spot, or averaged metering, respectively.

The mode setting routine of FIG. 23 first checks which of the UP or DOWN flags have been set (steps S104, S106).

aborting if neither is set (step S106). If the UP flag is set, the mode function setting routine checks to see if the value of a counter C is at the maximum value (in this case a maximum of 3, step S108). If the counter C is at the maximum, the counter resets (cycles C to the minimum value (in this case a minimium of 1, step S112). If the counter C is not at the maximum value, the CPU increments the counter C by 1 (step S114). If the DOWN flag is set, the mode setting routine checks to see if the value of counter C is at the minimum value (step S110). If the counter is at the minimum, the counter resets (cycles) C to the maximum value (step S118). If the counter C is not at the minimum value, the CPU decrements the counter C by 1 (step S116). After incrementing, decrementing, or resetting (cycling) the counter C as appropriate, the CPU 100 resets the UP and DOWN flags (step 120) before returning.

FIG. 24 shows an example of the LCD screen 202 of the third embodiment of the invention, when the aperture priority auto-exposure mode setting, center-weighted photometry mode setting, single frame drive mode setting, and red-eye reduction mode setting are selected. In this case, a shutter speed selected by the CPU 100 in response to the selection of an aperture size is shown in the numerical information indication portion 202b; a center-weighting symbol is shown at 202c; a red-eye reduction symbol is shown at 202e; and a single frame drive symbol is show at 202f.

FIG. 25 shows an example of the LCD screen 202 of the third embodiment of the invention, when the shutter priority auto-exposure mode setting, spot metering mode setting, and single frame drive mode setting are selected. In this case, an aperture size accompanied by an "F" character, selected by the CPU 100 in response to the selection of an shutter speed, is shown in the numerical information indication portion 202b; a spot metering symbol is shown at 202c; a "strobe required" symbol is shown at 202d; and a consecutive frame drive symbol is shown at 202f. The "strobe required" symbol 202d indicates that the CPU 100 has determined that a strobe flash is necessary for a correct exposure.

FIG. 26 shows an example of the LCD screen 202 of the third embodiment of the invention, when the program mode setting, averaged metering mode setting, and multiple exposure drive mode setting are selected. In this case, a shutter speed selected by the CPU 100 is shown in the numerical information indication portion 202b; an average metering symbol is shown at 202c; and a multiple exposure drive symbol is shown at 202g.

When a user wishes to change the ISO film speed setting for a film loaded in the camera, he turns the exposure compensation dial 243 no that the "ISO" function symbol is aligned with the index mark 28, and then changes the ISO value setting using the up/down dial 18 until the desired ISO value appears in the LCD screen 202. When a user wishes to adjust the photometry mode setting, he turns the exposure compensation dial 243 so that the photometry mode function symbol is aligned with the index mark 28, and then adjusts the photometry mode setting using the up/down dial 18 until the desired photometry mode symbol appears in the LCD screen 202. When a user wishes to adjust the drive mode setting, he turns the exposure compensation dial 243 so that the "DRIVE" function symbol is aligned with the index mark 28, and then adjusts the drive mode setting using the up/down dial 18 until the desired drive mode symbol appears in the LCD screen 202. When a user is taking photographs and wishes to set the camera 103 to add or subtract stops (exposure compensation function), he turns the exposure compensation dial 243 to align desired exposure compensation value with the index mark 28. The zero value corresponds to no exposure compensation.

Thus, according to the third embodiment of the invention, four types of functions may be selected or changed with the exposure compensation dial 243. The number of necessary control numbers is therefore small for a large number of functions. The dial-type control member is easy to use, and a user can readily understand that a certain setting is changeable when the corresponding symbol is aligned with the index mark 28, and that each setting is changeable with the common up/down dial 18. The settings that are changeable via the dial 243 may each be changed with one hand.

Fourth Embodiment

FIG. 27 is a plan view of a fourth embodiment of the invention. The fourth embodiment is similar to the third embodiment; however, in the fourth embodiment, there is no specific up/down dial, and the functions of the up/down dial are performed by the red-eye reduction button 30 and the self-timer button 32.

As shown in FIG. 27, "up" and "down" symbols 86 and 88 are provided on camera body 124 on either side of the index mark 28. The "up" symbol 86 indicates that the red-eye reduction button 30 serves as an "up" switch, and the "down" symbol 88 indicates that the self-timer button 32 serves as a "down" switch.

The switch arrangement of FIG. 20 in representative of the switch group 180 of the fourth embodiment, expecting P14, P15 and SW14, SW15, which are unassigned (or simply not provided). That is, terminals P1 through P13 of the CPU 100 are connected to switches SW1 through SW13, respectively, of the switch group 180. SW1 through SW7 are the same as the first through third embodiments; SW8 is operated by the red-eye reduction (up) button 30; SW9 is operated by the self-timer 0(down) button 32; and SW10 through SW13 are operated by the brushes of the shutter dial 22, while the aforementioned switches SW14, SW15 and terminals P14, P15 are unassigned (or simply not provided).

FIGS. 21 and 23 remain representative of the dial checking and mode setting routines of the fourth embodiment, which are identical to those of the third embodiment. However, the up/down interrupt routine of the fourth embodiment is shown in FIG. 28. As shown in FIG. 28, the operation of the red-eye reduction and self-timer buttons 30 and 32 are interrupt trapped, and when either switch SW8 or SW9 (connected to the buttons 30 and 32) is closed, the Up/Down interrupt of FIG. 28 is executed.

The interrupt of FIG. 28 proceeds to appropriately toggle the red-eye reduction mode (steps S124, S130), toggle the self-timer mode (step S126, S132), or abort (step S126, "N") if the dial status is at an exposure compensation numerical value position (step S122). In the context of this specification, "stoggle" means "to switch between two predetermined settings". If the exposure compensation dial is at one of "DRIVE", "ISO" or metering symbols at step S122, the routine sets the UP and DOWN flags to zero (step S128), and then checks the switches SW8 and SW9 (steps S134 and S136). The correct flag is set before returning (steps S138, S140). The operation of the fourth embodiment of the invention is otherwise identical to that of the third.

When a user wishes to change the ISO film speed setting for a film loaded in the camera, he turns the exposure compensation dial 243 so that the "ISO" symbol is aligned with the index mark 29, and then changes the ISO value setting using the red eye reduction button (UP) 30 and self-timer (DOWN) button 32 until the desired ISO value setting appears in the LCD screen 202. When a user wishes to adjust the photometry mode setting, he turns the exposure compensation dial 243 so that the photometry mode function symbol is aligned with the index mark 286, and then adjusts the photometry mode setting using the red eye reduction button (UP) 30 and self-timer (DOWN) button 32 until the desired photometry mode symbol appears in the LCD screen 202. When a user wishes to adjust the drive mode setting, he turns the exposure compensation dial 243 so that the "DRIVE" function symbol is aligned with the index mark 28, and then adjusts the drive mode setting using the red eye reduction button (UP) 30 and self-timer (DOWN) button 32 until the desired drive mode symbol appears in the LCD screen 202.

When a user is taking photographs and wishes to set the camera 104 to add or subtract stops (exposure compensation function), he turns the exposure compensation dial 243 to align the desired exposure compensation value with the index mark 28. The zero value corresponds to no exposure compensation. When the dial 243 is set to in an exposure compensation position, the red-eye reduction button, 30 toggles the red-eye reduction function OFF and ON, and the self-timer button 32 toggles the self-timer OFF and ON. The corresponding symbols appear appropriately in the LCD screen 202.

Thus, the fourth embodiment allows the ease of use of a dial type member to set a variety of photographing settings. Furthermore, the double use of the red-eye reduction and self-timer buttons 30 and 32 to alter a specific setting in an up/down fashion as selected on the exposure compensation control dial 243 allows a reduction in the overall number of operating members and switchs, while providing a simple and easily understood operating method.

Fifth Embodiment

A plan view of a fifth embodiment of the invention appears in FIG. 29. Camera 105 of the fifth embodiment of the invention has an LCD screen 204 provided to the camera body 125 of a camera 105 having a rotatable aperture ring 34 and shutter speed dial 22. The camera 105 is controlled to display a selected mode of operation of several modes in the LCD screen 204 according to the arrangement of the ring 34 and shutter speed dial 22. A self-timer button 32 and a drive button 35 are provided to the camera near the exposure compensation dial 247.

LCD screen 204, provided to the top of the camera body 125, is able to display a mode of operation, drive, self-timer, frame count, and film status information. Shown in a fully illuminated condition in FIG. 30, the LCD screen 204 includes: a mode indication portion 204a, a drive mode indication portion 204b, a self-timer mode indication portion 204c, a frame count portion 204d, and a film status indication portion 204e.

Exposure compensation dial 247 of the fifth embodiment is identical in cross section to that of the third and fourth embodiments, as shown in FIG. 18.

As with all the disclosed embodiments of the invention, FIG. 4, is representative of the control unit of the fifth embodiment. Switch group 180 of the fifth embodiment is shown in FIG. 31; terminals P1 through P13 of the CPU 100 are connected to switches SW1 through SW13, respectively, of the switch group 180. SW1 through SW3 are the same as the first through fourth embodiments; SW4 through SW7 are operated by the brushes 54a through 54d, respectively, of the exposure compensation dial 247. SW8 is operated by the self-timer button 32; SW9 is operated by the drive button 35; and SW10 through SW13 are operated by the brushes of the shutter dial 22.

The CPU 100 sets the photographing mode of operation, and displays the appropriate mode indication information, in response to the position of the aperture ring 34 and the shutter speed dial 22.

FIG. 32 is a flow chart showing a dial check routine that determines the mode setting and the displayed information, in the LCD screen 204 as performed by the CPU 100, shown in FIG. 32, the CPU 100 first checks if the shutter speed dial 22 is set to "A" (step S142), then checks if the aperture ring 34 is set to "A" (steps S144, S146). When both the aperture ring 34 and shutter speed dial 22 are set to the "A" position ("A" representing "Automatic"), the CPU sets the photographing mode to full program mode (step S148); where both the shutter speed and the aperture size are set by the CPU 100 according to a predetermined program, and a "P" symbol is displayed in the mode indication portion 204a of the LCD screen 204 (step S156). When the shutter speed dial 22 is set to the "A" position but the aperture ring 34 is not, then the CPU 100 sets the photographing mode to aperture priority AE mode (step S150); where the shutter speed is set by the CPU 100 in response to the user's selection of aperture size, and an "Av" symbol is displayed in the mode indication portion 204a of the LCD screen 204 (step S158).

When the aperture ring 34 is set to the "A" position but the shutter speed dial 22 is not, then the CPU sets the photographing mode to shutter priority AE mode (step S152); where the aperture size is set by the CPU in response to the user's selection of shutter speed, and a "Tv" symbol is displayed in the mode indication portion 204a of the LCD screen 204 (step S160).

When neither of the aperture ring 34 nor the shutter speed dial 22 are set to the "A" positions, then the CPU sets the photographing mode to full dual mode (step S154), where both the shutter speed and the aperture size are set by the user, and an "M" symbol is displayed in the mode indication portion 204a of the LCD screen 204 (step S162).

FIGS. 33 through 36 show typical display situations for the LCD screen 204 of the fifth embodiment of the invention. In each case, indication portion 204d shows the frame count, and indication portion 204e shows the film status. FIG. 33 shows an example of the LCD screen 204 when the full program exposure mode of operation is selected, in this case, a "P" symbol is shown in indication portion 204a, and a single frame drive symbol is shown at 204b. FIG. 34 show an example of the LCD screen 204 when the shutter priority auto-exposure mode of operation and consecutive frame drive mode are selected. In this case, a "Tv" symbol is shown in indication portion 204a, and a consecutive frame drive symbol is shown at 204b. FIG. 35 shows an file of the LCD screen 204 when the aperture priority auto-exposure mode of operation is selected. In this case, an "Av" symbol is shown in indication portion 204a, and a single frame drive symbol is shown at 204b. FIG. 36 shows an example of the LCD screen 204 when the full manual mode is selected. In this case, an "M" symbol is shown in indication portion 204a, and a single frame drive symbol is shown at 204b.

When a user wishes to set the camera to a full program mode of operation, he turns the aperture ring 34 and the shutter dial 22 such that both are oriented with the "A" symbol aligned with the corresponding index mark, and the "P" symbol appears in result the LCD screen 204. When a user wishes to set the camera to a shutter priority auto-exposure mode of operation, he turns the aperture ring 34 to align the "A" symbol on the dial with the corresponding index mark, selects a shutter speed on the shutter dial 22; and the "Tv" symbol appears as a result in the LCD screen 204.

When a user wishes to sot the camera to an aperture priority auto-exposure mode of operation, he turns the shutter speed dial 22 to align the "A" symbol on the dial with the corresponding index mark, selects an aperture size on the aperture ring 34; as a result the "Av" symbol appears in the LCD screen 204. When a user wishes to set the camera in a full manual mode, he turns the aperture ring 34 and the shutter dial 22 such that both align with a desired value (excepting the "A" symbol) and the "M" symbol appears in result the LCD screen 204.

When a user is taking photographs and wishes to set the camera 105 to add or subtract stops (exposure compensation function), he turns the exposure compensation dial 247 so that the desired exposure compensation value is aligned with the index mark 28. The dial 247 is settable in at least half-step positions, using the four switches SW4 through SW7 to allow at least 16 settable values. The zero value corresponds to no exposure compensation. The self-timer button 32 toggles the self-timer, and the corresponding symbol appears appropriately in the LCD screen 204.

Thus, the fifth embodiment of the invention allows the use of dial-type members to control shutter speed, aperture, and exposure compensation values, while controlling program modes and displaying relevant data in the LCD screen 204 in response to the operations of the dials. The camera is easy to use and intuitively operable, yet can make important mode information immediately available to the user in the LCD screen 204.

Sixth Embodiment

FIG. 37 is a plan view showing a sixth embodiment of the present invention. An SLR camera 106 includes a camera body 126 and a lens unit 14, the lens unit 14 being detachably mounted to the camera body 126 via a conventional bayonet mount (not shown). A shutter release button 16 and an LCD screen 203 are arranged on the right side (from the perspective of FIG. 37) of the camera body 126. A shutter speed dial 22 and exposure compensation dial 244 are also provided to the camera body 126 at right and left sides, respectively. A pentaprism housing 12a is located in the center of the camera 126. A self-timer button 32 is provided near the exposure compensation dial 244.

The camera 126 of the sixth embodiment is able to operate in a variety of special completely programed "picture" ("PICT") exposure modes, including a "green" mode, a "portrait" mode, a "landscape" mode, an "action" mode, and a "close-up" mode. In each of the PICT modes, both the shutter speed and the aperture size are automatically set by the CPU 100 according to a predetermined program optimized for a specific photographing situation. The green mode is appropriate for an inexperienced photographer, where the camera automatically chooses an optimum exposure depending on the focal length of the mounted lens 14. The portrait mode is optimized for photographing clear portraits and has an easily controllable depth of field. The landscape mode is optimized for photographing scenery and has a large depth of field. The action mode is optimized for moving objects and has a fast shutter speed. The close-up mode is optimized for close photography and has an evenly focused image at near distances. The completely programmed picture modes are distinguished from the general exposure modes (at least aperture priority, shutter priority, and full manual modes) in that both shutter speed and aperture size are automatically set by the CPU 100 according to a distinct program optimized for a specific photographing situation, and that the user may not manually change either setting in the embodiments. The previously described program mode is defined herein as a general exposure mode, having an all-purpose program.

As shown in FIG. 37, exposure compensation value symbols "+2" through "−2" are printed on top of an exposure compensation dial 244, and an index mark 28 is provided adjacent to the dial 244 on the camera body 126. Furthermore, give picture symbols are provided on the dial 244. The picture symbols, in clockwise order, are a "happy face" representing the green mode, a human silhouette representing the portrait mode, a mountain silhouette representing the landscape mode, a running figure silhouette representing the action mode, and a flower silhouette representing the close-up mode. The exposure compensation dial 244 is set by rotating the dial 244 such that the desired setting is lined up with the index mark 28. When the exposure compensation dial 244 is set to one of the picture symbols, the camera is set to the corresponding picture mode. As shown in FIG. 37, the dial positions are designated by A and B halves, where the A half includes the numerical exposure compensation value settings and the B half includes the picture symbols. The exposure compensation values and picture mode constitute the first and second types of information settable by the exposure compensation dial 244.

The exposure compensation dial 244 of the sixth embodiment is identical in cross-section to that shown in FIG. 18 for the third embodiment. Additionally, FIG. 4 is representative of the control unit of the sixth embodiment Switch group 180 of the sixth embodiment may be represented by FIG. 15 with terminals P1 through P12 of the CPU 100 connected to switches SW1 through FW12, respectively, of the switch group 180. SW1 through SW7 are the same as the first through fourth embodiments. SW8 is operated by the self-timer button 32. Switches SW9 through SW12 are operated by the brushes of the shutter dial 22.

LCD screen 203 of the sixth embodiment is shown in FIG. 38 in a completely illuminated condition. LCD screen 203 has many illuminable portions, including: an exposure mode indication portion 203a, a drive mode indication portion 203b, a shutter speed indication portion 203c, a self-timer mode indication portion 203d, an aperture size indication portion 203e, a strobe information indication portion 203f, a frame counter indication portion 203g, and a film status indication portion 202h.

FIGS. 39 through 43 show typical display situations for the LCD screen 203, in each case, indication portion 203c shows the shutter speed, indication portion 203e shows the aperture size, indication portion 203g shows the frame count, and indication portion 203h shows the film status. FIG. 39 shows an example of the LCD screen 203 of the sixth embodiment of the invention when one of the picture modes is selected. In this case, a "PICT" is shown in indication portion 203a, and a single frame drive symbol is shown at 203b. FIG. 40 shows an example of the LCD screen 203 when the general program mode is selected. In this case, a "P" symbol is shown in indication portion 203a, and a consecutive frame dive symbol is shown at 203b. FIG. 41 shows an example of the LCD screen 203 when the shutter priority AE mode is selected. In this case, a "Tv" symbol is shown in indication portion 203a, and a single frame drive symbol is shown at 203b. FIG. 42 shows an example of the LCD screen 203 when the aperture priority AE mode is selected. In this case, an "Av" symbol is shown in indication portion 203a, and a consecutive frame drive symbol is shown at 103b. FIG. 43 shows an example of the LCD screen 203 when the full manual exposure mode is selected. In this case, an "M" symbol in shown in indication portion 203a; a self-timer mode symbol is shown at 203d; and a consecutive frame drive symbol is show at 203b.

When a mode setting routine for changing the exposure mode is called by the CPU 100, the flowchart of FIG. 44 is executed. In FIG. 44, "TvF", "AvF", and "XvF" are flags corresponding to setting of the shutter dial 22, aperture ring 34, and exposure compensation dial 244. The mode setting routine of FIG. 44 first resets the TvF, AvF, and XvF flag (step S164), then sets each flag according to the position of the corresponding dial (steps S166 through S176). The TvF flags and AvF flags are each set if the corresponding dial is at the "A" position; the XvF flag is set if the exposure compensation dial 244 is set at one of the numerical exposure compensation values (A half).

Next, the CPU 100 checks if the TvF flag is set (step S178), then checks if the AvF flag is set (steps S184 and S182). When both the TvF and AvF flags are set, then the CPU checks the XvF flag (step S180). If the XvF flag is not set, the CPU 100 sets a picture mode depending on the exposure compensation dial 244 position (step S186) and displays a "PICT" symbol in the LCD screen 203 (step S188). If all of the TF, AvP, and XvF flags are set, the CPU 100 sets a program mode were both the shutter speed and the aperture size are set by the CPU 100 according to a predetermined general use program (step S190), and a "P" symbol is displayed in the mode indication portion 203a of the LCD screen 203 (step S192). When the AvF flag in not set but the TvF flag is set, then the CPU sets the photographing mode to aperture priority AE mode (step S194), where the shutter speed is set by the CPU in response to the user's selection of aperture size, and an "Av" symbol is displayed in the mode indication portion 203a of the LCD 203 (step S196). When the TvF flag is not set but the AvF flag is set, then the CPU 100 sets the photographing mode to shutter priority AE mode (step S198), where the aperture size is set by the CPU 100 in response to the user's selection of shutter speed, and a "Tv" symbol is displayed in the mode indication portion 203a of the LCD screen 203 (step S200). If neither the TvF nor the AvF flag is set, then the CPU 100 sets the exposure mode to full manual mode (step S202), where both the shutter speed and the aperture size are set by the user, and an "M" symbol is displayed in the mode indication portion 203a of the LCD screen 203 (step S204).

When a user wishes to set the camera to a picture mode he turns the exposure compensation dial 244 so that one of the picture mode symbols is aligned with the index mark 28, and the "PICT" symbol appears in result the LCD screen 203. When a user is taking photographs and wishes to set the camera 106 to add or subtract stops (exposure compensation), he turns the exposure compensation dial 244 so that the desired exposure compensation value is aligned with the index mark 28. The zero value corresponds to no exposure compensation. When the dial 244 is set to in an exposure compensation position, the self-timer button 32 toggles the self-timer, and the corresponding symbol appears in the LCD screen 203. Further, when the dial 244 is not to an exposure compensation position, and a user wishes to set the camera to full program mode, he turns the aperture ring 34 and the shutter dial 22 such that both are oriented with the "A" symbol aligned with the corresponding index mark, and the "P" symbol appears in result the LCD screen 203. When the dial 244 is set to an exposure compensation position, and a user wishes to set the camera to shutter priority auto-exposure mode, he turns the aperture ring 34 such that the aperture dial is oriented with the "A" symbol aligned with the corresponding index mark, and selects a shutter speed on the shutter dial 22; the "Tv" symbol appears as in result in the LCD screen 203. When the dial 244 is set to an exposure compensation position, and a user wishes to net the camera to aperture priority auto-exposure mode, he turns the shutter speed dial 22 such that the aperture dial is oriented with the "A" symbol aligned with the corresponding index mark, and selects an aperture size on the aperture ring 34; and the "Av" symbol appears as a result in the LCD screen 203. When the dial 244 is set to an exposure compensation position, and a user wishes to set the camera in a full manual mode, he turns the aperture ring 34 and the shutter dial 22 such that both are oriented with a desired value (excepting the "A" symbol) aligned with the corresponding index mark; and the "M" symbol appears as a result in the LCD screen 203.

Thus, according to the sixth embodiment of the invention, since both a specialty completely programmed "picture" mode or exposure compensation values may be selected or changed with the exposure compensation dial 244, the number of necessary control members is small. The dial-type control member is easily used, and a user can readily understand which of the completely programmed picture modes is set when the corresponding symbol is aligned with the index mark 28, or that camera is set for exposure compensation. The two types of information that are changeable via the dial 244 may each be changed with one hand.

Seventh Embodiment

FIG. 45 is a plan view showing a seventh embodiment of the present invention. A SLR camera 107 includes a camera body 127. A lens unit (not shown) is mountable to the camera body 127 via a conventional bayonet mount. A shutter release button 16, an up/down dial 18, and an LCD screen 203 are arranged on the right side of the camera body 12. A mode control dial 245 is provided to the camera body 127 at the left side. A pentaprism housing 12a is located in the center of the camera body 127. A mode change button 33 in provided near the mode control dial 245.

The camera 107 of the seventh embodiment is able to operate in a variety of special completely programmed "picture" ("PICT" ) modes, identical to those of the sixth embodiment. Furthermore, the camera is able to operate in the general exposure modes previously described; that is, the general (all-purpose) program mode, shutter priority auto-exposure mode, aperture priority auto-exposure mode, and full manual mode.

As show in FIG. 45, five picture symbols are provided on the dial 245. The picture symbols are identical to those in the sixth embodiment. Furthermore, a "FULL" symbol, representing the group of general (full) exposure modes, and an "OFF" symbol, for turning the camera ON and OFF, are also provided on the mode control dial 245. The mode control dial 245 is set by rotating dial 245 such that the desired setting is lined up with the index mark 28. When the exposure mode control dial 245 is set to one of the picture symbols, the camera is set to the corresponding picture mode. The dial positions are designated by "A" and "B" halves, where the A halt includes the "FULL" and "OFF" symbols and the B half includes the picture symbols. The general program modes, picture modes, and ON/OFF condition constitute the three types of information settable by the mode control dial 245.

A sectional view of the mode control dial 245 and button 33 appears in FIG. 46. The exposure compensation dial 245 of the seventh embodiment is similar to that of the third and fourth, and fifth embodiments, except that one less switch is necessary to determine the dial position. Thus, the switch position detector 52 comprises a brush holder 56 for supporting brushes 54a through 54d, positioned facing the code plate 42. Brushes 54a through 54d each contact the code plate 42, brush 52d being a ground brush and brushes 54a through 54c acting as switches SW4 through SW6, respectively. Brushes 54a through 54d are connected to the control circuit through the flexible circuit board 95. The structure of the button 33 is identical to that of the buttons of the fourth embodiment.

Additionally, FIG. 4 is representative of the control unit of the seventh embodiment. The switch group 180 of the seventh embodiment is represented by FIG. 47, with terminals P2 through P10 of the CPU 100 connected to switches SW2 through SW10, of the switch group 180, respectively. SW1 does not exist; while assigned as main power switch in the other embodiments, that function is performed in a different manner in the seventh embodiment. SW1 through SW3 are the same as the first through fourth embodiments; SW4, SW5, and SW6 are operated by the brushes 54a through 54c, respectively, of the mode control dial 245; SW7 is operated by the mode change button 33; SW8 is operated by a drive mode change button. SW9 and SW10 are the up and down switches, respectively, of the up/down dial 18.

The LCD screen 203 of the seventh embodiment is identical to that of the sixth embodiment, having the same indication portions representing the same states and modes.

When a mode setting routine for changing the exposure mode is called by the CPU 100, the flowchart of FIG. 48 is executed. The mode setting routine of FIG. 48 first reads switch terminals P1 through P10 (step S206). If the mode control dial 245 is at the OFF position in step S208, the mode setting routine is aborted, and the nothing appears in the LCD screen 203. If the mode control dial 245 is at the FULL position in step S210, then a general exposure mode (corresponding to of "P", "Tv", "Av", "M") mode is set (step S212) according to a counter P (described later), and the appropriate symbol is displayed in the LCD screen 203 (step S214). If the mode control dial 245 is not at the FULL position in step S210, then a completely programmed picture mode is set (step S216) according to the position of the mode control dial 245 (from switches SW4 through SW6), and "PICT" is displayed in the LCD screen 203 (step S218). The mode setting routine then returns to a main routine.

The up/down switch 18 is interrupt trapped, and when either switch SW9 or SW10 (connected to up/down switch 18) is cloned and camera 107 is ON, Up/Down interrupt of FIG. 49 is executed. As shown in FIG. 49, the Up/Down interrupt first checks dial 245 and aborts if the dial 245 is set to picture (PICT) mode (step S220). If the dial 245 is not set to PICT mode, the UP and DOWN flags are reset (step S222), and then the appropriate flag is set according to which of the UP switch SW9 (steps S224, S228) or DOWN switch SW10 switches (steps S226, S230) is closed. The CPU 100 then checks (step S232) the mode change, switch SW7 (corresponding to the depression of the mode change button 33), and if the switch SW7 is closed, a general (full) exposure mode change routine (FIG. 50) is executed (step S234) before returning. If the mode change switch SW7 is not closed in step S232, the CPU 100 proceeds to check the full exposure mode. The full exposure mode is shutter priority or manual mode (step S236). CPU 100 executes a Tv change routine (step S238) before returning. The Tv change routine is similar to the ISO setting routine of FIG. 10, except in that the counter changed is a Tv counter (instead of the Sv counter of FIG. 10). If the full exposure mode is aperture priority mode (step S240), the CPU 100 executes an Av change routine (step S242) before returning. The Av change routine is also similar to the ISO setting routine of FIG. 10, except in that the counter changed is a Av counter (instead of the Sv counter of FIG. 10).

If the full exposure mode is to be changed in step S232, the mode change routine of FIG. 50 is executed. As shown in FIG. 50, for the full exposure mode setting, a counter P can have vales of 1, 2, 3, or 4, corresponding to program, shutter priority, aperture priority, and full manual modes, respectively. The full exposure mode setting routine of FIG. 50 first checks which of the UP or DOWN flags have been set (step S244, S246), aborting if neither is set (step S246). If the UP flag is set, the full exposure mode setting routine checks to see if the value of a counter P is at the maximum value (in this case a maximum of 4, step S248). If the counter P is at the maximum, resets the counter P resets (cycles); and to the minimum value (in this case a minimum of 1, step S252). If the counter P is not at the maximum value, CPU 100 increments the counter P by 1 (step S254). It the DOWN flag is set, the mode, setting routine checks to see if the value of counter P is at the minimum value (step S250). If the counter is at the minimum the counter P resets (cycles); to the maximum value (step S258). If the counter P is not at the minimum value, CPU 100 decrements the counter P by 1 (step S256). After incrementing, decrementing, or resetting (cycling) the counter P as appropriate, control in returned to the main process.

When a user wishes to sat the camera to a picture mode, he turns the mode control dial 245 so that one of the picture mode symbols is aligned with the index mark 28, and the "PICT" symbol appears in the LCD screen 203. Further, when the dial 245 is set to the "FULL" position, and a user wishes to set the camera to one of the full exposure modes (program, shutter priority AE, aperture priority AE, or manual), he presses the mode change button 33 while operating the up/down dial 18; the symbol corresponding to the set full exposure mode ("P", "Av", "Tv", or "M") appears in result in the LCD screen 203. When the dial 245 is set to the "FULL" position, and a user wishes to set a shutter speed value while in shutter priority auto-exposure mode or full manual mode, he operates the up/dow dial 18 while-viewing the changing shutter speed value in the LCD screen 203. In full manual mode, the aperture size is set with an aperture ring (not shown) provided to the mounted lens. When the dial 245 is set to the "FULL" position, and a user wishes to set an apertures size while in aperture priority auto-exposure mode, he operates the up/down 18 while viewing the changing aperture size value in the LDC screen 203. When the user wishes to shut the camera OFF, he turns the mode control dial 245 such that the "OFF" symbol is aligned with the index mark 28.

Thus, the seventh embodiment of the invention provides two kinds of mode control, both accessible on the same dial. Since the use of the general (full) exposure mode group and the completely program picture mode group is mutually exclusive, the use of a dial that has both groups precludes confusion between the two. The user can readily identify the chosen completely programmed picture mode or general exposure mode by the position of the dial 245 and the LDC screen 203. The two types of settings that are changeable via the dial 245 may each be changed with one hand.

Furthermore, the user can turn the camera OFF with the same dial 245.

Eighth Embodiment

FIG. 51 is a plan view showing an eighth embodiment of the present invention. The lens unit (not shown) is mountable to the camera body 128 of a camera 108 via a conventional bayonet mount. A shutter release button 16, an UP/DOWN dial 18, an ON/OFF switch 19 and an LCD 203 are arranged on the right Side of the camera body 128. A mode control dial 246 in provided to the camera body 128 at the left side, and a pentaprism housing 12a is located in the center of the camera body 128. An index mark 28a is provided for indicating a selected mode of the mode control dial 246.

The eighth embodiment of the invention includes an UP/DOWN dial 18 arranged near the shutter release button 16. The UP/DOWN dial 18 is a knurled disk, and in arranged such that only part of the disk protrudes outside the camera body 128. When the dial 18 is rotated in one direction, an UP switch portion (not shown) of the dial 18 is actuated, and when the disk is rotated in the opposite direction, a DOWN switch portion is actuated.

The camera 108 of the eighth embodiment is able to operate in a variety of specialty completely programmed picture ("PICT") modes, identical to those of the sixth and seventh embodiments. The camera is also able to operate in the general exposure modes previously described; that is, the general (all-purpose) program mode, shutter priority auto-exposure mode, aperture priority auto-exposure mode, and full manual mode. The camera 108 according to the eighth embodiment of the invention is further provided with a bulb mode, in which the shutter is held open for as long as the shutter release button 16 is depressed.

FIG. 52 shows a sectional view of the mode control dial 246. The dial 246 is rotatable relative to the camera body 128. As shown in FIG. 52, the dial 246 is inserted into a through hole 12c formed on the upper panel 12b of the camera body 128. The mode control dial 246 is a hollow member, and a swingable core block 60 is arranged in the center of the dial 246.

The dial 246 is open at the top, and is covered by a mask 64 placed in a stepped rim 246a. The mask 64 includes a transparent resin body and a bottom opaque portion 64a. The bottom opaque portion has five rectangular windows 66a through 66e evenly angularly distributed about the mask 64. Thus, when view from the top, the mask 64 is largely opaque excepting the windows 66a through 66e (all shown in FIG. 53), through which the user can see through the mask 64. A clickable code plate 42a is coaxially fixed to the mode control dial 246 by screws 44, and is rotatable with the dial 246. A click ball 48b is pressed against the code plate 42a by a coil spring 46b, guided in a spring chamber 50b. The code plate 42a is provided on its circumference with five click notches evenly and angularly distributed about the rotating axis of the dial 246. The click notches are rotatable into positions facing the click ball 50b, to click the mode control dial 246 into rotational positions corresponding to aligned portions of mode symbols and an index mark 28a.

A switch position detector 53 comprises brushes 55a through 55d, positioned facing the code plate 42a. The brushes 55a through 55d each contact the code plate 42a, brush 55d being a ground brush and brushes 55a through 55c acting as switches SW4 through SW6, respectively. The brushes 55a through 55d are connected to a controller circuit (shown in FIG. 4) through a flexible circuit board (FBC) 95. The FBC 95 is supported by a supporting portion 12d of the camera body 128.

A center block 60 is arranged in a central hollow portion of the mode control dial 246. A normally open plate spring switch SW7 is provided in the hollow portion of the dial 246, fixed to the FCB 95 and adjacent to the center block 60. The center block 60 is rotatable within the dial 246, and a switching lever 27 and indication plate 62 are fixed to the center block 60. The switching lever 27, indication plate 62, and center block 60 rotate together with reference to the dial 246 when the switching lever 27 moves. A protruding portion 60a projects from the center block 60 near to the switch SW7.

The switching lever 27 passes from the center block 60 through a side hole 246d formed in the mode control dial 246. A click ball 49 is pressed against the switching lever 27 by, a coil spring 47, guided in a spring chamber 51. The switching lever 27 has two click holes arranged on a fan-shaped portion, and can be clicked between two positions (shown in FIG. 53).

As shown in FIG. 53, the indication plate 62, facing the mask 64, has mode symbols printed on its surface. Ten symbols, five completely programmed picture mode symbols (green, portrait, landscape, action, close-up) and five general (full) exposure mode symbols (P, Tv, Av, M, and B), are arranged on the surface of the plate 62. The symbols are arranged to alternate between picture mode symbols and full exposure mode symbols, all ten symbols being evenly (angularly) distributed about the swinging axis of the indication plate, and aligned with the five windows 66a through 66e of the mask 64.

When the switching lover is in the first position show in FIG. 53 (shown by a long-dashed line), the picture mode symbols are visible through the windows 66a through 66e (FIG. 54). In this condition, the user can select one of the five picture modes by rotating the entire dial 246 such that the desired mode symbol aligns with the indication mark 28a. In the first position, the protruding portion 60a closes the switch SW7 to an ON position.

When the switching lever is in the second position shown in FIG. 53 (shown by a double dotted line), the full exposure mode symbols are visible through the windows 66a through 66e (FIG. 55). Again, the user can select one of the five full exposure modes by rotating the entire dial 246 such that the desired ma symbol aligns with the indication mark 28a. In the second position, the protruding portion 60a releases the switch SW7 to an OFF position.

FIG. 4 is representative of the control unit of the eighth embodiment. Switch group 180 of the seventh embodiment is represented by FIG. 47 with terminals P1 through P10 of the CPU 100 connected to switches SW1 through SW10, respectively, of the switch group 180. SW1 through SW3 are common to all the embodiments, switches SW4 through SW6 is are operated by the brushes 54a through 54c, respectively; SW7 is operated by the switching lever 27 shown in FIG. 52 inside the dial 246; and SW8 is operator by a drive mode change button (not shown). SW9 and SW10 are the UP/DOWN switches, respectively, of the up/down dial 18.

The CPU 100 sets the mode based on 3 bits of information from the brushes SW4 through SW6 and an additional bit from SW7, checking the mode control dial 246 according to the flow chart shown in FIG. 56. First the CPU 100 checks the internal switch SW7 (step S258). If SW7 is ON, indicating that the picture mode group in selected, then the CPU 100 reads the dial position from the switches SW4 through SW6 (S260), sets the corresponding PICT mode (step S264), displays "PICT" in the indication portion 203a of the LCD screen 203 (step S268), and returns. It SW7 is OFF, indicating that the full exposure mode group is selected, then the CPU 100 reads the dial position from the switches SW4 through SW6 (step S262), sets the corresponding symbol exposure mode (step S266), displays the corresponding symbol of "P", "Tv", "Av" or "M" in the indication portion 203a of the LCD screen 203 (S270), and returns. The shutter speed is set to "bu", bulb mode, when the "B" position in determined by switches SW4 through SW6. An UP/DOWN interrupt similar to those previously described is used to set the shutter speed in "Tv" or manual modes or the aperture size in the "Av" mode.

The LCD screen 203 of the eighth embodiment is substantially identical to that of the seventh embodiment, having the same indication portions representing the same states and modes. However, one additional example display of the LCD screen 203 is shown in FIG. 57, when the bulb exposure mode is selected. In this case, an "M" symbol is shown in indication portion 203a; the characters "bu" are shown in indication portion 203c instead of the shutter speed; and a single frame drive symbol is shown at 203b.

When a user wishes to set the camera to a completely programmed picture mode, he turns the switching lever 27 so that the picture mode symbol appear in the windows 66a through 66e; the "PICT" symbol appears in result in the LCD screen 203. He then can turn the mode control dial 246 so that the desired picture mode symbol is aligned with the index mark 28. When a user wishes to set the camera to a full exposure mode, he turns the switching lever 27 so that the full exposure mode symbols appear in the windows 66a through 66e; the appropriate full exposure mode symbol ("P", "Tv", "Av", or "M") appears as a result in the LCD screen 203. He then can turn the mode control dial 246 so that the desired full exposure mode symbols is aligned with the index mark 28. If the bulb full exposure mode is set, the "M" symbol appears in the LCD screen 203 and the characters "bu" appear in the shutter speed indication portion 203c.

Thus, the eighth embodiment of the invention provides two kinds of mode control, both accessible on the same dial 246. Since the use of the general (full) exposure mode group and the completely programmed picture mode group is mutually exclusive, and only one group is visible when a mode in that group is chosen, the use of the concentric dial 246 precludes confusion between the two groups. The user can readily identify the chosen picture mode or full exposure mode by the position of the dial 246 and by the visible symbols. The two types of settings that are changeable via the dial 246 may each be changed with one hand, and on the same control member.

The present disclosure relates to subject matter contained in Japanese Utility Model Application No. HEI 6-006603, filed on May 17, 1994, and Japanese Patent Application Nos. HEI 6-128322, HEI 6-128323, HEI 6-128324, HEI 6-128326, HEI 6-128327, filed on May 18, 1994, which are expressly incorporated herein by reference in their entireties.

What is claimed is:

1. A camera comprising:
    a dial member rotatably mounted on a body of said camera, said dial member having a plurality of first numerical symbols for indicating corresponding numerical values of a first function, and having at least a second symbol for indicating a selecting operation of a second function;
    an index mark on said camera body;
    a detecting system that detects a rotational position of said dial member with reference to said index mark;
    a selecting system, on said camera body, that selects one of a plurality of conditions of said second function;
    a setting system that selects a numerical value of said first function in response to a rotation of said dial member to align, a numerical symbol of said plurality of first numerical symbols representative of a chosen value of said first function from a plurality of numerical values, with said index mark; and
    a setting system that sets a condition of said second function in response to a rotation of said dial member to align said at least a second symbol with said index mark, and changing a chosen condition of said second function in response to operation of said selecting system.

2. The camera according to claim 1,
    wherein said selecting system changes said chosen condition of said second function in up and down directions within an ordered set of chooseable conditions of said second function, said up and down directions being opposite to each other.

3. The camera according to claim 2,
    said selecting system including up and down direction actuating portions, and
    wherein, when said at least one second symbol is aligned with said index mark, said condition of said second function changes in up and down directions in response to actuation of said up and down direction actuating portions of said selecting system.

4. The camera according to claim 3, further comprising a display screen
    which displays information representative of chosen conditions of said second function and symbols representative of said up and down directions of a change in said chosen conditions.

5. The camera according to claim 3,
    wherein said up actuating portion comprises a push button switch provided in a center of said dial member, and said down actuating portion comprises a combination of said push button provided in said center of said dial member and a rear push button switch provided on said camera body.

6. The camera according to claim 3,
    wherein said first function is an exposure compensation function having a range of values, and said second function is an ISO film speed adjusting function having an ordered set of chooseable values.

7. The camera according to claim 2,
    wherein said dial member has an up symbol for indicating an up direction selecting operation and a down symbol for indicating a down direction selecting operation of said second function on said dial member, and
    wherein when said up direction symbol is aligned with said index mark, a chosen condition of said second function changes in an up direction in response to actuation of said selecting system, and when said down direction symbol is aligned with said index mark, a chosen condition of said second function changes in a down direction in response to actuation of said selecting system.

8. The camera according to claim 7, further comprising a display screen
    which displays information representative of chosen conditions of said second function and symbols representative of said up and down directions of a change in said chosen conditions.

9. The camera according to claim 7,
    wherein said selecting system comprises a push button switch provided in a center of said dial member.

10. The camera according to claim 7,
    wherein said first function is an exposure compensation function having a range of values, and said second function is an ISO film speed adjusting function having an ordered set of chooseable values.

11. The camera according to claim 1,
    said dial member including a plurality of second symbols for indicating operations for a plurality of second functions corresponding to said plurality of second symbols; and
    wherein when one of said plurality of second symbols aligns with said index mark, a condition of one of said second function corresponding to said aligned second symbol changes in response to an actuation of said selecting system.

12. The camera according to claim 11,
wherein said selecting system changes a chosen condition of each of said second functions in up and down directions within an ordered set chooseable conditions of said second function, said up and down directions being opposite to each other.

13. The camera according to claim 12,
said selecting system including up and down direction actuating portions, and
wherein when one of said second symbols is aligned with said index mark, a condition of one of said second functions changes in said up and down directions in response to an actuation of said up and down direction actuating portions of said selecting system.

14. The camera according to claim 13, further comprising a display screen
which displays information representative of chosen conditions of said second functions and symbols representative of said up and down directions, of said selecting system.

15. The camera according to claim 13,
wherein said selecting means comprises an up/down dial switch, and said up actuating portion and said down actuating portion correspond to opposite rotating directions of said dial switch.

16. The camera according to claim 13,
wherein said first function is an exposure compensation function having a range of settings, and said plurality of second functions include an ISO film speed adjustment function, a drive mode function, and a photometry mode function, each of said plurality of second functions having an ordered set of chooseable settings.

17. The camera according to claim 12,
wherein said up actuating portion of said selecting system toggles a first toggleable function, and said down actuating portion of said selecting system toggles a second toggleable function, when said dial member is in a rotational position such that one of said plurality of first symbols representative of a value of said first function is aligned with said index mark.

18. The camera according to claim 17, further comprising a display screen
which displays information representative of chosen conditions of said second functions and displays symbols representative of said up and down directions of said selecting system.

19. The camera according to claim 17,
wherein said up actuating portion and said down actuating portion each comprise a push button switch on said camera body adjacent said dial member.

20. The camera according to claim 19,
wherein said first toggleable function is toggleable between active and inactive settings of a red-eye reduction function, and said second toggleable function is toggleable between active and inactive settings of a self-timer function.

21. The camera according to claim 17,
wherein said first function is an exposure compensation function having a range of values, and said plurality of second functions include an ISO film speed adjustment function, a drive mode function, and a photometry function, each of said plurality of second functions having an ordered set of chooseable conditions.

22. A camera, comprising:
a camera body;
a lens unit mountable to said camera body;
a rotatable shutter speed control dial provided on said camera body for changing a shutter speed of said camera;
a rotatable aperture control ring provided on said lens unit, for changing an aperture size of said lens.
a display screen provided on said camera body, for indicating photographing information, including a mode of operation of said camera;
a setting system that sets a mode of operation of said camera; and
a system that controls said setting system and said display screen in response to rotational positions of said shutter speed control dial and said aperture control ring, to set a mode of operation of said camera and display information representative of said set mode of operation on said display screen.

23. The camera according to claim 22,
wherein a group of settable rotational positions of said shutter speed control dial includes a first automatic function position and a plurality of shutter speed setting positions, and a group of settable rotational positions of said aperture control ring includes a second automatic function position and a plurality of aperture size setting positions, and
wherein said control system controls said setting system and said display screen to set a mode of operation of said camera, and to display information representative of said set mode of operation on said display screen, in response to combinations of positions of said shutter speed control dial and said aperture control ring, said combinations including:
(a) said first automatic function position of said shutter speed control dial and said second automatic function position of said aperture control ring, defining a full program exposure mode of operation;
(b) said first automatic function position of said shutter speed control dial and any of said plurality of aperture size setting positions of said aperture control ring, defining an aperture priority auto-exposure mode of operation;
(c) said second automatic function position of said aperture control ring and any of said plurality of shutter speed setting positions of said shutter speed control dial, defining a shutter priority auto-exposure mode of operation; and
(d) any of said plurality of aperture size setting positions of said aperture control ring and any of said plurality of shutter speed setting positions of said shutter speed control dial, defining a full manual mode of operation.

24. The camera according to claim 23,
said display screen of displaying distinct symbols corresponding to each of said full program exposure mode, said aperture priority auto-exposure mode, said shutter priority auto-exposure mode, and said full manual mode in response to said combinations of positions of said shutter speed control dial and said aperture control ring.

25. The camera according to claim 22, said setting system comprising:
a dial member rotatably mounted on camera body, said dial member having a plurality of first symbols thereon in a first angular range, each of said first symbols corresponding to a picture mode of operation, and said dial member having a plurality of second symbols thereon in a second angular range, said second symbols representing values for a changeable function having a range of values;
an index mark provided on said camera body;
a detection system that detects a rotational position of said dial member with reference to said index mark;

a first changing system that changes a picture mode when said dial member rotates to align said index mark with one of said first symbols in said first angular range; and a second changing system that changes a chosen setting of said changeable function, when said dial member is rotated to align said index mark with one of said second symbols in said second angular range;

wherein said picture modes are programmed exposure modes optimized for specific photographing situations, and said camera automatically setting shutter speed and aperture size in each of said picture modes according to a distinct program for each of said picture modes, said camera further comprising of set of general exposure modes including all photographing modes in which a user can manually set at least one of shutter speed and aperture size.

26. The camera according to claim 25, wherein said display screen displays information representative of chosen settings of said changeable function and a symbol representative of a selected one of said picture modes of operation.

27. The camera according to claim 25, wherein said changeable functions include an exposure compensation function having a range of settings.

28. A camera comprising:

a dial member rotatably mounted on a body of said camera, said dial member having a set of first symbols in a first angular range, each of said first symbols corresponding to a picture mode of operation, and said dial member having a second symbol in a second angular range, said second symbol indicating a mode change operation for a plurality of exposure modes of operation of said camera, said plurality of exposure modes including at least an Av mode and a Tv mode;

an index mark provided on said camera body;

a detection system that detects a rotational position of said dial member with reference to said index mark;

a first changing system that changes a setting of a picture mode when said index mark aligns with one of said first symbols in said first angular range; and a second changing system, distinct from said dial member, that changes a setting of a chosen exposure mode of said plurality of exposure modes of operation including at least said Av mode and said Tv mode, when said index mark aligns with said second symbol;

wherein said picture modes are programmed exposure modes optimized for specific photographing situations, and said camera automatically setting shutter speed and aperture size in each of said picture modes according to a distinct program for each of said picture modes, and wherein said plurality of exposure modes includes photographing modes in which a user can manually set at least one of shutter speed and aperture size.

29. The camera according to claim 28, further comprising a display screen which displays symbols representative of each of said plurality of exposure modes and a symbol representative of a setting of one of said picture modes of operation.

30. The camera according to claim 28, further comprising:

a third changing system that changes a third setting, a third symbol on said dial member in a third angular range, said third symbol representative of said third setting, and wherein said third changing system sets said third setting when said index mark aligns with said third symbol.

31. The camera according to claim 30, wherein said third setting is an OFF setting of said camera where all functions of said camera, are disabled.

32. The camera according to claim 28, wherein said second changing system comprises:
a mode button switch; and
an up/down switch having two positions, wherein when said index mark aligns with said second symbol and said mode button switch is depressed, said second changing system changes a setting of a chosen exposure mode of said plurality of exposure modes in response to an operation of said up/down switch.

33. A camera comprising:

a dial member rotatably mounted on a body of said camera, said dial member having a set of first symbols thereon, each of said plurality of first symbols corresponding to a picture mode of operation, and said dial member having a set of second symbols thereon, each of said second symbols corresponding to a general exposure mode of operation;

an index mark provided on the said camera body;

a first detection system that detects a rotational position of said dial member with reference to said index mark;

a selection system that selects one set of said set of first symbols and said set of second symbols, selection of one of said sets precluding a selection of a remaining set of said sets of first and second symbols;

a system that sets a mode of operation according to said rotational position of said dial member when said index mark aligns with a symbol, the set mode of operation corresponding to a symbol within said one set selected by said selection system;

wherein said picture modes are programmed exposure modes optimized for specific photographing situations, and said camera automatically setting shutter speed and aperture size in each of said picture modes according to a distinct program for each of said picture modes, and wherein said set of general exposure modes includes all photographing modes in which a user can manually set at least one of shutter speed and aperture size.

34. The camera according to claim 33, further comprising a display screen which displays symbols representative of each of said general exposure modes and a symbol representative of said setting of one of said picture modes of operation.

35. The camera according to claim 33, wherein said selection system includes a mechanism that reveals one of said sets of symbols and masks another of said sets of symbols.

36. The camera according to claim 35, further comprising:

said dial member having a hollow portion, and said selection means comprises a center block mounted within said hollow portion of said dial member, said center block being rotatable with reference to said dial member, and said dial member also having a mask above said center block, said mask having window portions and a masking portion, wherein said set of first symbols and said set of second symbols are provided on said center block, and said center block is rotatable within said dial member to reveal said one set through said window portions while masking said remaining set with said masking portion.

37. The camera according to claim 36, wherein said selection system further comprises a second detecting system that detects a rotational position of said center block with reference to said dial member.

* * * * *

UNITED STATES PATENT AND TRADEMARK OFFICE
CERTIFICATE OF CORRECTION

PATENT NO. : 5,761,554
DATED : June 2, 1998
INVENTOR(S) : Tadayuki KIRIGAYA et al.

It is certified that error appears in the above-identified patent and that said Letters Patent is hereby corrected as shown below:

Title page, item [54] Title of the Invention, "INFORMATION SETTING DATA DIAL FOR A CAMERA" should be changed to ---INFORMATION SETTING DIAL FOR A CAMERA---.

At column 26, line 29 (claim 6, line 5) of the printed patent, change "values" to ---conditions---.

At column 26, line 56 (claim 10, line 5) of the printed patent, change "values" to ---conditions---.

At column 28, line 49 (claim 24, line 2) of the printed patent, delete "of ".

Signed and Sealed this

First Day of June, 1999

Attest:

*Attesting Officer*

Q. TODD DICKINSON

*Acting Commissioner of Patents and Trademarks*

UNITED STATES PATENT AND TRADEMARK OFFICE
CERTIFICATE OF CORRECTION

| | |
|---|---|
| PATENT NO. : 5,761,554 | Page 1 of 1 |
| DATED : June 2, 1998 | |
| INVENTOR(S) : Tadayuki Kirigaya et al. | |

It is certified that error appears in the above-identified patent and that said Letters Patent is hereby corrected as shown below:

<u>Title page,</u>
Item [22], "Filed", delete "May 17, 1997" and insert -- May 30, 1997 --.

Signed and Sealed this

Twenty-third Day of October, 2001

Attest:

*Nicholas P. Godici*

NICHOLAS P. GODICI
*Attesting Officer*     *Acting Director of the United States Patent and Trademark Office*